United States Patent
Sehl et al.

(10) Patent No.: US 12,283,681 B2
(45) Date of Patent: Apr. 22, 2025

(54) BATTERY TEMPERATURE REGULATION DEVICE, VEHICLE, AND METHOD FOR PRODUCING A BATTERY TEMPERATURE REGULATION DEVICE

(71) Applicant: ElringKlinger AG, Dettingen (DE)

(72) Inventors: Christian Sehl, Kirchheim unter Teck (DE); Tobias Michael Gruhler, Pfullingen (DE); Thomas Wolf, Göppingen (DE); Frederik Weinmann, Pfullingen (DE); Stefan Dwenger, Reutlingen (DE)

(73) Assignee: ElringKlinger AG, Dettingen (DE)

( * ) Notice: Subject to any disclaimer, the term of this patent is extended or adjusted under 35 U.S.C. 154(b) by 872 days.

(21) Appl. No.: 17/238,123

(22) Filed: Apr. 22, 2021

(65) Prior Publication Data

US 2021/0242517 A1   Aug. 5, 2021

Related U.S. Application Data

(63) Continuation of application No. PCT/EP2019/078776, filed on Oct. 22, 2019.

(30) Foreign Application Priority Data

Oct. 26, 2018  (DE) ..................... 10 2018 218 405.4

(51) Int. Cl.
*H01M 10/6568* (2014.01)
*H01M 10/617* (2014.01)
(Continued)

(52) U.S. Cl.
CPC ..... *H01M 10/6568* (2015.04); *H01M 10/617* (2015.04); *H01M 10/625* (2015.04); *H01M 10/643* (2015.04); *H01M 10/6556* (2015.04)

(58) Field of Classification Search
None
See application file for complete search history.

(56) References Cited

U.S. PATENT DOCUMENTS 9,941,554 B2   4/2018  Fuhr et al.
2011/0008667 A1*  1/2011  Kwag ............... H01M 10/6556
                                                        429/123

(Continued)

FOREIGN PATENT DOCUMENTS

CN    205960157 U    2/2017
CN    207530085 U    6/2018

(Continued)

OTHER PUBLICATIONS

Machine Translation of JP-2019009009-A (Year: 2019).*

*Primary Examiner* — Gregg Cantelmo
(74) *Attorney, Agent, or Firm* — ASLAN LAW, P.C.

(57) ABSTRACT

A battery temperature regulation device having a main body; and one or more additional bodies that are arranged on and/or are arrangeable on the main body. The main body and/or the one or more additional bodies that are arranged on and/or are arrangeable on the main body each comprise one or more receiving openings for receiving battery cells, wherein receiving openings of the main body are preferably arranged to be coaxial with respective receiving openings of the one or more additional bodies that are arranged on the main body, wherein each battery temperature regulation module comprises a sealing element arrangement for sealing in the area of the receiving openings and/or for sealing between the main body and one or more additional bodies, and wherein the sealing element arrangement comprises one or more sealing elements which are arranged on, in particular are moulded onto the main body and/or onto each additional body.

22 Claims, 38 Drawing Sheets

(51) Int. Cl.
*H01M 10/625* (2014.01)
*H01M 10/643* (2014.01)
*H01M 10/6556* (2014.01)

(56) References Cited

U.S. PATENT DOCUMENTS

| | | | |
|---|---|---|---|
| 2012/0148889 A1* | 6/2012 | Fuhr | H01M 50/264 |
| | | | 429/87 |
| 2014/0093755 A1* | 4/2014 | Houchin-Miller | |
| | | | H01M 10/6567 |
| | | | 429/50 |
| 2015/0044519 A1* | 2/2015 | Rief | H01M 10/6563 |
| | | | 429/50 |
| 2015/0364799 A1 | 12/2015 | Miller et al. | |
| 2016/0172727 A1 | 6/2016 | Chan et al. | |
| 2018/0316074 A1* | 11/2018 | Kreisel | H01M 50/264 |
| 2020/0028224 A1* | 1/2020 | Hofer | H01M 10/613 |

FOREIGN PATENT DOCUMENTS

| | | |
|---|---|---|
| DE | 10 2013 013 752 A1 | 2/2015 |
| DE | 10 2014 212 181 A1 | 12/2015 |
| DE | 10 2014 112 628 A1 | 3/2016 |
| DE | 10 2017 219 928 A1 | 5/2019 |
| DE | 10 2014 212 181 B4 | 11/2021 |
| EP | 3 804 001 A1 | 12/2019 |
| JP | 2019009009 A * | 1/2019 |

\* cited by examiner

BATTERY TEMPERATURE REGULATION DEVICE, VEHICLE, AND METHOD FOR PRODUCING A BATTERY TEMPERATURE REGULATION DEVICE

CROSS-REFERENCE TO RELATED APPLICATIONS

This application claims priority to German Patent Application No. 10 2018 218 405.4 filed on Oct. 26, 2018, and this application claims priority to and is a continuation of PCT Application No. PCT/EP2019/078776 filed on Oct. 22, 2019, the entire contents of which are hereby incorporated by reference.

FIELD OF DISCLOSURE

The present invention relates to a battery temperature regulation device.

SUMMARY OF INVENTION

The object of the present invention is to provide a battery temperature regulation device which enables a reliable seal to be obtained and which is producible in a simple and economical manner.

In accordance with the invention, this object is achieved by a battery temperature regulation device incorporating the features of claim 1.

The battery temperature regulation device preferably comprises the following:

a main body;

one or more additional bodies that are arranged and/or are arrangeable on the main body.

The main body and/or the one or more additional bodies that are arranged on and/or are arrangeable on the main body each comprise one or more receiving openings for receiving battery cells.

The receiving openings of the main body are preferably arranged such as to be coaxial with respective receiving openings of the one or more additional bodies that are arranged on or are arrangeable on the main body, Furthermore, each battery temperature regulation module preferably comprises a sealing element arrangement for sealing in the area of the receiving openings and/or for sealing between the main body and a respective additional body, In particular, the sealing element arrangement comprises one or more sealing elements which are arranged on, in particular are moulded onto, the main body and/or onto a respective additional body.

The receiving openings of the main body and/or of the one or more additional bodies that are arranged on or are arrangeable on the main body are preferably through openings. In particular, provision may be made for battery cells and in particular round cells to be at least partly feedable through the receiving openings of the main body and/or of the one or more additional bodies that are arranged on or are arrangeable on the main body for the purposes of the accommodation thereof.

Preferably, battery cells can be accommodated in coaxially arranged receiving openings of the main body and/or of the one or more additional bodies and they are kept at a moderate temperature, i.e. cooled or heated by means of the battery temperature regulation device.

It may be expedient for one or more respective sealing elements to be arranged on the main body and/or on the one or more additional bodies.

The sealing elements arranged on each one of the additional bodies are preferably each arranged on a side of the additional bodies facing the main body.

The receiving openings of the main body and/or of the one or more additional bodies are preferably constructed for accommodating battery cells, in particular round cells.

Consequently, it may be expedient for the receiving openings of the main body and/or of the one or more additional bodies to have a circular cross section.

Furthermore, it may be expedient for the receiving openings to have an internal diameter of at least approximately 10 mm, in particular of at least approximately 15 mm.

The receiving openings preferably have an internal diameter of at most approximately 40 mm and in particular of at most approximately 30 mm.

Preferably, the receiving openings have an internal diameter in the range of approximately 10 mm up to approximately 40 mm and in particular from approximately 15 mm up to approximately 30 mm.

Consequently, circular-cylindrical battery cells, in particular circular-cylindrical round cells, can preferably be accommodated in coaxially arranged receiving openings of the main body and of the one or more additional bodies.

The main body and/or the one or more additional bodies each preferably comprise a recess, in particular a cylindrical recess, which is constructed such as to be at least approximately complementary to sealing elements of the sealing element arrangement that are arranged on the one or more additional bodies and/or on the main body.

It may be expedient if sealing elements of the sealing element arrangement that are moulded onto the main body and/or onto each additional body are arranged in the cylindrical recess of the main body and/or of an additional body.

As an alternative or in addition to sealing elements that are moulded onto the main body and/or onto the one or more additional bodies, it is conceivable for individual sealing elements of the sealing element arrangement to be laid in the main body and/or the one or more additional bodies, in particular in a cylindrical recess of the main body and/or of the one or more additional bodies that is constructed such as to be complementary to the sealing elements.

The depth of the cylindrical recess preferably corresponds at least approximately to the thickness of a sealing element arranged in the respective cylindrical recess.

Consequently, the effect can preferably be achieved that the one or more additional bodies are constructed such as to be at least approximately flat on the respective side thereof facing the main body when a sealing element is arranged in the cylindrical recess.

The main body and/or the one or more additional bodies preferably each comprise one or more plates which incorporate one or more receiving openings for receiving battery cells.

The one or more plates of the main body and/or of the one or more additional bodies are preferably separator plates or cover plates.

The main body preferably comprises one or more separator plates and/or one or more cover plates.

The one or more additional bodies preferably each comprise a cover plate or one or more separator plates.

In one configuration of the battery temperature regulation device, provision is made for the main body and the one or more additional bodies of a battery temperature regulation module as well as battery cells arranged in the receiving openings of the main body and/or the one or more additional body to bound and/or constitute a temperature regulation circulation system for a temperature regulation medium.

In particular, the main body and the one or more additional bodies bound a temperature regulation circulation system when the one or more additional bodies are arranged on the main body and battery cells, in particular round cells, are accommodated in the receiving openings of the main body and/or of the one or more additional bodies.

Preferably, the temperature regulation circulation system comprises a temperature regulation medium inlet region and/or a temperature regulation medium outlet region.

It may be expedient for a temperature regulation medium, water for example, to be feedable into the temperature regulation circulation system at the temperature regulation medium inlet region and/or for a temperature regulation medium to be removable from the temperature regulation circulation system at the temperature regulation medium outlet region.

Preferably, the temperature regulation medium inlet region forms a cold side of the temperature regulation circulation system.

It may be expedient thereby if a temperature regulation medium is supplied to the temperature regulation medium inlet region for cooling the battery cells, wherein, before being fed into the temperature regulation circulation system, the temperature regulation medium has a lower temperature than the battery cells that are to be cooled.

As an alternative or in addition thereto, it is conceivable for the temperature regulation medium inlet region to form a hot side of the temperature regulation circulation system.

It may be expedient thereby if a temperature regulation medium is supplied to the temperature regulation medium inlet region for heating the battery cells, wherein, before being fed into the temperature regulation circulation system, the temperature regulation medium has a higher temperature than the battery cells that are to be heated.

Furthermore, it may be expedient for the sealing element arrangement to be constructed for the purposes of sealing the temperature regulation circulation system with respect to the surroundings of a respective battery temperature regulation module.

In one configuration of the battery temperature regulation device, provision is made for each battery temperature regulation module to comprise a temperature regulation circulation system for a temperature regulation medium, wherein the temperature regulation circulation system comprises a temperature regulation channel which runs, in particular, in a meandering manner between a temperature regulation medium inlet and one or more temperature regulation medium outlets.

Preferably the temperature regulation channel runs through the temperature regulation medium inlet region and/or the temperature regulation medium outlet region, in particular in a meandering manner.

In one configuration of the battery temperature regulation device, provision is made for the battery temperature regulation device to comprise a temperature regulation medium supply line for feeding a temperature regulation medium into a temperature regulation circulation system of one or more battery temperature regulation modules and/or a temperature regulation medium discharge line for the removal of a temperature regulation medium.

Preferably, the battery temperature regulation modules are constructed in such a manner that a temperature regulation medium is removable from a temperature regulation circulation system of a respective battery temperature regulation module via one or more temperature regulation medium outlets.

Preferably, a temperature regulation medium emerging from a temperature regulation circulation system of a respective battery temperature regulation module is collectable in a receiving housing, in particular, in a temperature regulation medium collecting region of the receiving housing.

Furthermore, it may be expedient for a temperature regulation medium to be removable from a temperature regulation circulation system of one or more battery temperature regulation modules by means of the temperature regulation medium discharge line.

Preferably, the temperature regulation device comprises just a single temperature regulation medium supply line by means of which a temperature regulation medium is feedable to the respective temperature regulation circulation systems of all the battery temperature regulation modules.

Preferably, the battery temperature regulation device comprises just a single temperature regulation medium discharge line by means of which a temperature regulation medium is removable for example from the respective temperature regulation circulation systems of all the battery temperature regulation modules.

It may be expedient for the temperature regulation medium supply line and/or the temperature regulation medium discharge line to be constructed in modular manner.

Preferably, the length of the temperature regulation medium supply line and/or of the temperature regulation medium discharge line is adaptable to the number of battery temperature regulation modules of the battery temperature regulation device.

In particular, the temperature regulation medium supply line and/or the temperature regulation medium discharge line are fixable to one or more battery temperature regulation modules, in particular to be pluggable-onto a respective fixing projection that is arranged on a battery temperature regulation module.

Preferably, the main body of each battery temperature regulation module comprises a respective fixing projection for the attachment of a temperature regulation medium supply line and/or a temperature regulation medium discharge line.

The fixing projection is preferably constructed in one piece with the main body.

It may be expedient for the fixing projection to be constructed such as to be at least approximately conical.

The temperature regulation medium supply line and the temperature regulation medium discharge line are preferably fixable one above the other to one or more battery temperature regulation modules.

In particular, the temperature regulation medium supply line is fixable to one or more battery temperature regulation modules above the temperature regulation medium discharge line.

It may be expedient thereby if the temperature regulation medium supply line and/or the temperature regulation medium discharge line comprise a fixing receptacle for accommodating the fixing projection of the main body.

In particular, the fixing receptacle of the temperature regulation medium discharge line and a fixing projection of the main body accommodated therein are receivable in the fixing receptacle of the temperature regulation medium supply line.

The temperature regulation medium supply line and/or the temperature regulation medium discharge line preferably each comprise one or more temperature regulation medium supply line modules and/or one or more temperature regulation medium discharge line modules.

A plurality of temperature regulation medium supply line modules are preferably connectible to one another by plugging them into each other.

Furthermore, it may be expedient for a plurality of temperature regulation medium discharge line modules to be connectible to one another by plugging them into each other.

Preferably thereby, the length of the temperature regulation medium supply line and/or of the temperature regulation medium discharge line can be altered and in particular adapted to the number of battery temperature regulation modules by choice of the number of temperature regulation medium supply line modules and/or of the temperature regulation medium discharge line modules.

It may be expedient for at least one temperature regulation medium supply line module to comprise a feed-in connector by means of which a temperature regulation medium is feedable to the temperature regulation medium supply line.

Furthermore, it may be expedient for at least one temperature regulation medium discharge line module to comprise a discharge connector by means of which a temperature regulation medium is removable from the temperature regulation medium discharge line.

Preferably, the temperature regulation medium supply line and/or the temperature regulation medium discharge line are closed at an end thereof which is remote from a feed-in connector and/or a discharge connector, in particular by means of a temperature regulation medium supply line module that is closed on one side and/or by means of a temperature regulation medium discharge line module that is closed on one side.

It may be expedient for the temperature regulation medium discharge line to comprise a suction opening by means of which a temperature regulation medium is adapted to be sucked out of the receiving housing, in particular out of the temperature regulation medium collecting region of the receiving housing.

A temperature regulation medium is preferably feedable to two battery temperature regulation modules by means of a respective temperature regulation medium supply line module.

A temperature regulation medium is preferably removable from two battery temperature regulation modules by means of a respective temperature regulation medium discharge line module.

It may be expedient for the temperature regulation medium supply line to be connectible to a temperature regulation medium inlet of a temperature regulation circulation system of a respective battery temperature regulation module.

Furthermore, it may be expedient for a temperature regulation medium discharge line to be connectible to a temperature regulation medium outlet of a temperature regulation circulation system of a respective battery temperature regulation module.

In one configuration of the battery temperature regulation device, provision is made for the sealing element arrangement to comprise one or more at least approximately flat sealing elements for sealing in the area of the receiving openings and/or for sealing between the main body and a respective additional body, wherein the sealing element arrangement preferably further comprises a connector sealing element for sealing in the area of a temperature regulation medium inlet of a battery temperature regulation module and/or in the area of a temperature regulation medium outlet of a battery temperature regulation module.

Preferably, the sealing elements each comprise a sealing main body and a sealing lip which extends away from the sealing main body.

It may be expedient for the sealing elements to extend at least approximately along a plane, in particular along a plane that is arranged perpendicularly to a connecting plane of a battery temperature regulation module and/or of the battery temperature regulation device.

In particular, the connector sealing element of the sealing element arrangement is connected in one piece manner to a sealing element, in particular to a sealing element that is arranged on the main body or on an additional body.

The connector sealing element preferably comprises an inlet sealing region and/or an outlet sealing region.

In particular, the inlet sealing region comprises a sealing lip that is closed in ring-like manner.

Furthermore, it may be expedient for the outlet sealing region to comprise a sealing lip that is closed in ring-like manner.

The sealing lip of the inlet sealing region that is closed in ring-like manner is preferably at least approximately circular.

The sealing lip of the outlet sealing region that is closed in ring-like manner is preferably constructed such as to be at least approximately oblong and to comprise in particular two semicircular ends and two mutually parallel sealing sections which interconnect the semicircular ends.

The sealing lips of the connector sealing element in the inlet sealing region and/or in the outlet sealing region preferably respectively extend away from the main body or away from an additional body.

It may be expedient for the inlet sealing region and the outlet sealing region of the connector sealing element to be connected to one another by means of a web region.

The connector sealing element is preferably connected in the web region in one piece manner to a sealing element that is arranged on the main body or on an additional body.

In one configuration of the battery temperature regulation device, provision is made for each battery temperature regulation module to comprise a temperature regulation medium inlet and/or one or more temperature regulation medium outlets, wherein the temperature regulation medium inlet and/or the one or more temperature regulation medium outlets are arranged on the main body and/or on the one or more additional bodies.

The temperature regulation medium is preferably feedable to a temperature regulation circulation system of a battery temperature regulation module by means of the temperature regulation medium inlet.

The temperature regulation medium is preferably removable from a temperature regulation circulation system of a battery temperature regulation module by means of the one or more temperature regulation medium outlets.

Preferably, the temperature regulation medium inlet and/or the one or more temperature regulation medium outlets are constructed in one piece with the main body and/or an additional body or are incorporated into them.

It may be expedient for the temperature regulation medium inlet and/or the one or more temperature regulation medium outlets to each comprise a through opening in an outer wall element of the main body or of an additional body or in a cover plate of the main body and/or to be constituted thereby.

A through opening of the temperature regulation medium inlet preferably opens out into a temperature regulation medium inlet region of a temperature regulation circulation system of a battery temperature regulation module.

The one or more through openings of the one or more temperature regulation medium outlets preferably open out into a temperature regulation medium outlet region of a temperature regulation circulation system of a battery temperature regulation module.

The connector sealing element is preferably arranged in a receiving groove of the main body.

Preferably, the inlet sealing region of the connector sealing element surrounds the temperature regulation medium inlet.

It may be expedient for the temperature regulation medium inlet and a temperature regulation medium outlet to be arranged mirror-symmetrically with respect to a plane of symmetry.

Preferably, the fixing projection is arranged at least approximately in the region of the plane of symmetry.

In particular, the main body comprises a longitudinal slot into which the temperature regulation medium outlet preferably opens out, in particular, in an upper region of the longitudinal slot taken with respect to the direction of the force of gravity.

Preferably, the outlet sealing region of the connector sealing element surrounds the longitudinal slot.

The temperature regulation medium discharge line preferably comprises one or more longitudinal slots which, when a temperature regulation medium discharge line is arranged on a battery temperature regulation module, overlap with the longitudinal slot of the main body of a battery temperature regulation module in such a manner that the longitudinal slot of the main body and the longitudinal slot of the temperature regulation medium discharge line bound a temperature regulation medium channel.

It may be expedient for the temperature regulation medium supply line to comprise one or more sealing surfaces, wherein each sealing surface is adapted to be placed on and/or pressed in sealing manner onto a sealing lip in the inlet sealing region of a connector sealing element.

Preferably thereby, a temperature regulation medium can be supplied in particular to a temperature regulation circulation system of each battery temperature regulation module by way of the temperature regulation medium inlet through the temperature regulation medium supply line and the feed-in connector thereof.

Preferably, the temperature regulation medium discharge line comprises one or more sealing surfaces, wherein in particular each sealing surface is adapted to be placed on and/or pressed in sealing manner onto a sealing lip in the outlet sealing region of a connector sealing element.

The one or more sealing surfaces of the temperature regulation medium discharge line preferably surround a respective longitudinal slot of the temperature regulation medium discharge line, in particular completely.

Consequently, it may be expedient if each sealing surface of the temperature regulation medium discharge line is adapted to be placed on and/or pressed in sealing manner onto a sealing lip in the outlet region of a connector sealing element.

The main body and/or an additional body preferably comprise a supporting element, in particular a supporting rib element for supporting the temperature regulation medium discharge line which is arranged underneath the longitudinal slot or below a fixing projection in the direction of the force of gravity.

Preferably, due to the provision of the supporting element, a sealing surface surrounding the longitudinal slot of the temperature regulation medium discharge line can be pressed evenly against the sealing lip of the connector sealing element in the outlet sealing region when the temperature regulation medium discharge line is arranged on the main body.

In particular thereby, a temperature regulation medium from the temperature regulation medium outlet of each one of the battery temperature regulation modules can preferably be removed from a temperature regulation circulation system through the temperature regulation medium discharge line and the discharge connector thereof.

In one configuration of the battery temperature regulation device, provision is made for the main body and/or the one or more additional bodies to be components of plastics material, in particular injection moulded components.

It may be expedient for the main body and/or the one or more additional bodies to be one piece components of plastics material, in particular one piece injection moulded components.

The main body and/or the one or more additional bodies are preferably made from a mouldable plastics material, for example, from a thermosetting or thermoplastic plastics material.

In one configuration of the battery temperature regulation device, provision is made for the sealing elements of the sealing element arrangement to be components of plastics material, in particular injection moulded components that are moulded onto the main body and/or onto the one or more additional bodies.

The one or more sealing elements are preferably made of a sealing material.

In particular, the sealing material is a flexible plastics material, in particular a mouldable plastics material, for example a mouldable elastomer material.

Sealing elements of the sealing element arrangement are preferably connected to the main body and/or to the one or more additional bodies of a battery temperature regulation module by a substance-to-substance bond.

It may be expedient for the sealing elements of the sealing element arrangement to be moulded onto the main body and/or onto the one or more additional bodies in an injection moulding process, in particular in a two-component injection moulding process.

In one configuration of the battery temperature regulation device, provision is made for the main body and/or the one or more additional bodies to be moulded with a sealing material of a sealing element at least in portions thereof.

In particular, a connector sealing element which is arranged on an outer surface of the main body and/or of an additional body is connected in one piece manner to a sealing element which is arranged on an inner surface of the main body.

In the context of this description and the accompanying Claims, an outer surface of the main body or of an additional body is preferably to be understood as being a side that is remote from the inner surface of the main body and/or of an additional body.

In particular, the outer surface of the main body and the inner surface of the main body are located on mutually remote sides of an outer wall element of the main body.

Preferably, the one or more sealing elements each comprise a sealing main body and one or more sealing lips which in particular are closed in ring-like manner.

It may be expedient for the one or more sealing elements to comprise one or more sealing lips for the purposes of sealing in the area of a respective receiving opening of the main body and/or of each additional body.

Preferably, each sealing element comprises a plurality of receiving openings for receiving battery cells and/or for feeding battery cells therethrough in sealing manner. Thereby, the receiving openings of the sealing elements are preferably through openings.

It may be expedient for a sealing lip of the one or more sealing elements that is closed in ring-like manner to extend away from the sealing main body in a radial direction taken with reference to a longitudinal central axis of the receiving openings, in particular radially inwardly taken with reference to a longitudinal central axis of the receiving openings of a sealing element.

Consequently, reliable sealing of the battery temperature regulation modules in relation to the surroundings thereof on the one hand and a reliable seal between a temperature regulation medium inlet region and a temperature regulation medium outlet region of a temperature regulation circulation system of a battery temperature regulation module on the other hand can preferably be achieved.

In one configuration of the battery temperature regulation device, provision is made for each battery temperature regulation module to comprise one or more positioning projections which are arranged on the one or more additional bodies and/or on the main body and by means of which the one or more additional bodies are positioned or are positionable relative to the main body.

Positioning projections arranged on the main body and/or on the one or more additional bodies are preferably constructed in one piece with the main body and/or with the one or more additional bodies.

In one configuration of the battery temperature regulation device, the positioning projections are arranged on the main body. The positioning projections that are arranged on the main body are, in particular, in the form of guidance ribs.

Preferably, an additional body of a battery temperature regulation module is inserted into or is insertable into a main body of a battery temperature regulation module in an insertion direction, in particular, in an insertion direction running perpendicularly to a connecting direction of a plurality of battery temperature regulation modules.

It may be expedient for the positioning projections, in particular the guidance ribs, to run at least approximately parallel to an insertion direction in which an additional body of a battery temperature regulation module is inserted into or is insertable into the main body of a battery temperature regulation module.

Furthermore, it may be expedient for a plurality of pairs of positioning projections, in particular a plurality of pairs of guidance ribs, to be arranged on the main body.

For example, provision may be made for separator plates of an additional body to be received or receivable between a respective pair of positioning projections, in particular between a pair of guidance ribs.

The positioning projections are preferably constructed such as to be at least approximately cylindrical.

Furthermore, it may be expedient for one or more additional bodies to each comprise a cover plate which comprises one or more receiving openings as well as a framework element which extends away from the cover plate and in particular is closed in ring-like manner.

Preferably, the stability of the one or more additional bodies can be increased by the provision of the framework element. If a battery temperature regulation module comprises two additional bodies of this type, the additional bodies preferably form end bodies.

It may be expedient in particular for the positioning projections to be arranged on a cover plate of the additional bodies.

Furthermore, it may be expedient for a plurality of rows of positioning projections to be arranged on the additional bodies.

It may be particularly expedient for a plurality of positioning projections to be arranged alternately above and/or below an imaginary line.

Preferably thereby, two rows of positioning projections for example may be arranged such as to be offset one above the other.

Preferably, the alternately arranged positioning projections can grip a partition wall element of the main body for the purposes of positioning an additional body relative to the main body.

It may be expedient for each of the sealing elements that are arranged on an additional body to be placed on the positioning projections and/or for the positioning projections to be moulded with sealing material of the sealing elements.

If two additional bodies which in particular form end bodies are arranged on mutually remote sides of the main body by means of the positioning projections, the main body preferably forms a central body.

In one configuration of the battery temperature regulation device, provision is made for the main body to be connected to the one or to more additional bodies by a substance-to-substance bond.

It may be expedient for the main body to be welded to a respective additional body, in particular in a welding region that is closed in ring-like manner.

In one configuration of the battery temperature regulation device, provision is made for a plurality of battery temperature regulation modules to be connectible to one another and in particular clamped against each other, in a connecting direction, and/or for an additional body of a battery temperature regulation module to be connected or connectible to the main body, in particular to be inserted into or be insertable into the main body, transversely and in particular perpendicularly to a connecting direction of a plurality of battery temperature regulation modules.

Furthermore, it may be expedient for the main body and two additional bodies of a battery temperature regulation module that are arranged on or are arrangeable on the main body to be connected to one another or to be connectible to one another, in particular to be clamped against each other parallel to the connecting direction.

It may be expedient for the main body to be connectible to two additional bodies in shape-locking and/or force-locking manner.

In particular, the two additional bodies are clippable to the main body.

Preferably, each battery temperature regulation module comprises a latching device by means of which the two additional bodies are connectible to the main body in positive manner and in particular are clippable to the main body.

Preferably, the two additional bodies can be held firmly on the main body in a pre-assembly position by means of the latching device.

The latching devices preferably each comprise latching projections that are arranged on an additional body and a latching receptacle that is arranged on the additional body, in particular on a separator plate of the additional body.

In particular, the latching receptacle is a through opening in a separator plate of the main body.

The two additional bodies preferably each comprise a plurality of supporting projections which are arranged on a side of the additional bodies that is remote from the main body.

The supporting projections preferably have an at least approximately cross-shaped cross section.

The supporting projections preferably extend parallel to a connecting direction of the battery temperature regulation device and/or of a battery temperature regulation module.

A free end of the supporting projections is preferably arranged in a plane with contact surfaces of the two additional bodies that are arranged in the area of feed-through openings of the two additional bodies.

For the purposes of feeding through a connecting element, it may be expedient for the main body and/or the one or more additional bodies to each comprise one or more feed-through openings which are preferably arranged such as to be coaxial with each other when the additional bodies are arranged on the main body.

Consequently, the main body can preferably be screwed and/or clamped to the one or more additional bodies in the connecting direction by means of feed-through openings that are arranged to be mutually coaxial, for example, by feeding through a connecting element such as a tie rod for example.

As an alternative or in addition thereto, a plurality of battery temperature regulation modules can be screwed and/or clamped to each other by means of feed-through openings that are arranged to be mutually coaxial, for example, by means of connecting elements that are passed through the feed-through openings.

Preferably, the main body and/or the one or more additional bodies each comprise a plurality of, preferably three to ten, in particular four, feed-through openings.

It may be expedient for the main body and/or the one or more additional bodies to each comprise contact surfaces which are arranged on the main body and/or on each one of the additional bodies in the region of a respective feed-through opening, in particular on a side of the one or more additional bodies that is remote from the main body.

Preferably, the contact surfaces are arranged to be at least approximately perpendicular to a connecting direction of the battery temperature regulation device and/or of a battery temperature regulation module.

The contact surfaces are preferably constructed such as to be at least approximately flat.

It may be expedient for contact surfaces that are arranged on an additional body and/or a free end of supporting projections that are arranged on an additional body to each be arranged in a common plane.

In one configuration of the battery temperature regulation device provision is made for an additional body of a battery temperature regulation module to be received or receivable in the main body of the battery temperature regulation module, in particular to be inserted into or be insertable into the main body of the battery temperature regulation module.

The additional body is preferably received or receivable in the main body to at least a partial extent, in particular at least approximately in its entirety.

It may be expedient for the main body to be constructed such as to be substantially box shaped.

In particular, the main body forms a receiving box in which the additional body is at least partly and in particular at least approximately entirely received or receivable.

The main body and in particular the receiving box is preferably constructed such as to be open on at least one side.

It may be expedient for the main body and in particular the receiving box to be closed or closable by receipt of the additional body, in particular, by inserting the additional body into the main body or the receiving box, in particular, by receipt of the additional body in the main body.

The main body and in particular the receiving box preferably comprises two cover plates in which the one or more receiving openings of the main body are arranged for the purposes of receiving battery cells.

It may be expedient for the main body to comprise an outer wall element which connects the two cover plates to one another;

The outer wall element of the main body extends preferably transversely and in particular at least approximately perpendicularly away from the two cover plates.

It may be expedient for the outer wall element and the two cover plates to form a receiving box for the additional body;

The outer wall element closes off the main body in a peripheral direction preferably on at least three sides.

It may be expedient if an additional body accommodated in the main body closes off the main body, in particular by means of an outer wall element of the additional body.

In one configuration of the battery temperature regulation device, provision is made for each battery temperature regulation module to comprise a main body and an additional body which is received or receivable in the main body to at least a partial extent and in particular at least approximately in its entirety.

In one configuration of the battery temperature regulation device provision is made for the main body of a respective battery temperature regulation module to comprise the following:

two cover plates into which the receiving openings of the main body are incorporated for the purposes of receiving battery cells, wherein the two cover plates are arranged in particular such as to be at least approximately parallel to each other; and/or an outer wall element which connects two cover plates of the main body to one another; and/or one or more temperature regulation medium outlets.

It may be expedient for the one or more temperature regulation medium outlets to be incorporated into one or both cover plates of the main body in an upper region taken with reference to the direction of the force of gravity.

Preferably thereby, the temperature regulation medium outlets are through openings in the one or in both cover plates of the main body.

In particular, the temperature regulation medium inlet is incorporated into an outer wall element of the additional body.

It may be expedient for the temperature regulation medium inlet to comprise or constitute a through opening in an outer wall element of the additional body.

In one configuration of the battery temperature regulation device provision is made for an additional body of a respective battery temperature regulation module to comprise the following:

two separator plates which in particular are arranged such as to be at least approximately parallel to each other; and/or an outer wall element which is arranged such as to be transverse and in particular at least approximately perpendicular to separator plates of the additional body; and/or one or more partition wall elements which extend away from separator plates of the additional body and which bound respective channel sections of a temperature regulation channel; and/or a temperature regulation medium inlet.

The two separator plates of the additional body, an outer wall element of the additional body and/or an outer wall element of the main body preferably bound a temperature regulation medium inlet region.

It may be expedient for the temperature regulation medium inlet region to be arranged substantially between the two separator plates of the additional body.

A separator plate of the additional body, a cover plate of the main body, an outer wall element of the additional body and/or an outer wall element of the main body preferably bound a respective temperature regulation medium outlet region.

Furthermore, it may be expedient for the temperature regulation medium outlet region to be arranged substantially between a separator plate of the additional body and a cover plate of the main body.

The partition wall elements of the additional body extend away preferably transversely, in particular at least approximately perpendicularly, from a respective separator plate of the additional body.

In particular, the temperature regulation medium inlet is incorporated into an outer wall element of the additional body.

It may be expedient for the temperature regulation medium inlet to comprise or form a through opening in an outer wall element of the additional body.

In one configuration of the battery temperature regulation device, provision is preferably made for the main body to comprise the following:

a separator plate into which the receiving openings of the main body are incorporated for the purposes of receiving battery cells; and/or two outer wall elements that are arranged on mutually remote sides of a separator plate; and/or partition wall elements which are arranged on mutually remote sides of a separator plate and bound respective channel sections of a temperature regulation channel.

The main body of a battery temperature regulation module preferably comprises an at least approximately flat separator plate into which, in particular, the receiving openings of the main body are incorporated for the purposes of receiving battery cells.

The main body preferably comprises one or more outer wall elements and/or one or more partition wall elements.

In particular, the separator plate forms a base element on which outer wall elements and/or partition wall elements of the main body are arranged.

The main body preferably comprises an outer wall element which extends away from the separator plate and in particular is closed in ring-like manner, and which bounds the temperature regulation medium inlet region together with an additional body that is arranged on the main body.

Furthermore, the main body preferably comprises an outer wall element which extends away from the separator plate and in particular is closed in ring-like manner, and which bounds the temperature regulation medium outlet region together with an additional body that is arranged on the main body.

It may be expedient for the main body to comprise two outer wall elements which are arranged on mutually remote sides of the separator plate.

Furthermore, it may be expedient for the main body to comprise one or more partition wall elements which bound respective channel sections of the temperature regulation channel.

Preferably thereby, the main body comprises partition wall elements which are arranged on mutually remote sides of the separator plate.

The outer wall elements and/or partition wall elements of the main body comprise in a main direction of extent thereof, in particular in a connecting direction of a battery temperature regulation module and/or a connecting direction of the battery temperature regulation device, a sealing projection which extends away from the respective outer wall element and/or from the respective partition wall element.

In a connected state of the battery temperature regulation module and/or of the battery temperature regulation device, it may be expedient for the sealing projections of the one or more outer wall elements and/or of the one or more partition wall elements to abut in sealing manner on a sealing element, in particular on a sealing main body of a sealing element.

In particular thereby, the sealing projections of the one or of more outer wall elements and/or of the one or more partition wall elements flexibly deform a sealing main body of the sealing elements at least in areas thereof.

It may be expedient for a sealing projection that is arranged on an outer wall element to be closed in ring-like manner.

Sealing projections arranged on the partition wall elements are preferably constructed in web-like manner and/or rib-like manner and extend, preferably at least approximately in their entirety, along a length of the partition wall elements.

The sealing projections preferably have a rounded-off cross section, in particular a cross section having at least an approximately semi-circular shape.

In an operational state of the battery temperature regulation device, the partition wall elements are preferably arranged such as to be at least approximately horizontal.

Preferably, the partition wall elements are arranged in such a manner that the temperature regulation channel runs in a meandering manner.

The partition wall elements are preferably each connected on one side to an outer wall element of the main body that is closed in ring-like manner.

It may be expedient for the partition wall elements to be arranged such as to be spaced from the outer wall element of the main body on a side which is remote from a side that is connected to the outer wall element of the main body.

The partition wall elements are preferably at least approximately undulating in a cross section of the main body taken perpendicularly to a connecting direction of the battery temperature regulation device and/or of a battery temperature regulation module.

Preferably, the partition wall elements can extend at least in regions thereof into intermediate spaces between the receiving openings.

In particular, the wave peaks and/or wave troughs of the undulating partition wall elements are arranged between receiving openings of the main body, in particular, between receiving openings incorporated into the separator plate of the main body.

Preferably thereby, the effect can be achieved that individual battery temperature regulation modules can be manufactured comparatively compactly, particularly as a wave shape of the partition wall elements is matched to an arrangement of the receiving openings.

In particular, a connecting direction of the battery temperature regulation device and/or of a battery temperature regulation module runs at least approximately perpendicularly to a separator plate of the main body.

In one configuration of the battery temperature regulation device, provision is made for a first additional body that is arranged on the main body and the main body to bound a temperature regulation medium inlet region and/or for a second additional body that is arranged on the main body and the main body to bound a temperature regulation medium outlet region.

The main body preferably comprises a separator plate which separates the temperature regulation medium inlet region from the temperature regulation medium outlet region, particularly when battery cells are arranged in the receiving openings of the main body.

It may be expedient for the temperature regulation medium inlet region to be connected in fluid conveying manner to the temperature regulation medium outlet region.

Preferably, a through opening which is incorporated into a separator plate of the main body is provided for the fluidic connection of the temperature regulation medium inlet region to the temperature regulation medium outlet region.

Furthermore, it may be expedient for through openings which are incorporated into separator plates of an additional body to be provided for the fluidic connection of the temperature regulation medium inlet region to the temperature regulation medium outlet regions.

The through opening for the fluidic connection of the temperature regulation medium inlet region to a temperature regulation medium outlet region that is incorporated into the separator plate is preferably not constructed such as to accommodate a battery cell.

Preferably, the through opening is arranged between two receiving openings that are provided for receiving battery cells and in particular connects the receiving openings to one another.

In one configuration of the battery temperature regulation device, provision is made for the battery temperature regulation device to comprise a receiving housing for receiving one or more and in particular all of the battery temperature regulation modules of the battery temperature regulation device.

It may be expedient for the receiving housing to comprise a temperature regulation medium collecting region there is collectable a temperature regulation medium emerging from the battery temperature regulation modules, in particular from the temperature regulation medium outlets of the battery temperature regulation modules.

Preferably, the battery temperature regulation device comprises a temperature regulation medium discharge line by means of which a temperature regulation medium is removable from the temperature regulation medium collecting region of the receiving housing.

The receiving housing is preferably constructed in multipart form, in particular in at least two-piece form.

It may be expedient for the receiving housing to comprise an upper receiving housing part and a lower receiving housing part.

The upper receiving housing part and the lower receiving housing part are preferably connected or are connectible to one another in fluid-tight manner.

Preferably, the temperature regulation medium collecting region is arranged in the lower receiving housing part.

Preferably, individual ones, in particular all, of the battery temperature regulation modules of the battery temperature regulation device are connected or are connectible to the receiving housing in positive—and/or force-locking manner.

It may be expedient for each battery temperature regulation module to comprise a mounting section by means of which the battery temperature regulation module is connectible, to the receiving housing in positive—and/or force-locking manner, in particular is adapted to be screwed thereto.

In particular, provision may be made for the receiving housing to comprise one or more positioning ribs for the purposes of positioning battery temperature regulation modules in the receiving housing.

It may be expedient for each battery temperature regulation module to be positioned or be positionable in a horizontal direction between two positioning ribs.

In particular, in the context of this description and the accompanying Claims, a horizontal direction is to be understood as a direction running perpendicularly to the direction of the force of gravity, particularly in a state of usage of the battery temperature regulation device.

Preferably, positioning ribs of the receiving housing project from a receiving housing wall in the direction of an interior space of the receiving housing.

The battery temperature regulation device in accordance with the invention is suitable in particular for use in a vehicle.

Consequently, the present invention further relates to a vehicle, in particular an electric vehicle, wherein the vehicle comprises a battery temperature regulation device in accordance with the invention.

Preferably, the battery cells of a vehicle and in particular of an electric vehicle can be kept at a moderate temperature and in particular cooled or heated by means of the battery temperature regulation device.

Preferably, the number of the battery cells can be increased or reduced by adaptation of the number of battery temperature regulation modules of the battery temperature regulation device and thus an adjustment in the size of the battery temperature regulation device to match the power of an electrical drive motor of a vehicle and in particular of an electric vehicle is made possible.

The vehicle in accordance with the invention preferably exhibits individual ones or a plurality of the features and/or advantages described in connection with the battery temperature regulation device in accordance with the invention.

Furthermore, the present invention relates to a method for producing a battery temperature regulation device, in particular for manufacturing a battery temperature regulation device in accordance with the invention.

Consequently, the further object of the present invention is to provide a method for producing a battery temperature regulation device which enables a reliable seal to be achieved and by means of which a battery temperature regulation device is producible easily and economically.

In accordance with the invention, this object is achieved by a method for producing a battery temperature regulation device incorporating the features of claim 19.

The method for producing a battery temperature regulation device, in particular a battery temperature regulation device in accordance with the invention, preferably comprises the following:
producing one or more battery temperature regulation modules, wherein each battery temperature regulation module comprises a main body and/or one or a plurality of additional bodies that are arranged on and/or are arrangeable on the main body, wherein the main body and/or the one or more additional bodies are produced in an injection moulding process from a mouldable plastics material;

moulding sealing elements of a sealing element arrangement from a sealing material onto the main body and/or onto the one or more additional bodies in an injection moulding process.

Preferably, the main body and/or the one or more additional bodies and the sealing elements of the sealing element arrangement are manufactured in a two-component injection moulding process.

It may be expedient for a plurality of battery temperature regulation modules to be connected to one another, in particular in a connecting direction.

Preferably, a plurality of battery temperature regulation modules that are connected to one another and/or a receiving housing in which a plurality of interconnected battery temperature regulation modules are accommodated or are receivable form a battery temperature regulation device.

Furthermore, it may be expedient for the main body and the one or more additional bodies that are arranged on the main body to be connected to one another by a substance-to-substance bond.

Preferably, the main body and the one or more additional bodies are welded and in particular laser-welded to one another.

The method in accordance with the invention for producing a battery temperature regulation device preferably exhibits individual ones or a plurality of the features and/or advantages described in connection with the battery temperature regulation device in accordance with the invention and the vehicle in accordance with the invention.

Further features and/or advantages of the invention form the subject matter of the following description and the graphical illustration of exemplary embodiments.

DETAILED DESCRIPTION

Similar or functionally equivalent elements are provided with the same reference symbols in all of the Figures.

FIGS. 1 to 20 show an exemplary embodiment of a battery temperature regulation device for the temperature regulation of battery cells, i.e. in particular for cooling and/or heating battery cells which is designated as a whole by 100.

The battery temperature regulation device 100 preferably comprises a plurality of battery temperature regulation modules 102.

Preferably, the battery cells of a vehicle 104, in particular of an electric vehicle 106, can be kept at a moderate temperature by means of the battery temperature regulation device 100.

Preferably, by adaptation of the number of battery temperature regulation modules 102 of the battery temperature regulation device 100, the number of battery cells can be increased or reduced thereby enabling the size of the battery temperature regulation device 100 to be matched to the performance of an electrical drive motor of the vehicle 104.

Figure 1:
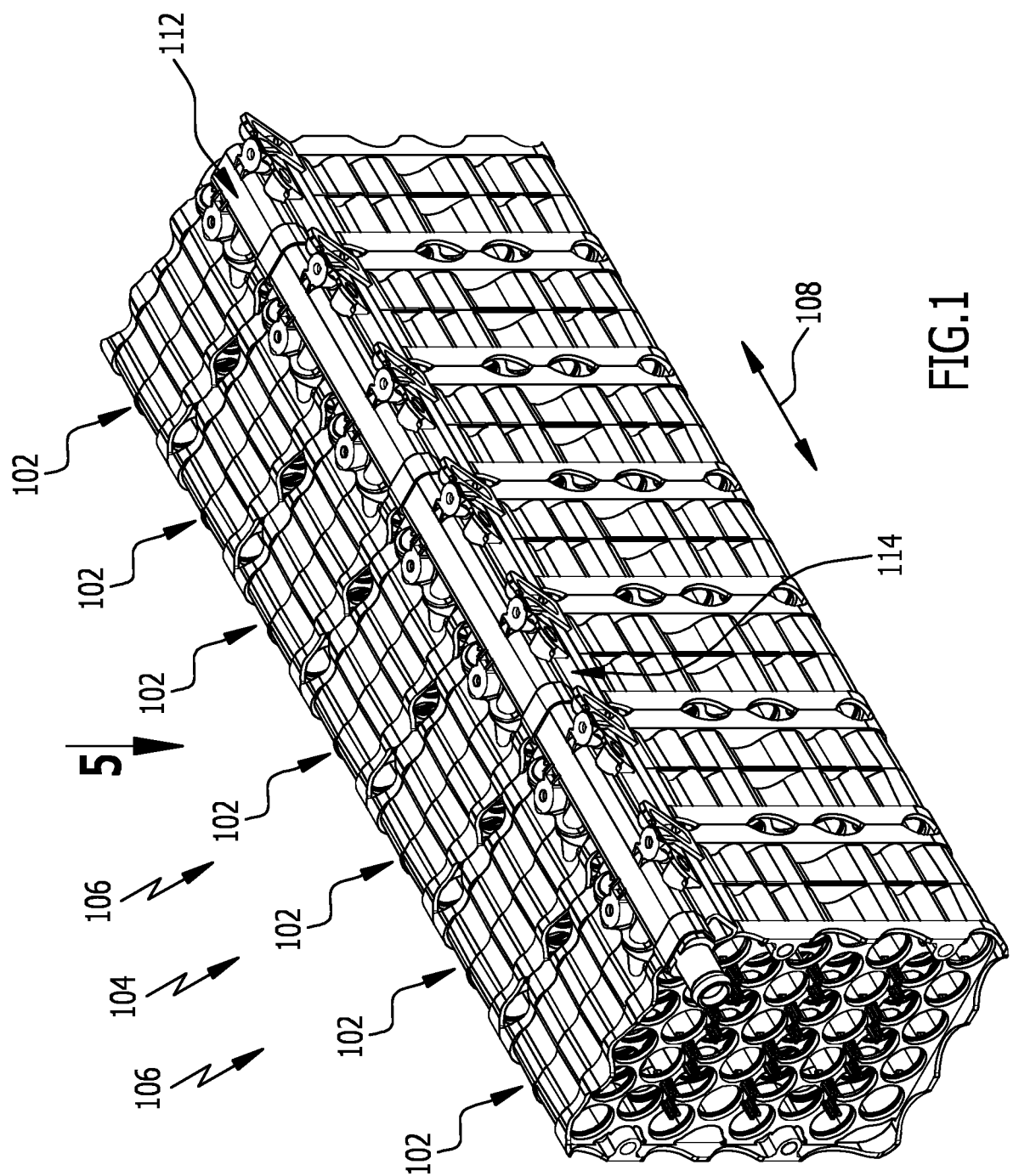
FIG. 1 shows a schematic perspective illustration of an exemplary embodiment of a battery temperature regulation device.
Figure 2:
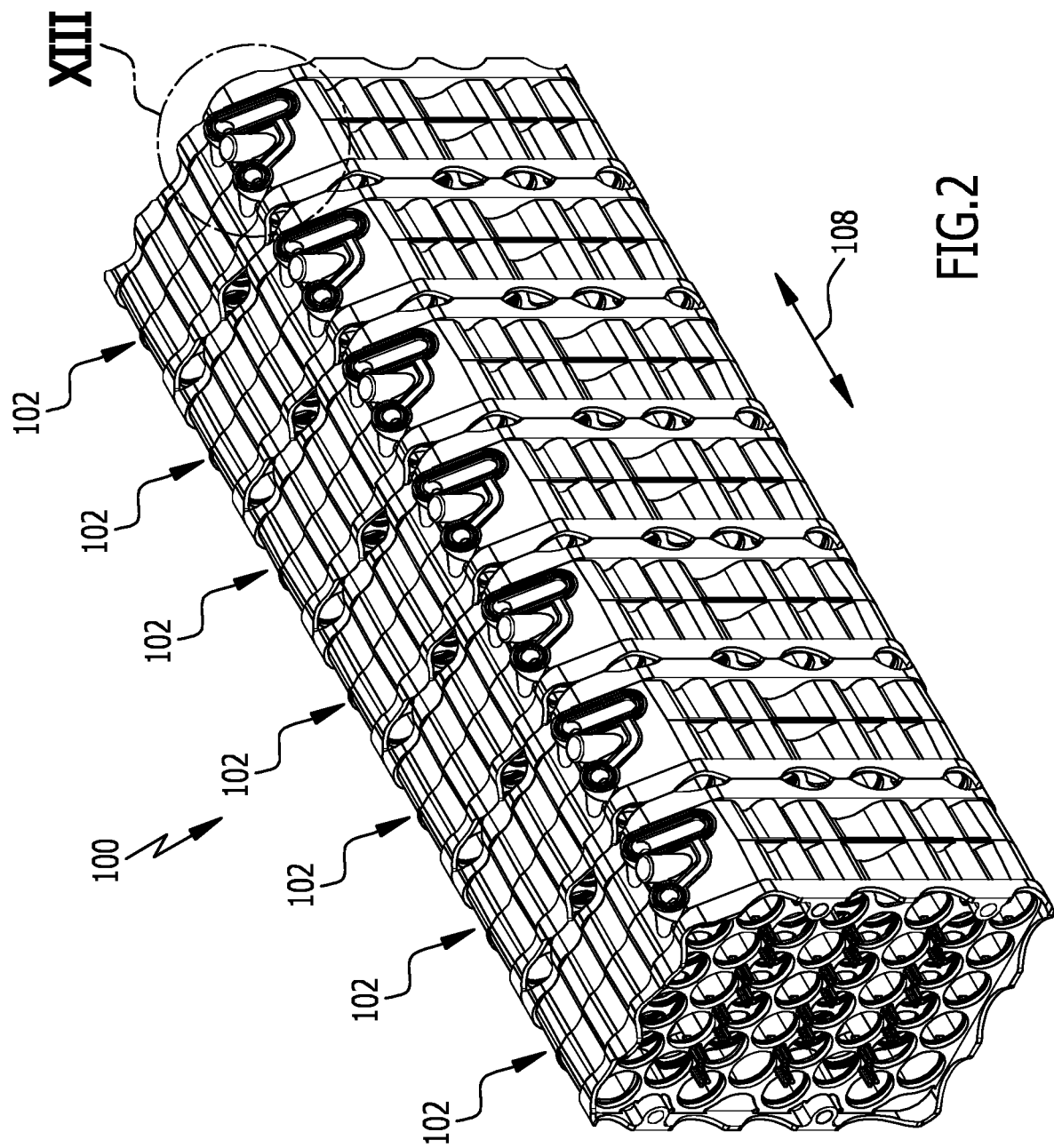
FIG. 2 a schematic perspective illustration of battery temperature regulation modules of the battery temperature regulation device depicted in FIG. 1.

In the case of the battery temperature regulation device 100 illustrated in FIG. 1, there are overall seven battery temperature regulation modules 102 connected to one another along a connecting direction 108.

However, it is also conceivable for the battery temperature regulation device 100 to comprise less than seven or more than seven battery temperature regulation modules 102.

Figure 6:
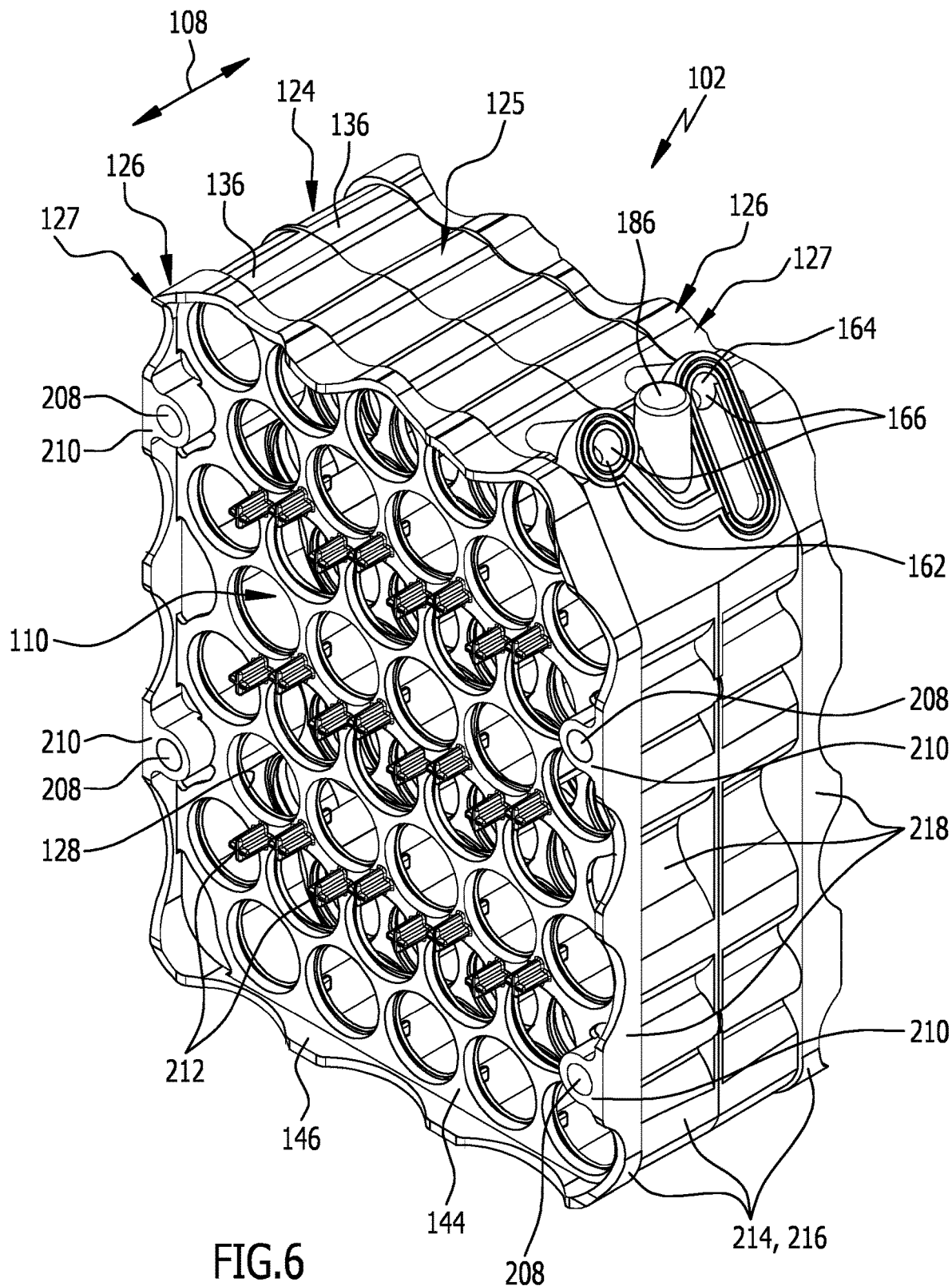
FIG. 6 a schematic perspective illustration of a battery temperature regulation module of the battery temperature regulation device depicted in FIG. 1 from the front.
Figure 7:
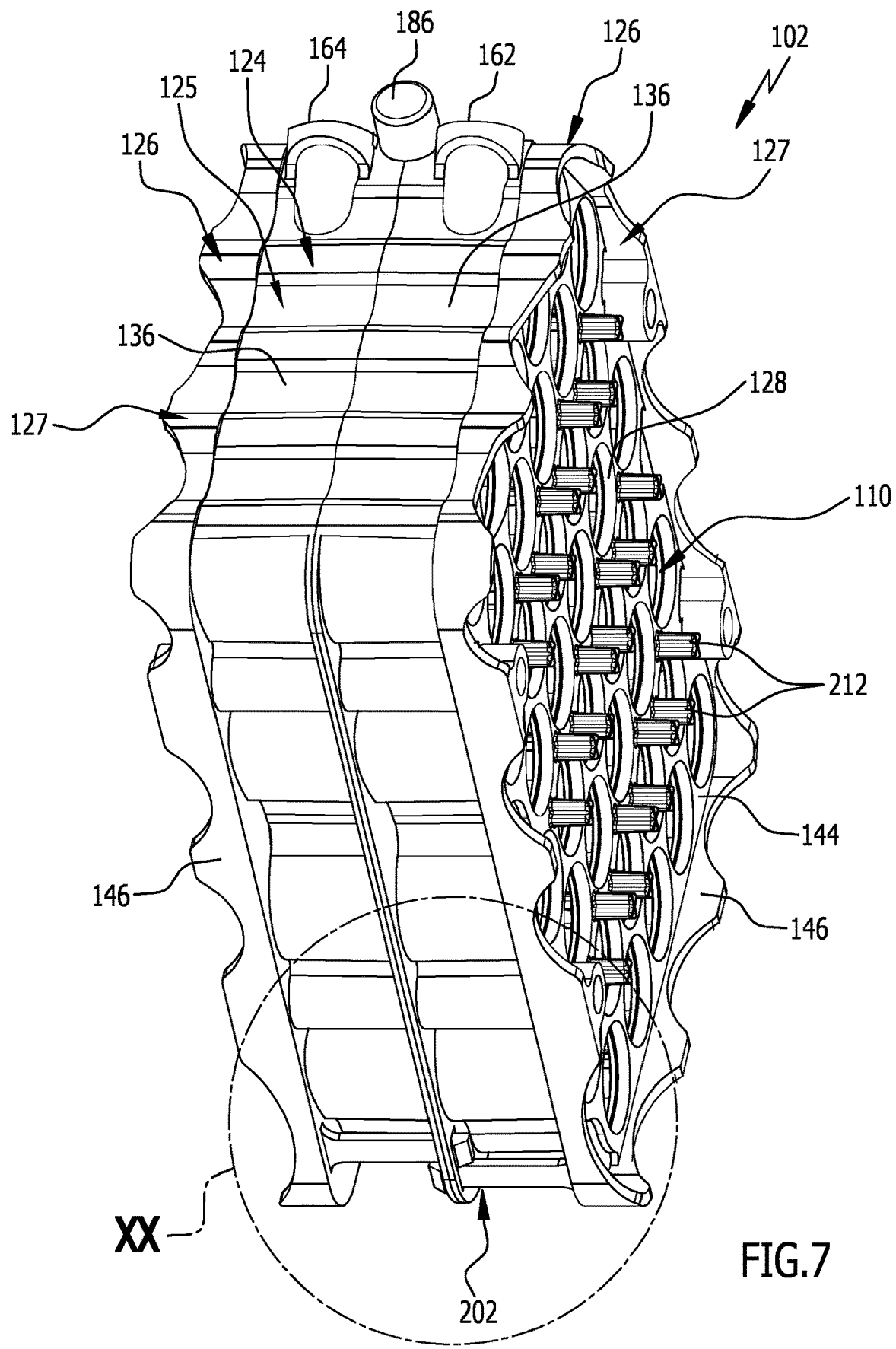
FIG. 7 a schematic perspective illustration of a battery temperature regulation module of the battery temperature regulation device depicted in FIG. 1 from the rear.

Each battery temperature regulation module 102 preferably comprises a temperature regulation circulation system 110 for a temperature regulation medium, for example for water (c.f. FIGS. 6 and 7).

The battery temperature regulation device 100 preferably comprises a temperature regulation medium supply line 112 for feeding a temperature regulation medium into a respective temperature regulation circulation system 110 of one or more battery temperature regulation modules 102.

Furthermore, the battery temperature regulation device 100 preferably comprises a temperature regulation medium discharge line 114 for removing a temperature regulation medium from a respective temperature regulation circulation system 110 of one or more battery temperature regulation modules 102.

For reasons of clarity, battery temperature regulation modules 102 are illustrated in FIG. 1 on only one side of the temperature regulation medium supply line 112 and/or the temperature regulation medium discharge line 114.

In principle however, it is also conceivable for two rows of battery temperature regulation modules 102 to be arranged next to each other transverse to the connecting direction, wherein a temperature regulation medium is preferably feedable by means of the temperature regulation medium supply line 112 to all the temperature regulation circulation systems 110 of the battery temperature regulation modules 102 in both rows.

Preferably, the temperature regulation medium is removable by means of the temperature regulation medium discharge line of 114 from all of the temperature regulation circulation systems 110 of the battery temperature regulation modules in both rows.

A temperature regulation medium is preferably feedable by means of the temperature regulation medium supply line 112 to all of the battery temperature regulation modules 102 of the battery temperature regulation device 100, wherein the temperature regulation medium is removable from all of the battery temperature regulation modules 102 of the battery temperature regulation device 100 by means of the temperature regulation medium discharge line 114.

Preferably, a temperature regulation medium is feedable by means of the temperature regulation medium supply line 112 to the respective temperature regulation circulation system 110 of all the battery temperature regulation modules 102 of the battery temperature regulation device 100.

Furthermore, it may be expedient for the temperature regulation medium to be removable from the respective temperature regulation circulation systems 110 of all the battery temperature regulation modules 102 by means of the temperature regulation medium discharge line 114.

The temperature regulation medium supply line 112 and/or the temperature regulation medium discharge line 114 are preferably of modular construction.

Preferably thereby, the length of the temperature regulation medium supply line 112 and/or the length of the temperature regulation medium discharge line 114 is adaptable to the number of battery temperature regulation modules 102 of the battery temperature regulation device 100.

Figure 4:
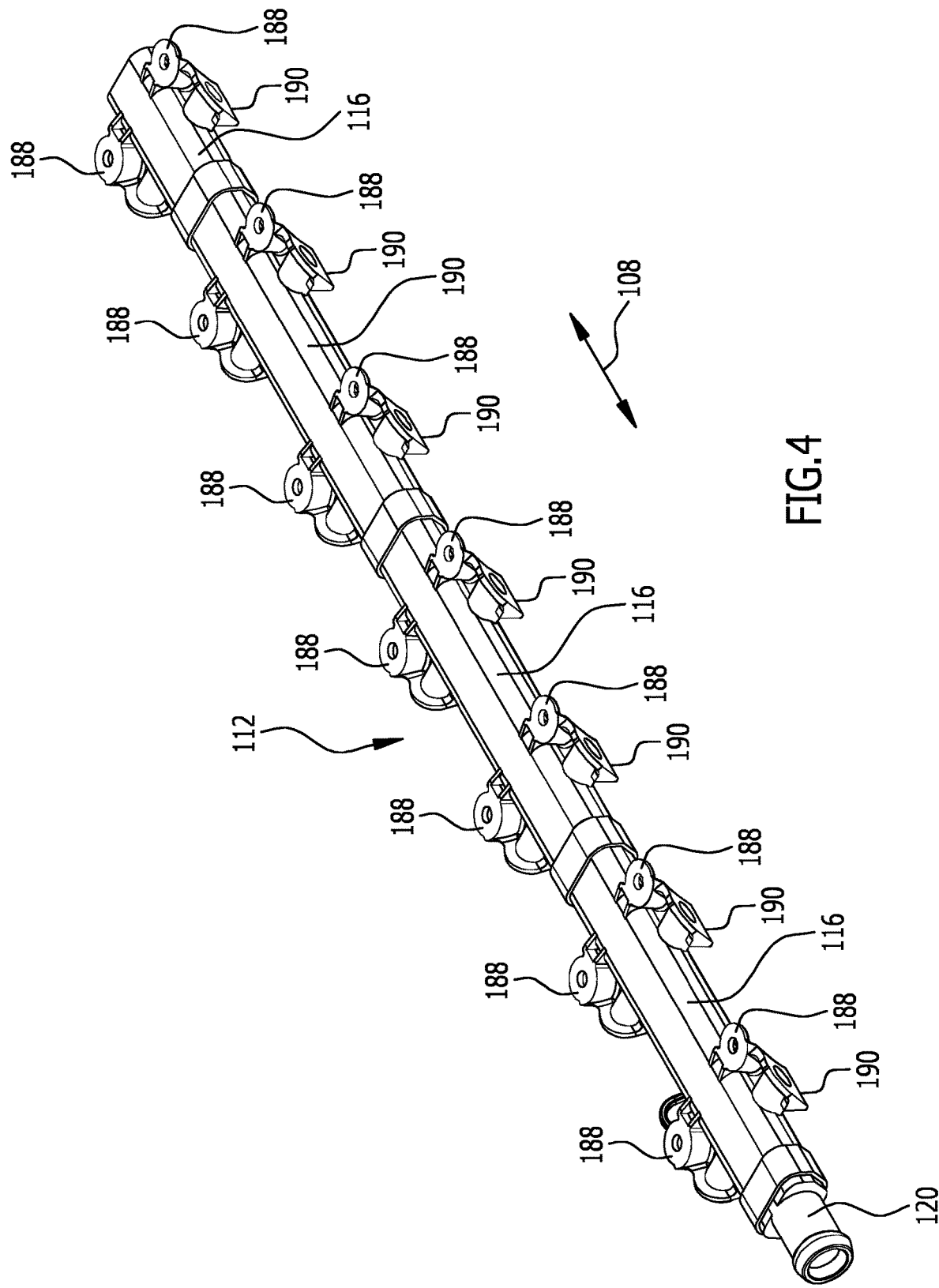
FIG. 4 a schematic perspective illustration of the temperature regulation medium supply line depicted in FIG. 3.
Figure 5:
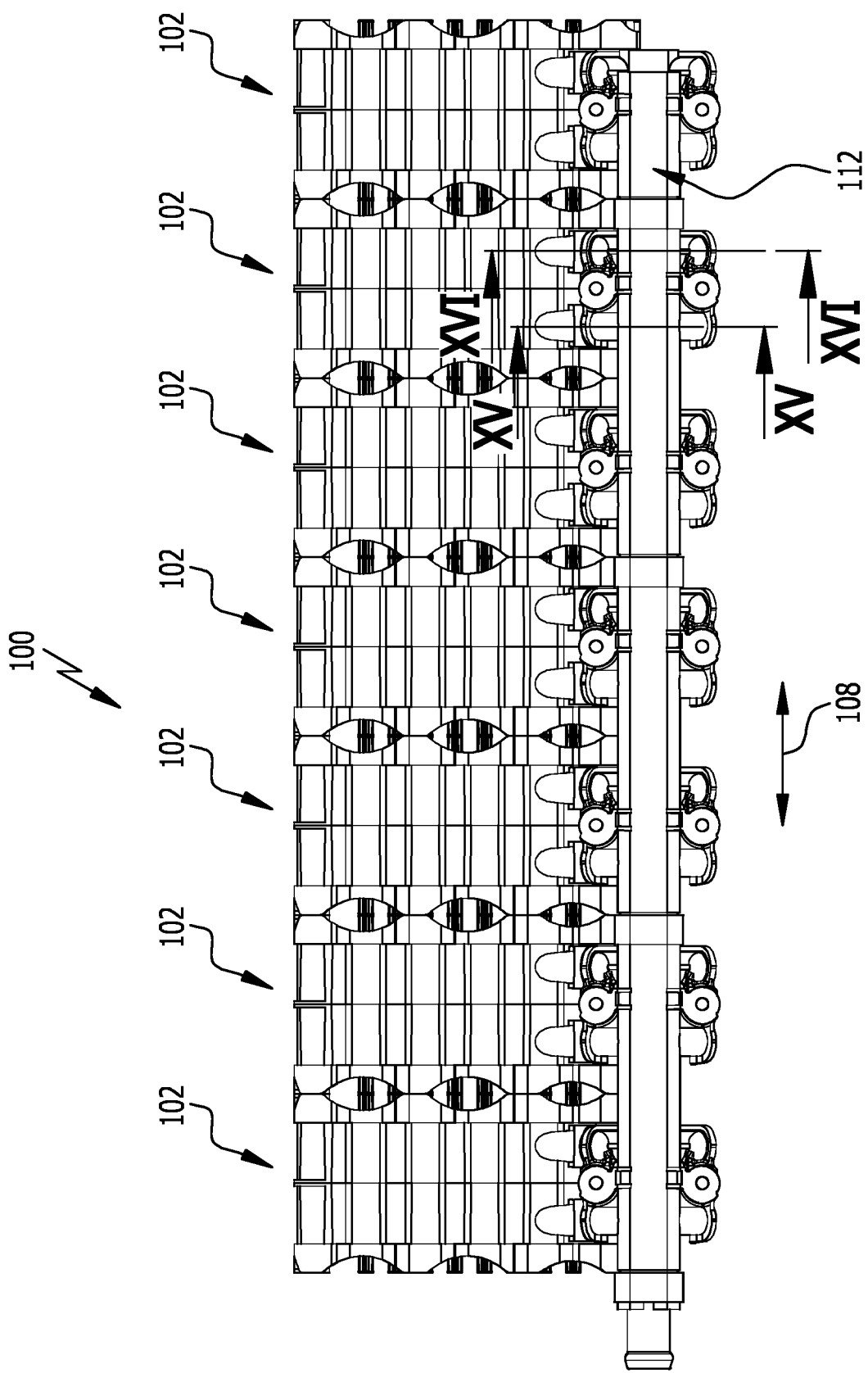
FIG. 5 a schematic plan view of the battery temperature regulation device depicted in FIG. 1 as viewed in the direction of the arrow 5 in FIG. 1.

The temperature regulation medium supply line 112 preferably comprises a plurality of temperature regulation medium supply line modules 116 (c.f. FIG. 4).

Figure 3:
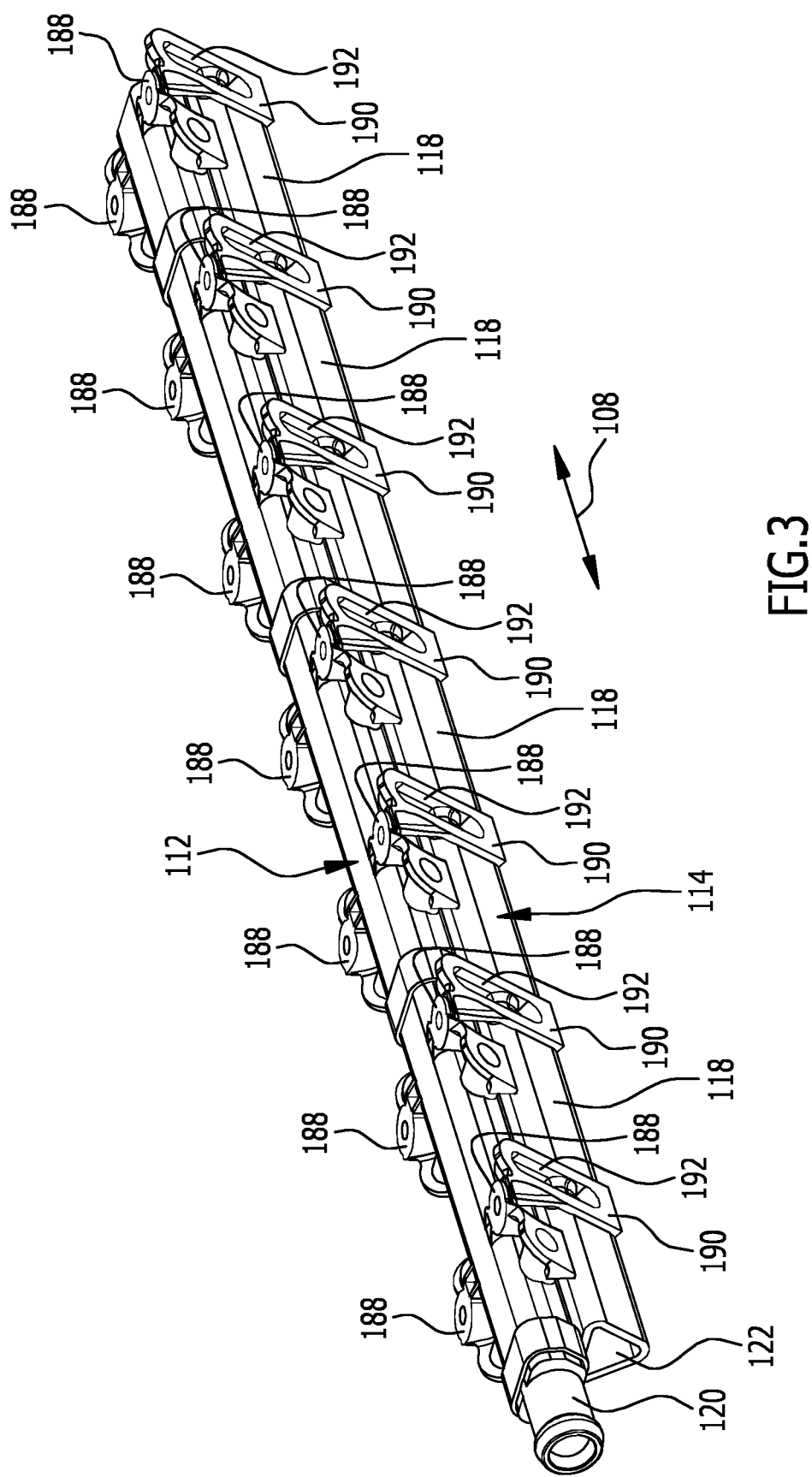
FIG. 3 a schematic perspective illustration of a temperature regulation medium supply line and a temperature regulation medium discharge line of the battery temperature regulation device depicted in FIG. 1.

The temperature regulation medium discharge line 114 preferably comprises a plurality of temperature regulation medium discharge line modules 118 (c.f. FIG. 3).

Preferably, a plurality of temperature regulation medium supply line modules 116 are connectible to one another by plugging them into one another.

Furthermore, it may be expedient for a plurality of temperature regulation medium discharge line modules to be connectible to one another 118 by plugging them into each other.

Consequently, the length of the temperature regulation medium supply line 112 and/or the length of the temperature regulation medium discharge line 114 can preferably be adapted by the choice of the number of the temperature regulation medium supply line modules 116 and/or of the temperature regulation medium discharge line modules 118.

In particular, the length of the temperature regulation medium supply line 112 and/or the length of the temperature regulation medium discharge line 114 can be adapted to the number of battery temperature regulation modules 102 of the battery temperature regulation device 100.

The temperature regulation medium supply line 112 preferably comprises a feed-in connector 120 by means of which a temperature regulation medium is feedable to the temperature regulation medium supply line 112.

The temperature regulation device 100 preferably comprises a not graphically illustrated temperature regulation medium pump.

The temperature regulation medium is preferably feedable by way of the feed-in connector 120 to the temperature regulation medium supply line 112 by means of the temperature regulation medium pump.

Furthermore, the temperature regulation medium discharge line 114 preferably comprises a discharge connector 122 by means of which the temperature regulation medium is removable from the temperature regulation medium discharge line 114.

It may be expedient for the temperature regulation medium to be removable from the temperature regulation medium discharge line 114 via the discharge connector 122 by means of the temperature regulation medium pump.

In particular, a temperature regulation medium is conveyable through the temperature regulation circulation systems 110 of the battery temperature regulation modules 102 of the battery temperature regulation device 100 by means of the temperature regulation medium pump.

Consequently, it may be expedient for at least one temperature regulation medium supply line module 116 to comprise the feed-in connector 120 and/or for at least one temperature regulation medium discharge line 118 to comprise the discharge connector 122.

Preferably, the temperature regulation medium supply line 112 and/or the temperature regulation medium discharge line 114 are closed at an end which is remote from the feed-in connector 120 and/or the discharge connector 122.

To this end, it may be expedient for provision to be made for a temperature regulation medium supply line module 116 that is closed on one side and/or a temperature regulation medium discharge line module 118 that is closed on one side.

As is readily apparent from FIG. 6, each battery temperature regulation module 102 preferably comprises a main body 124 as well as a first and a second additional body 126.

It may be expedient for the two additional bodies 126 to be arranged and/or to be arrangeable on the main body 124 on mutually remote sides of the main body 124.

In particular thereby, the main body 124 forms a central body 125.

The two additional bodies that are arranged on and/or are arrangeable on the mutually remote sides of the main body 124, in particular of the central body 125, thereby form a respective end body 127.

The main body 124 and/or the two additional bodies 126 that are arranged on and/or are arrangeable on the main body 124 preferably each comprise a plurality of receiving openings 128 for receiving battery cells.

The receiving openings 128 of the main body 124 are preferably arranged to be coaxial with respective receiving openings 128 of the two additional bodies 126 that are arranged on the main body 124.

The receiving openings 128 of the main body 124 and/or of the two additional bodies 126 are preferably constructed for the reception of battery cells, in particular of round cells.

Consequently, it may be expedient for the receiving openings 128, which in particular are in the form of through openings, to have a circular cross section.

Furthermore, it may be expedient for the receiving openings 128 to have an internal diameter of at least approximately 10 mm, in particular of at least approximately 15 mm.

The receiving openings 128 preferably have an internal diameter of at most approximately 40 mm, in particular of at most approximately 30 mm.

Preferably, the receiving openings 128 have an internal diameter in the range of approximately 10 mm up to approximately 40 mm, in particular in the range of approximately 15 mm up to approximately 30 mm.

Consequently, it is thereby preferably possible for the circular-cylindrical battery cells, in particular so-called round cells, to be accommodated in coaxially arranged receiving openings 128 of the main body 124 and the two additional bodies 126.

Preferably, each battery temperature regulation module 102 comprises a sealing element arrangement 130 for the purposes of sealing in the region of the receiving openings 128 and/or for sealing between the main body 124 and a respective additional body 126.

The sealing element arrangement 130 preferably comprises a plurality of sealing elements 132 which are arranged on the main body 124 and/or on a respective additional body 126.

The sealing element arrangement 130 is preferably constructed such as to effect sealing of the temperature regulation circulation system 110 with respect to the surroundings of a respective battery temperature module 102.

The sealing elements 132 that are arranged on a respective additional body 126 are preferably each located on a side of the additional bodies 126 which faces the main body 124.

The main body 124 and the two additional bodies 126 of a battery temperature regulation module 102 as well as the battery cells arranged in the receiving openings 128 of the main body 124 and/or the two additional bodies 126 preferably bound and/or constitute the temperature regulation circulation system 110 of a respective battery temperature regulation module 102.

In particular, the main body 124 and the two additional bodies 126 bound the temperature regulation circulation system 110 of a battery temperature regulation module 102 when the two additional bodies 126 are arranged on mutually remote sides of the main body 124 and battery cells are accommodated in the receiving openings 128 of the main body 124 and/or the two additional bodies 126.

The main body 124 of a battery temperature regulation module 102 preferably comprises a separator plate 134 into which the receiving openings 128 of the main body 124 are introduced for the purposes of accommodating the battery cells.

Furthermore, the main body 124 preferably comprises two outer wall elements 136 that are arranged on mutually remote sides of the separator plate 134.

The outer wall elements 136 extend away from the separator plate 134 of the main body 124 preferably in the connecting direction 108.

Consequently, it may be expedient for the separator plate 134 to constitute a central plate 135 of the main body 124.

The separator plate 134 is preferably constructed such as to be at least approximately flat, whereby the outer wall elements 136 extend at least approximately perpendicularly away from the separator plate 134.

The two outer wall elements 136 of the main body 124 are preferably closed in ring-like manner.

Furthermore, the main body 124 preferably comprises a plurality of partition wall elements 138 which are each arranged on the separator plate 134 and bound and/or form respective channel sections 140 of a temperature regulation channel 142.

Hereby, the main body 124 preferably comprises partition wall elements 138 which are arranged on mutually remote sides of the separator plate 134.

The partition wall elements 138 preferably extend perpendicularly away from the separator plate 134 of the main body 124, in particular, in the connecting direction 108.

In an operational state of the exemplary embodiment of the battery temperature regulation device 100 or a battery temperature regulation module 102 that is illustrated in FIGS. 1 to 20, the partition wall elements 138 are preferably at least approximately horizontal, i.e. in particular, are arranged to be perpendicular to the direction of the force of gravity G.

Figure 11:
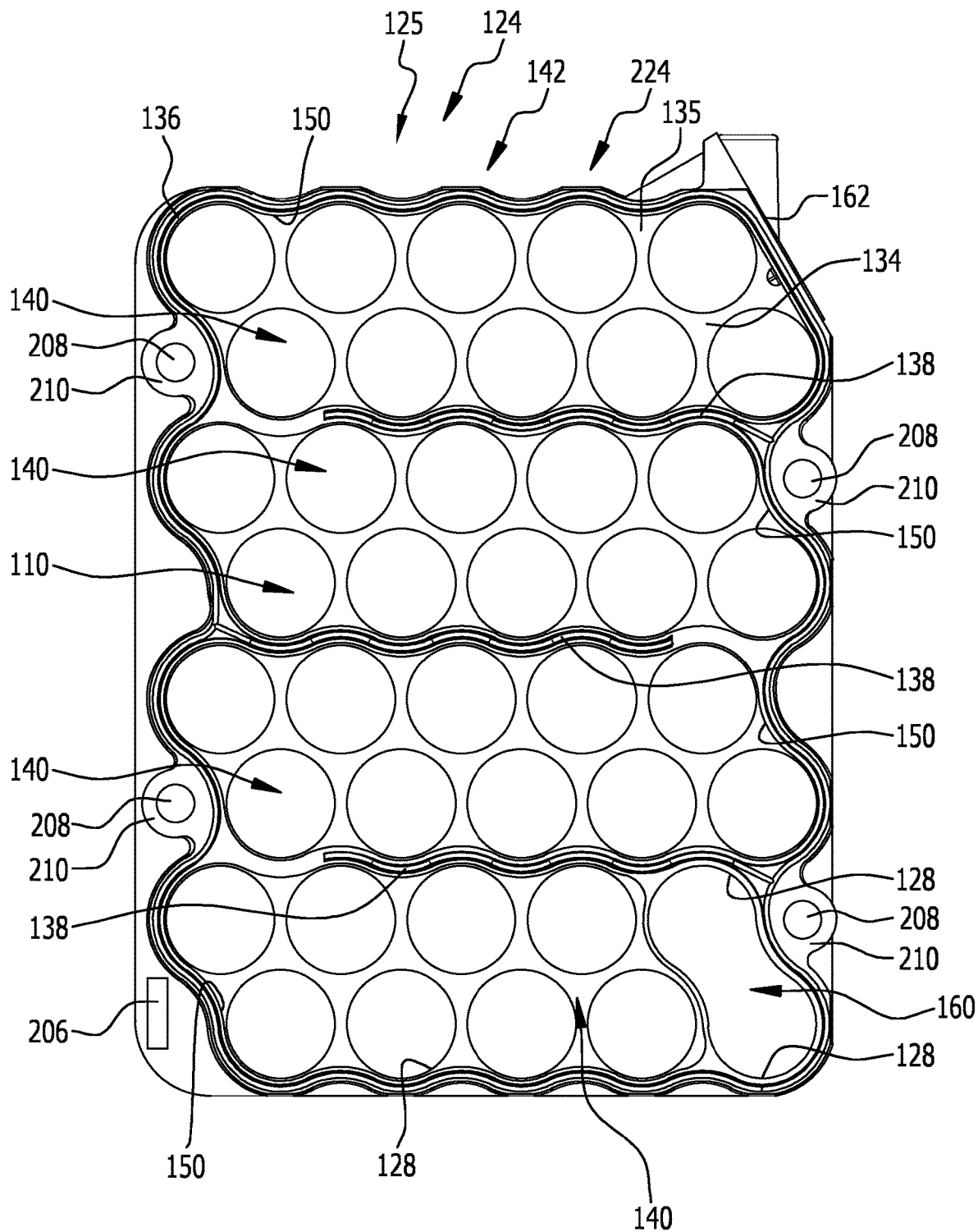
FIG. 11 a schematic plan view of a main body of the battery temperature regulation module depicted in FIG. 8 as viewed in the direction of the arrow 11 in FIG. 8.

In particular, the partition wall elements 138 are arranged in such a manner that the temperature regulation channel 142 runs in a meandering manner (c.f. FIG. 11).

Preferably thereby, the partition wall elements 138 are each connected on one side to the outer wall element 136 of the main body 124.

In particular, provision is made for neighbouring partition wall elements 138 to each be connected on mutually remote sides to the outer wall element 136 of the main body 124.

In particular, neighbouring partition wall elements 138 are arranged adjacent to each other in the direction of the force of gravity G.

It may be expedient thereby for each partition wall element 138 to be arranged such as to be spaced from the outer wall element 136 of the main body 124 on a side which is remote from a side connected to the outer wall element 136 of the main body 124.

Preferably, a meandering path of the temperature regulation channel 142 can thus be achieved.

The partition wall elements 138 are preferably constructed such as to be at least approximately undulating in a cross section of the main body 124 that is perpendicular taken with respect to the connecting direction 108 of the battery temperature regulation device 100 and/or of a battery temperature regulation module 102.

It may be expedient thereby, if the undulating shape of the partition wall elements 138 is matched to an arrangement of the receiving openings 128 that have been incorporated into the separator plate 134 of the main body 124.

Furthermore thereby, it may be expedient for the partition wall elements 138 to extend, at least in regions thereof, into intermediate spaces between the receiving openings 128. Preferably, the result can thus be achieved that a battery temperature regulation module 102 can be manufactured in a comparatively compact manner.

The two additional bodies 126 of a battery temperature regulation module 102 preferably each comprise a cover plate 144 which includes the receiving openings 128 of the additional body 126 used for receiving battery cells.

Furthermore, the two additional bodies 126 preferably each comprise a framework element 146 which extends away from the cover plate 144 and which, in particular, is closed in ring-like manner.

The framework element 146 preferably extends away from the cover plate 144 at least approximately perpendicularly, in particular at least approximately parallel to the connecting direction 108.

Preferably, the stability of the additional bodies 126 and/or of a battery temperature regulation module 102 can be increased by the provision of the framework element 146.

It may be expedient for each battery temperature regulation module 102 to comprise positioning projections 148 which are arranged on the two additional bodies 126 and by means of which the additional bodies 126 are positionable relative to the main body 124.

The positioning projections 148 of the additional bodies 126 are preferably arranged on the cover plate 144 of the additional bodies 126, in particular on a side of the two additional bodies 126 which faces the main body 124.

It may be expedient for the positioning projections 148 of the additional bodies 126 to extend away from the cover plate 144 of the additional bodies 126, in particular substantially parallel to the connecting direction 108.

Figure 8:
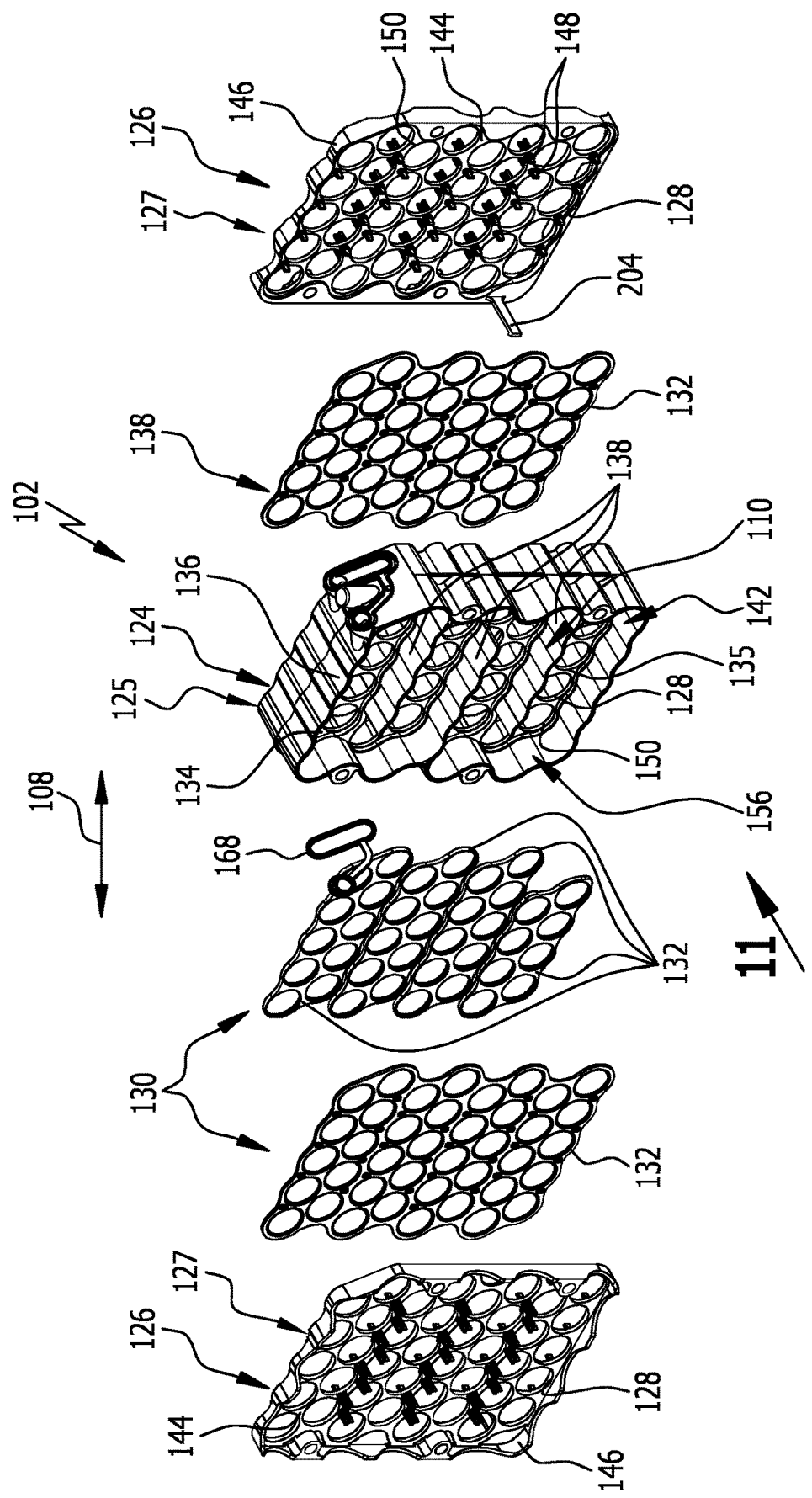
FIG. 8 a schematic exploded illustration of the battery temperature regulation module depicted in FIG. 6.
Figure 9:
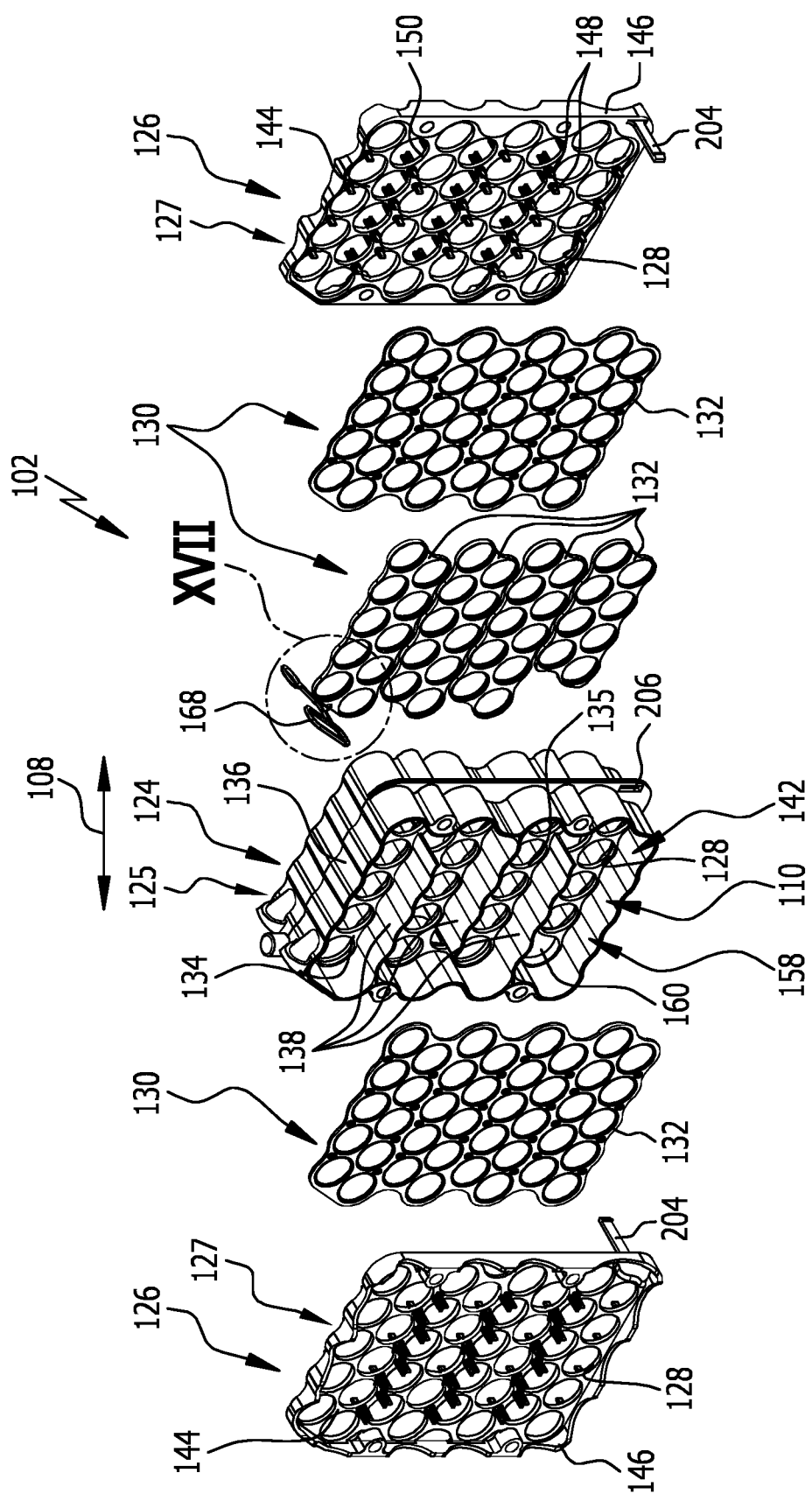
FIG. 9 a schematic exploded illustration of the battery temperature regulation module depicted in FIG. 7.

Preferably, a plurality of rows of positioning projections 148 are arranged on the main body 126, in particular on the cover plate 124 of the main body 126, (c.f. FIGS. 8 and 9).

The positioning projections 148 are preferably constructed such as to be at least approximately cylindrical.

Preferably thereby, a plurality of positioning projections 148 are arranged alternately above and/or below an imaginary line.

It may be expedient thereby if two rows of positioning projections 148 are arranged one above the other in offset manner.

Preferably, the positioning projections 148 that are arranged, in particular, in alternating manner can grip around a respective partition wall element 138 of the main body 124 for the purposes of positioning an additional body 126 relative to the main body 124.

It may be expedient for the main body 124 and/or the two additional bodies 126 to each comprise one or more recesses 150, whereby the sealing elements 132 that are arranged on the main body 124 and/or on the two additional bodies 126 are arranged, in particular, in a recess 150 of the main body 124 and/or of an additional body 126.

In particular, the recesses 150 in the main body 124 and/or in the two additional bodies 126 are clearly perceptible in FIGS. 8, 9, 11 and 18.

It may be expedient for the recesses 150 to be constructed such as to be at least approximately cylindrical, in particular in the connecting direction 108.

Preferably, the recesses 150 in the main body 124 and/or in the two additional bodies 126 are constructed such as to be at least approximately complementary to a sealing element 132 that is received and/or is receivable in the respective recess 150.

Preferably, an outer contour of the sealing element 132 is constructed such as to be complementary to an inner contour of a respective recess 150.

Figure 18:
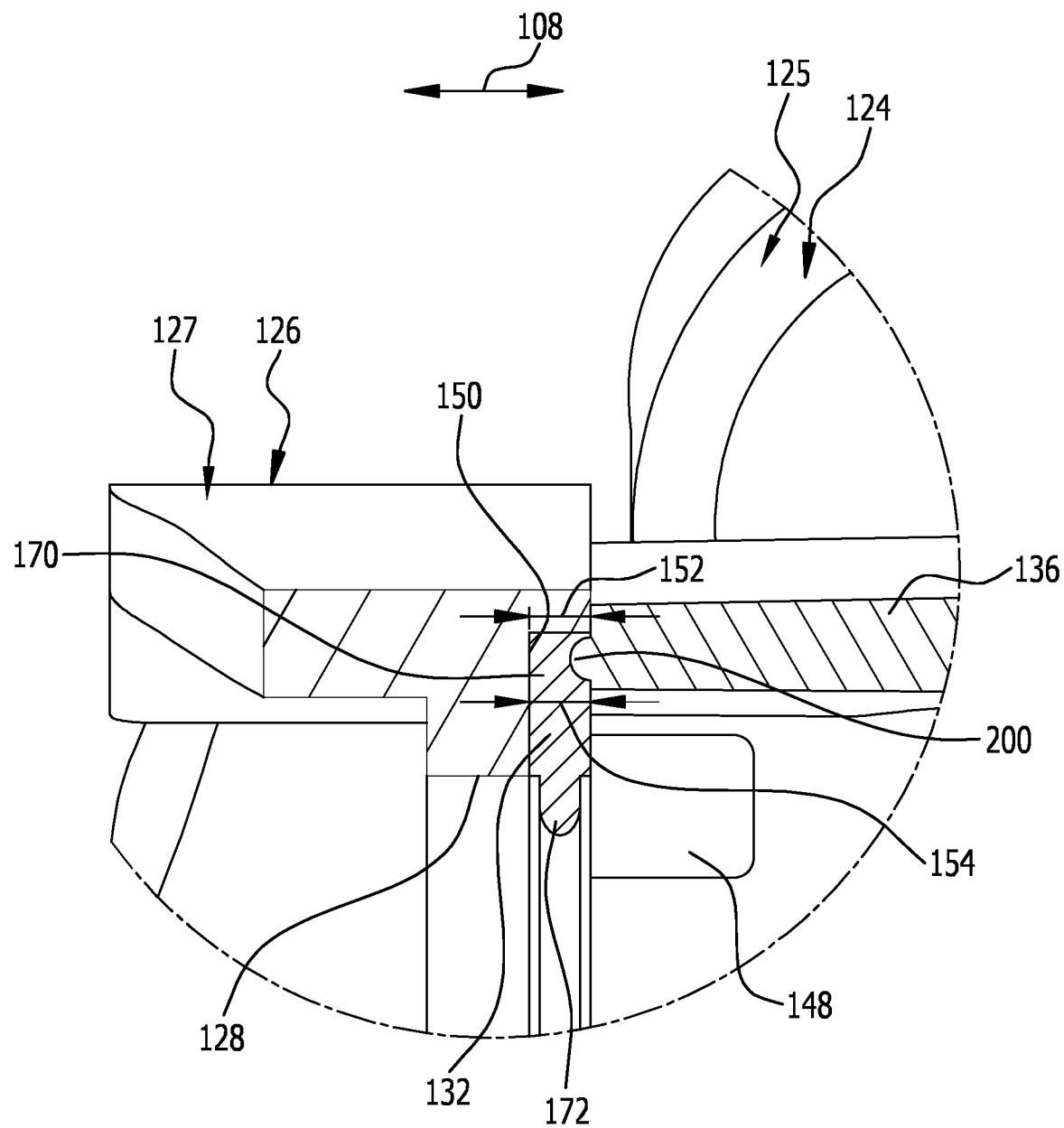
FIG. 18 an enlarged illustration of the region XVIII depicted in FIG. 12.

The depth 152 of the recess 150 preferably corresponds in each case to at least approximately the thickness 154 of a sealing element 132 that is received and/or is receivable in the respective recess 150 (c.f. FIG. 18).

Preferably, the result can thus be achieved for example that the two additional bodies 126 are constructed such as to be at least approximately flat on the side facing the main body 124 when a sealing element 132 is arranged in the cylindrical recess 150.

In particular, due to the provision of the recesses 150 and by arranging the sealing elements 132 in the recesses 150, a captive arrangement of the sealing elements 132 on the main body 124 and/or on a respective additional body 126 can be achieved.

Figure 12:
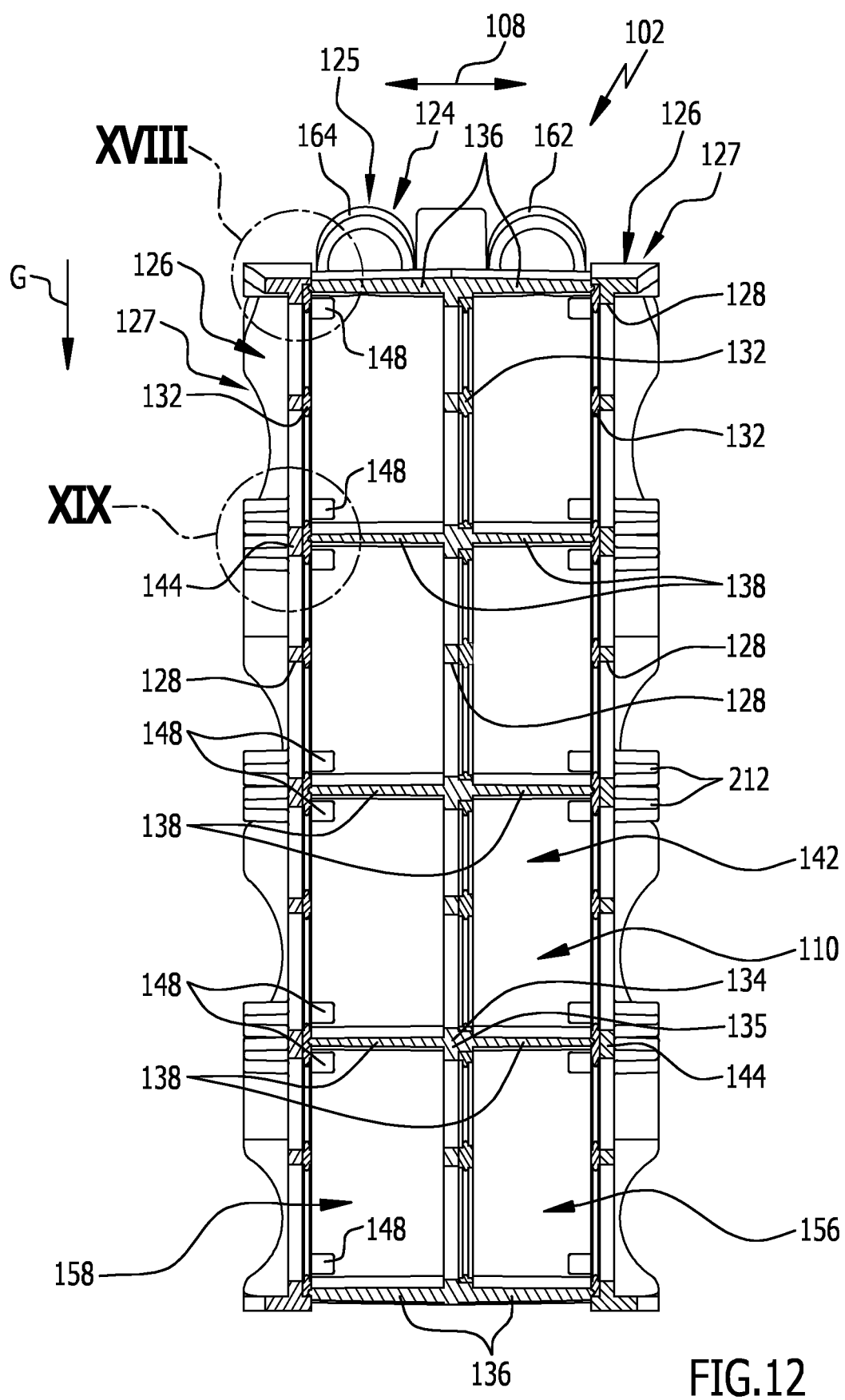
FIG. 12 a schematic section through the battery temperature regulation module depicted in FIG. 7.

The temperature regulation circulation system 110 preferably comprises a temperature regulation medium inlet region 156 and/or a temperature regulation medium outlet region 158 (c.f. FIGS. 8, 9 and 12).

A first additional body 126 that is arranged on the main body 124 and the main body 124 preferably bound the temperature regulation medium inlet region 156.

A second additional body 126 that is arranged on the main body 124 and the main body 124 preferably bound the temperature regulation medium outlet region 158.

In particular, the separator plate 134 of the main body 124 separates the temperature regulation medium inlet region 156 from the temperature regulation medium outlet region 158.

The temperature regulation medium inlet region 156 is preferably connected in fluid conveying manner to the temperature regulation medium outlet region 158.

It may be expedient thereby, if, for the purposes of a fluidic connection of the temperature regulation medium inlet region 156 to the temperature regulation medium outlet region 158, there is provided a through opening 160 which is incorporated into the separator plate 134 of the main body 124.

The through opening 160 is preferably not constructed for accommodating a battery cell.

Rather, the through opening 160 is arranged between two receiving openings 128 used for the reception of battery cells and connects these receiving openings 128 to one another (c.f. FIG. 11).

In particular, the through opening 160 is formed through a web-free region between two receiving openings 128.

Since the partition wall elements 138 extend away from the separator plate 134 on mutually remote sides of the main body 124, the temperature regulation channel 142 preferably runs in meandering manner through the temperature regulation medium inlet region 156 and/or through the temperature regulation medium outlet region 158.

It may be expedient for a temperature regulation medium, water for example, to be feedable to the temperature regulation circulation system 110 at the temperature regulation medium inlet region 156 and/or for a temperature regulation medium, water for example, to be removable from the temperature regulation circulation system 110 at the temperature regulation medium outlet region 158.

For example, provision may be made for the temperature regulation medium inlet region 156 to form a cold side of the temperature regulation circulation system 110.

It may be expedient thereby, if a temperature regulation medium is supplied to the temperature regulation medium inlet region 156 for the purposes of cooling the battery cells that are arranged in the receiving openings 128 of the main body 124 and/or of the two additional bodies 126, wherein, before being fed into the temperature regulation circulation system 110, the temperature regulation medium has a lower temperature than the battery cells that are to be cooled.

As an alternative or in addition thereto, it is conceivable for the temperature regulation medium inlet region 156 to form a hot side of the temperature regulation circulation system 110.

It may be expedient thereby if a temperature regulation medium is supplied to the temperature regulation medium inlet region 156 for heating the battery cells, wherein, before being fed into the temperature regulation circulation system 110, the temperature regulation medium has a higher temperature than the battery cells that are to be heated.

The temperature regulation circulation system 110 of each one of the battery temperature regulation modules 102 preferably runs between a respective temperature regulation medium inlet 162 and a respective temperature regulation medium outlet 164.

The temperature regulation medium inlet 162 and/or the temperature regulation medium outlet 164 are preferably arranged on the main body 124.

Preferably, a temperature regulation medium is feedable to the temperature regulation circulation system 110 of a battery temperature regulation module 102 by means of the temperature regulation medium inlet 162, whereby preferably, the temperature regulation medium is removable from the temperature regulation circulation system 110 of a battery temperature regulation module 102 by means of the temperature regulation medium outlet 164.

The temperature regulation medium inlet 162 and/or the temperature regulation medium outlet 164 are preferably constructed in one piece with the main body 124 of a battery temperature regulation module 102.

It may be expedient for the temperature regulation medium inlet 162 and/or the temperature regulation medium outlet 164 to each comprise or be constituted by a through opening 166 in the outer wall element 136 of the main body 124.

The through opening 166 of the temperature regulation medium inlet 162 preferably opens out into the temperature regulation medium inlet region 156 of the temperature regulation circulation system 110 of a battery temperature regulation module 102.

Furthermore, it may be expedient for the through opening 166 of the temperature regulation medium outlet 164 to open out into the temperature regulation medium outlet region 158 of the temperature regulation circulation system 110 of a battery temperature regulation module 102.

Figure 10:
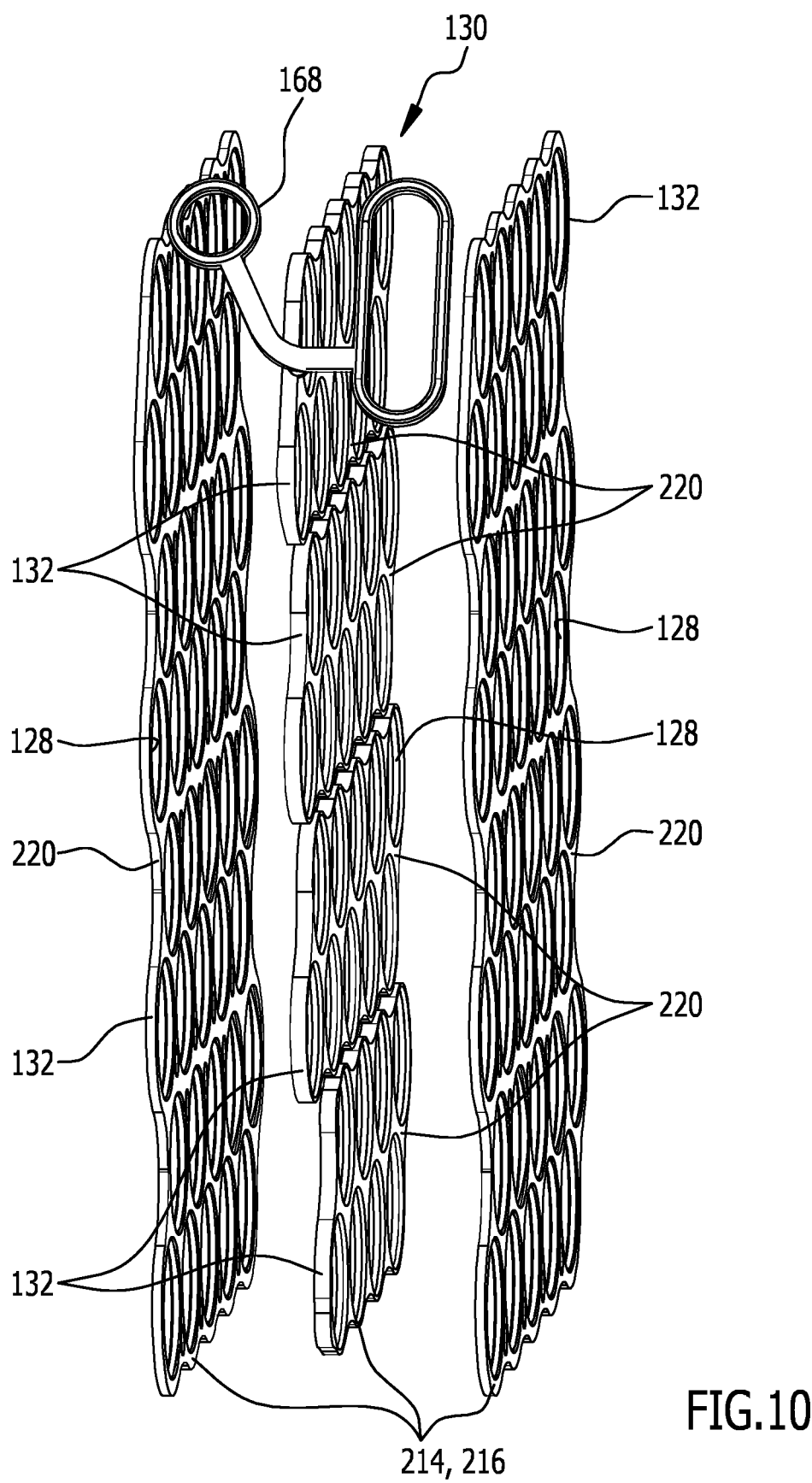
FIG. 10 a schematic perspective illustration of a sealing element arrangement of a battery temperature regulation module depicted in FIGS. 6 and 7.

The sealing element arrangement 130 illustrated in the sole illustration of FIG. 10 preferably comprises a plurality of at least approximately flat sealing elements 132 for effecting sealing in the area of the receiving openings 128 of the main body 124 and/or of the two additional bodies 126 and/or for effecting sealing between the main body 124 and/or a respective additional body 126.

Furthermore, the sealing element arrangement 130 preferably comprises a connector sealing element 168 for effecting sealing in the area of the temperature regulation medium inlet 162 of a battery temperature regulation module 102 and/or for effecting sealing in the area of the temperature regulation medium outlet 164 of a battery temperature regulation module 102.

Figure 19:
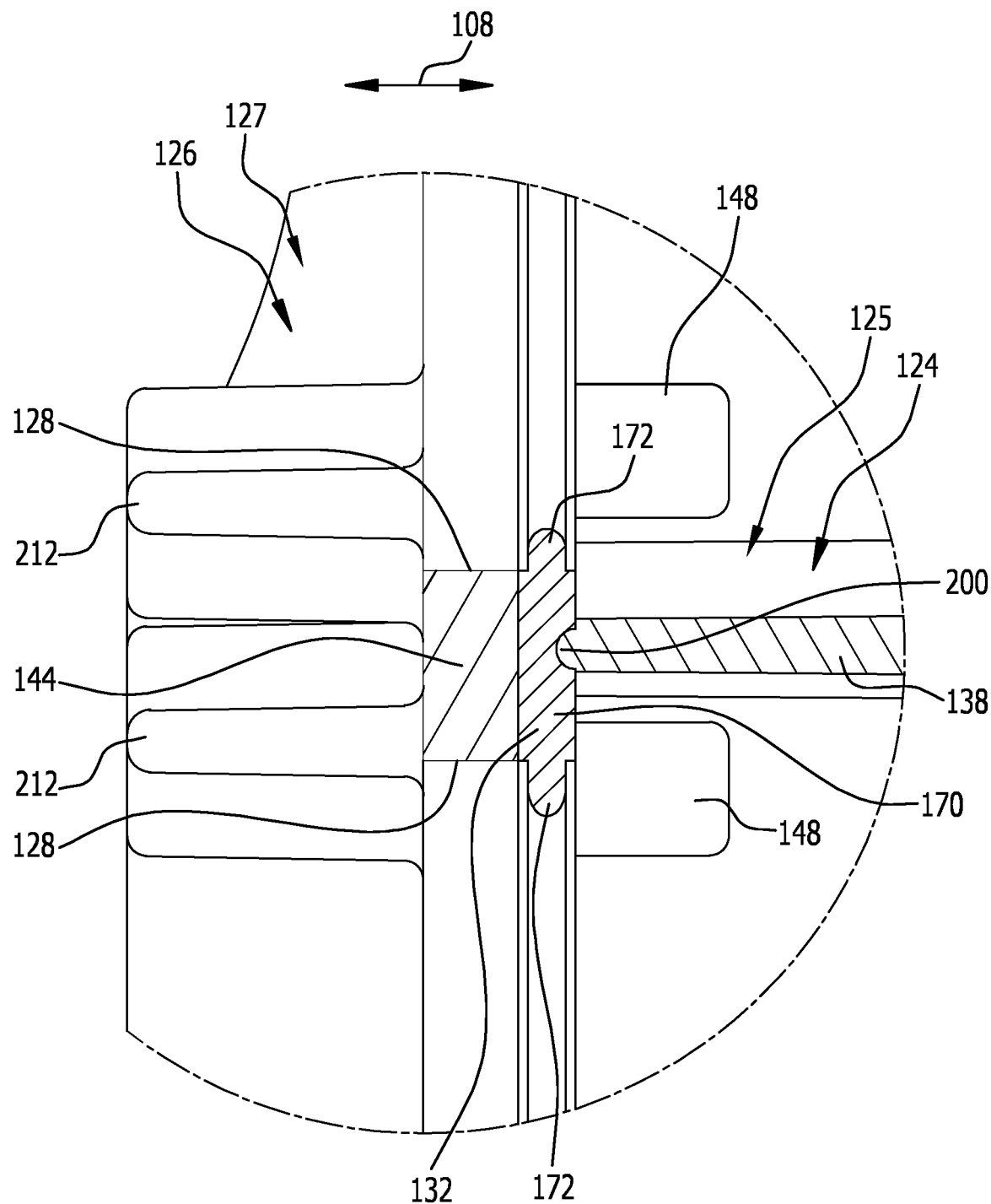
FIG. 19 an enlarged illustration of the region XIX depicted in FIG. 12.

The sealing elements 132 preferably each comprise a sealing main body 170 and a sealing lip 172 which extends away from the sealing main body 170 (c.f. FIGS. 18 and 19).

The sealing elements 132 preferably extend at least approximately along a plane, in particular along a plane that is arranged to be perpendicular to the connecting direction 108 of a battery temperature regulation module 102 and/or of the battery temperature regulation device 100.

The sealing elements 132 preferably each comprise a plurality of sealing lips 172 that are closed in ring-like manner, in particular for effecting sealing in the area of a respective receiving opening 128 of the main body 124 and/or of a respective additional body.

Preferably thereby, each sealing element 132 comprises a plurality of receiving openings 128 for receiving battery cells.

It may be particularly expedient for the sealing elements 132 to each comprise a sealing lip 172 which is closed in ring-like manner and which extends away from the sealing main body 170 in the radial direction taken with respect to the one longitudinal central axis of the receiving openings 128 of the sealing elements 132.

Consequently, reliable sealing of a battery temperature regulation module 102 is preferably achievable in the area of the receiving openings 128 of the two additional bodies 126 on the one hand as is also the achievement of a reliable seal between the temperature regulation medium inlet region 156 and the temperature regulation medium outlet region 158 of a temperature regulation circulation system 110 of a battery temperature regulation module 102.

The connector sealing element 168 of a respective sealing element arrangement 130 is preferably connected in one piece manner to a sealing element 132, in particular to a sealing element 132 arranged on the main body 124.

The connector sealing element 168 preferably comprises an inlet sealing region 174 and/or an outlet sealing region 176.

The inlet sealing region 174 and/or the outlet sealing region 176 preferably each comprise a sealing lip 172 that is closed in ring-like manner.

The sealing lip 172 of the inlet sealing region 174 that is closed in ring-like manner is preferably constructed such as to be substantially circular.

Furthermore, it may be expedient for the sealing lip 172 of the outlet sealing region 176 that is closed in ring-like manner to be constructed such as to be at least approximately oblong and in particular, to comprise two semicircular ends and two sealing sections that are arranged such as to be parallel to each other and also to connect the semicircular ends to one another.

The sealing lip 172 of the connector sealing element 168 that is arranged on the main body 124 preferably extends away from the main body 124 in the inlet sealing region 174 and/or in the outlet sealing region 176.

The inlet sealing region 174 and the outlet sealing region 176 of the connector sealing element 168 are preferably connected to one another by means of a web region 180.

It may be expedient for the connector sealing element 168 to be connected in the web region 180 in one piece manner to a sealing element 132 that is arranged on the main body 124.

The connector sealing element 168 is preferably arranged in a receiving groove 182 of the main body 124.

The inlet sealing region 174 of the connector sealing element 168 preferably surrounds the temperature regulation medium inlet 162.

Furthermore, the main body 124 preferably comprises a longitudinal slot 184 into which the temperature regulation medium outlet 164 preferably opens out.

In particular, the temperature regulation medium outlet 164 opens out into the longitudinal slot 184 in an upper region thereof taken with reference to the direction of the force of gravity G.

It may be expedient for the outlet sealing region 176 of the connector sealing element 168 to surround the longitudinal slot 184.

Each battery temperature regulation module 102 preferably comprises a fixing projection 186 by means of which the temperature regulation medium supply line 112 and/or the temperature regulation medium discharge line 114 are fixable to the battery temperature regulation modules 102 of the battery temperature regulation device 100.

In particular, the temperature regulation medium supply line 112 and/or the temperature regulation medium discharge line 114 are adapted to plug onto the fixing projections 186 of the battery temperature regulation modules 102.

Preferably thereby, the main body 124 of each one of the battery temperature regulation modules 102 comprises a respective fixing projection 186 which is constructed, in particular, in one piece with the main body 124.

The fixing projection 186 is preferably constructed such as to be at least approximately conical.

It may be particularly expedient if the temperature regulation medium supply line 112 and/or the temperature regulation medium discharge line 114 each comprise a fixing receptacle 188 for accommodating the fixing projection 186 of the main body 124.

Preferably, the temperature regulation medium supply line 112 and/or the temperature regulation medium discharge line 114 are adapted to be plugged onto the fixing projections 186 by means of the fixing receptacles 188.

In particular, the fixing receptacle 188 of the temperature regulation medium discharge line 114 as well as a fixing projection 186 of the main body 124 that is accommodated in the fixing receptacle 188 of the temperature regulation medium discharge line 114 are receivable in the fixing receptacles 188 of the temperature regulation medium supply line 112.

Preferably thereby, the temperature regulation medium supply line 112 and the temperature regulation medium discharge line 114 can be fixed one above the other to the battery temperature regulation modules 102.

In particular, the temperature regulation medium supply line 112 is fixable to the battery temperature regulation modules 102 above the temperature regulation medium discharge line 114.

The temperature regulation medium supply line 112 preferably comprises a plurality of sealing surfaces 190 (c.f. FIG. 4) by means of which the temperature regulation medium supply line 112 is adapted to be laid on and/or pressed in sealing manner onto the sealing lip 172 in the inlet sealing region 174 of the connector sealing element 168. The sealing surfaces 190 of the temperature regulation medium supply line 112 are preferably closed in ring-like manner.

Figure 16:
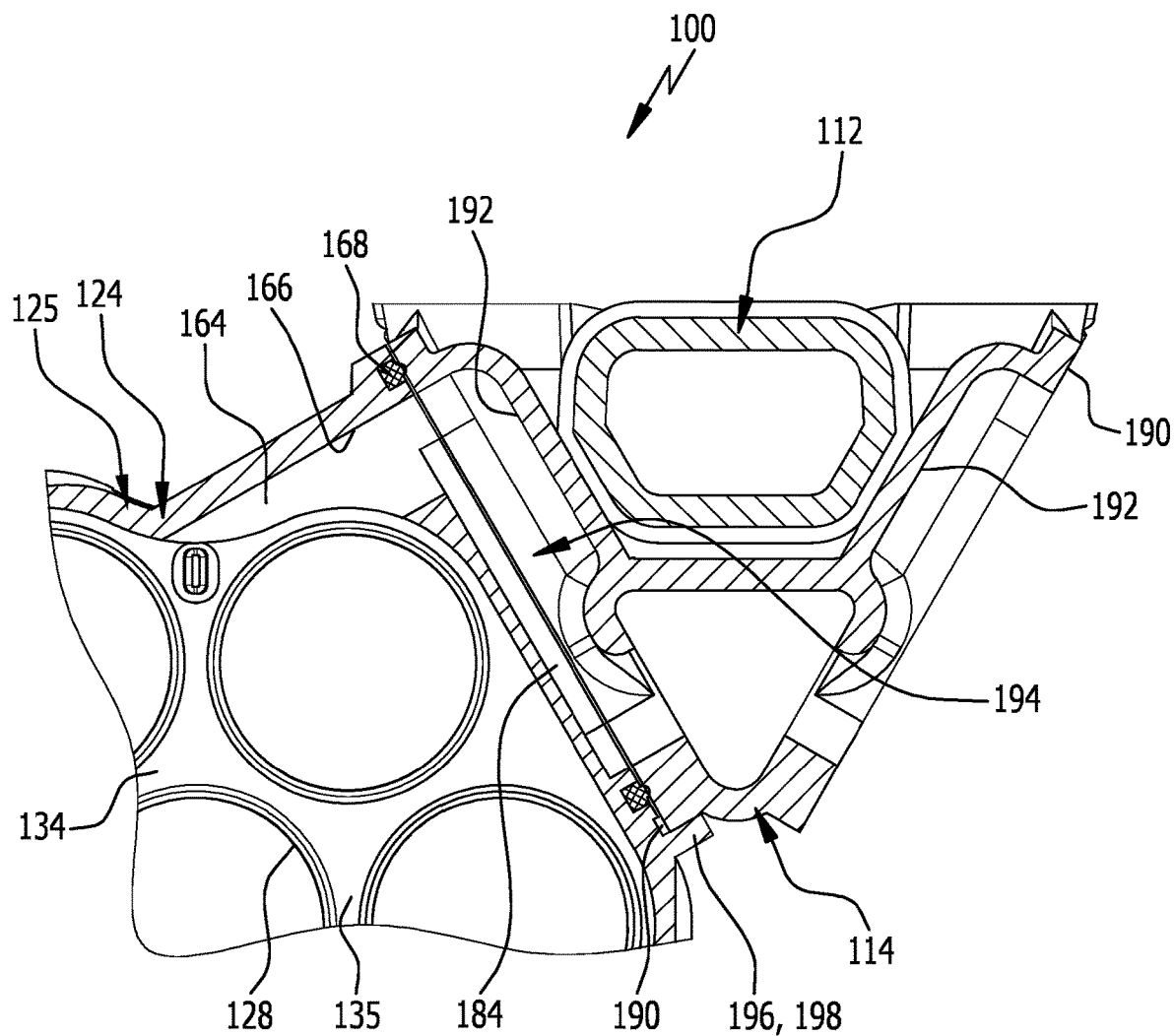
FIG. 16 a schematic section through the battery temperature regulation device depicted in FIG. 5 along the line XVI-XVI in FIG. 5.

The temperature regulation medium discharge line 114 preferably comprises a plurality of longitudinal slots 192 (c.f. FIG. 3) which, when a temperature regulation medium discharge line 114 is arranged on a battery temperature regulation module 102, overlie the longitudinal slot 184 of the main body 124 of a battery temperature regulation module 102 in such a manner that the longitudinal slot 184 of the main body 124 and the longitudinal slot 192 of the temperature regulation medium discharge line 114 bound a temperature regulation medium channel 194 (c.f. FIGS. 3 and 16).

The temperature regulation medium discharge line 114 preferably comprises a plurality of sealing surfaces 190, wherein each sealing surface 190 is adapted to be laid on or pressed in sealing manner onto a sealing lip 172 in the outlet sealing region 176 of the connector sealing element 168. The sealing surfaces 190 of the temperature regulation medium discharge line 114 are closed, in particular, in ring-like manner.

The sealing surfaces 190 of the temperature regulation medium discharge line 114 preferably each surround, and in particular entirely surround, a longitudinal slot 192 of the temperature regulation medium discharge line 114.

Figure 13:
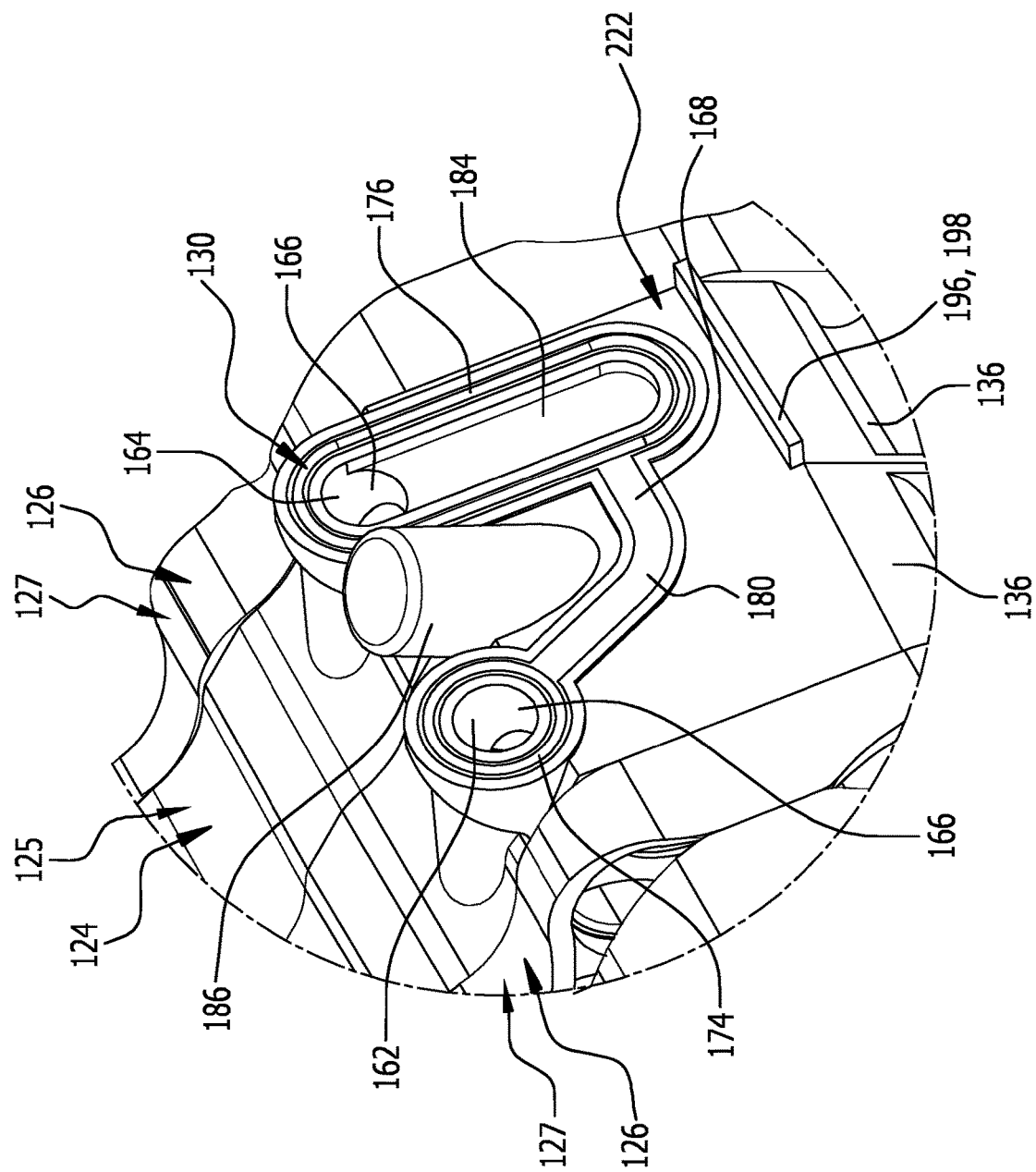
FIG. 13 an enlarged illustration of the region XIII depicted in FIG. 2, wherein a connector sealing element is arranged in a receiving groove of a main body of a battery temperature regulation module.
Figure 14:
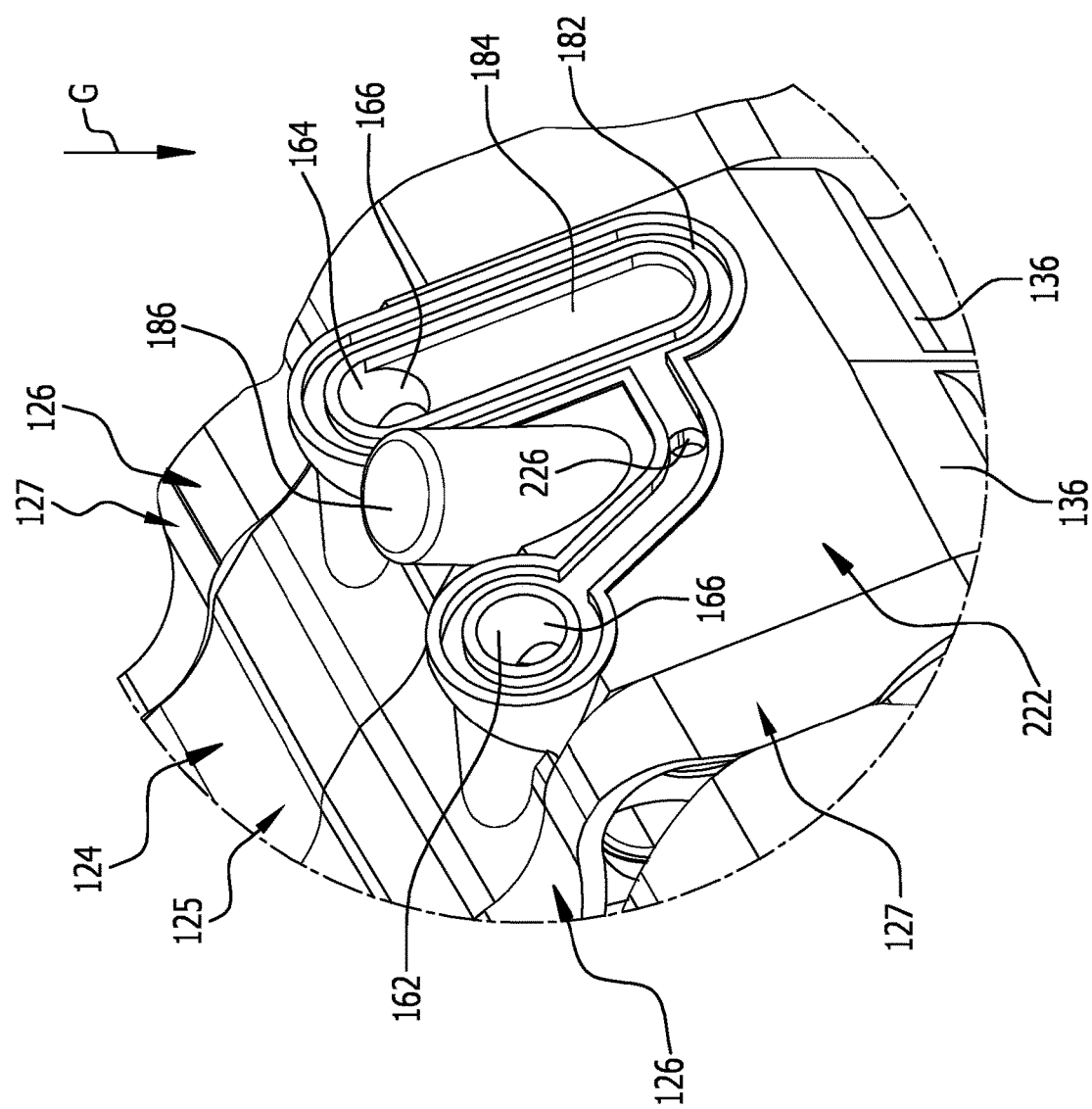
FIG. 14 an enlarged illustration corresponding to FIG. 13 of the region XIII in FIG. 2, wherein there is no connector sealing element arranged in the receiving groove of the main body of the battery temperature regulation module.
Figure 15:
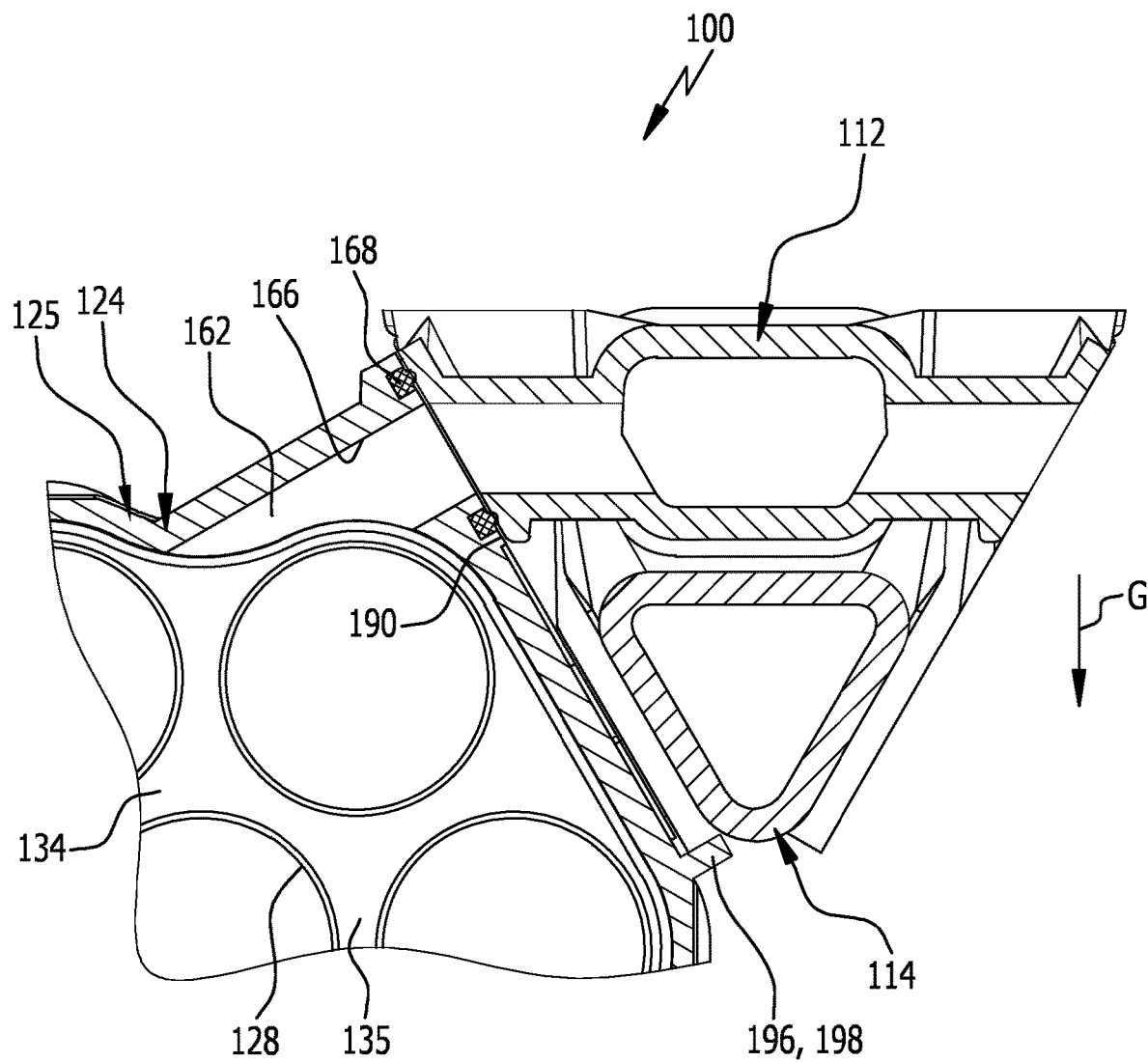
FIG. 15 a schematic section through the battery temperature regulation device depicted in FIG. 5 along the line XV-XV in FIG. 5.

It may be expedient for the main body to comprise a supporting element 196 which is illustrated only in FIGS. 13, 15 and 16 for the purposes of supporting the temperature regulation medium discharge line 114.

In particular, the supporting element 196 is a supporting rib element 198.

Preferably, due to the provision of the supporting element 196, the sealing surface 190 of the temperature regulation medium discharge line 114 which surrounds the longitudinal slot 192 can be compressed and/or pressed evenly in sealing manner against the sealing lip 172 of the connector sealing element 168 in the outlet sealing region 176 when the temperature regulation medium discharge line 114 is arranged on the main body 124 of a battery temperature regulation module 102.

When the temperature regulation medium supply line 112 is arranged in sealing manner on the sealing lips of the inlet sealing region 174 of the connector sealing elements 168 of the battery temperature regulation modules 102 by means of its sealing surfaces 190, a temperature regulation medium can preferably be supplied through the temperature regulation medium supply line 112 and the feed-in connector 120 thereof to a respective temperature regulation circulation system 110 of each battery temperature regulation module 102 by way of the temperature regulation medium inlet 162.

Furthermore, when the sealing surfaces 190 of the temperature regulation medium discharge line 114 are arranged in sealing manner on the sealing lips 172 of the outlet sealing region 176 of the connector sealing elements 168 of the battery temperature regulation modules 102, it may be expedient for a temperature regulation medium from a temperature regulation circulation system 110 of a respective battery temperature regulation module 102 to be removed from the temperature regulation circulation system 110 of the battery temperature regulation modules 102 through the temperature regulation medium outlet 164 and the temperature regulation medium discharge line 114 and the discharge connector 122 thereof.

Preferably, each temperature regulation medium supply line module 116 comprises two sealing surfaces 190 so that a temperature regulation medium is feedable to two battery temperature regulation modules 102 by means of a respective temperature regulation medium supply line module 116.

Furthermore, it may be expedient for each temperature regulation medium discharge line module 118 to comprise two sealing surfaces 190 so that a temperature regulation medium is removable from two battery temperature regulation modules 102 by means of a respective temperature regulation medium discharge line module 118.

For the purposes of sealing between a respective additional body 126 and the central body 124 of a battery temperature regulation module 102, it has proved to be expedient for the outer wall elements 136 to comprise a sealing projection 200 which extends away from the outer wall elements 136 in a main direction of extent of the outer wall elements 136, in particular in the connecting direction 108 of a battery temperature regulation module 102.

Preferably, each outer wall element 136 comprises a sealing projection 200 which is closed in ring-like manner.

In a connected state of a battery temperature regulation module 102 and/or of the battery temperature regulation device 100, the sealing projection 200 of each outer wall element 136 preferably abuts in sealing manner on a sealing element 132.

In particular thereby, the sealing projection 200 of an outer wall element 136 flexibly deforms the sealing main body 170 of the sealing element 132 at least in portions thereof.

For the purposes of sealing in the area of a temperature regulation circulation system 110 of a respective battery temperature regulation module, i.e. for the purposes of sealing in the area of the partition wall elements 138, the partition wall elements 138 preferably comprise a sealing projection 200 which extends away from the respective partition wall element 138 in a main direction of extent thereof, in particular in the connecting direction 108 of the battery temperature regulation module 102 (c.f. FIG. 19).

In the connected state of a battery temperature regulation module 102 and/or of the battery temperature regulation device 100, the sealing projections 200 of the partition wall elements 138 preferably abut in sealing manner on a sealing element 132 and thereby flexibly deform the sealing main body 170 of the sealing element 132 at least in portions thereof.

Sealing projections 200 arranged on the partition wall elements 138 are preferably in the form of a web and/or in the form of a rib and preferably extend at least approximately entirely along a length of the respective partition wall element 138.

The sealing projections 200 of the partition wall elements 138 and/or of the outer wall elements 136 of each battery temperature regulation module 102 preferably have a rounded cross section, in particular, a cross section having an at least approximately semi-circular shape.

The main body 124 and the two additional bodies 126 of a battery temperature regulation module 102 or of a plurality of battery temperature regulation modules 102 are preferably connectible to one another and in particular are clampable against each other in the connecting direction 108.

It may be expedient for the main body 124 of a battery temperature regulation module 102 to be connectible to the two additional bodies 126 in positive- and/or force-locking manner.

The two additional bodies 126 are preferably clippable to the main body 124.

It may be expedient thereby for each battery temperature regulation module 102 to comprise a latching device 202 by means of which the two additional bodies 126 are connectible to the main body 124 in positive manner and in particular, are clippable thereto.

Preferably, the two additional bodies 126 can be set out on the main body 124 in a pre-assembly position by means of the latching device 202.

Figure 20:
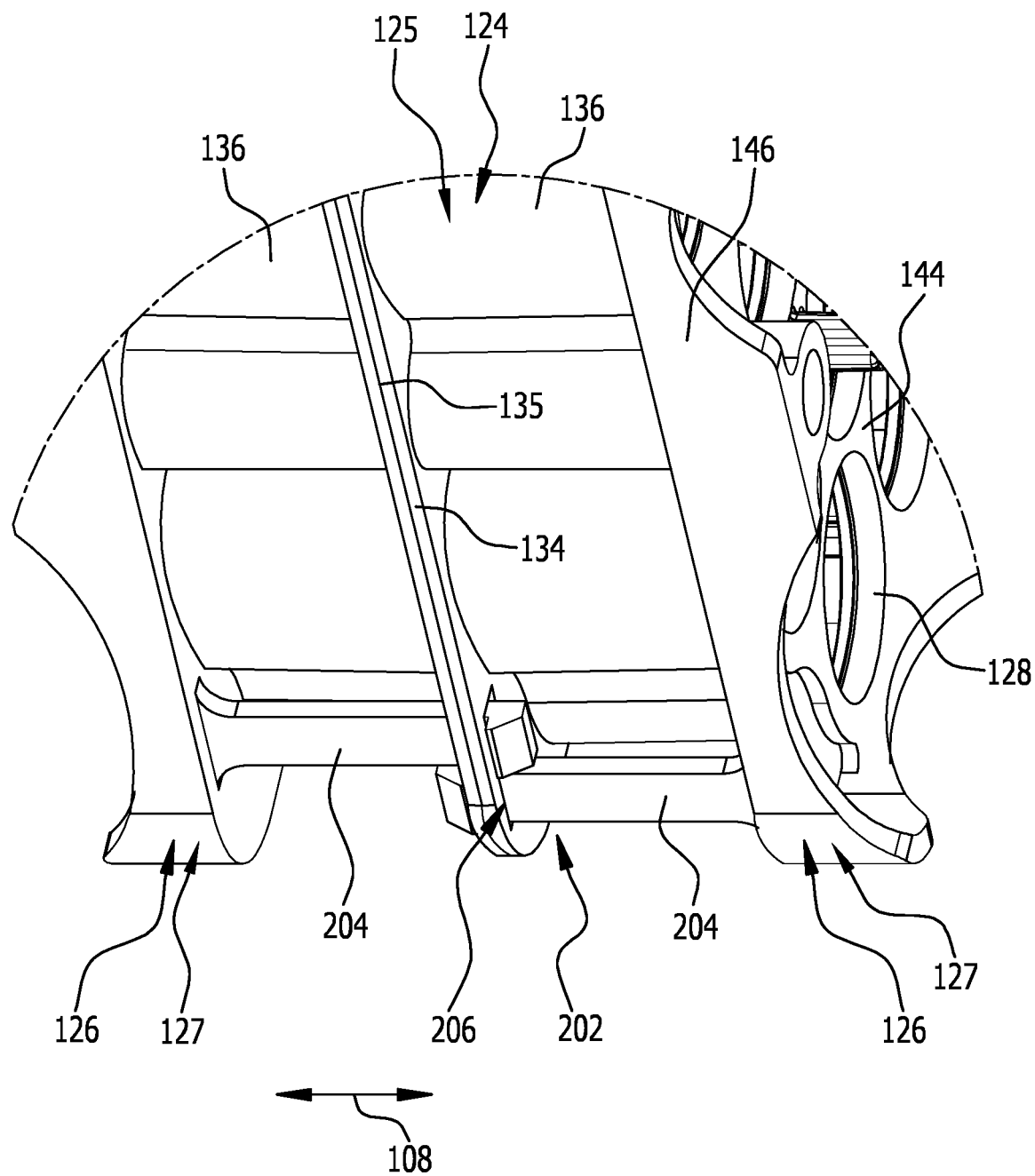
FIG. 20 an enlarged illustration of the region XX depicted in FIG. 7.

The latching device 202 (c.f. FIGS. 7, 8 and 20) preferably comprises latching projections 204 that are each arranged on a respective additional body 126 and a latching receptacle 206 that is arranged on the main body 124, in particular on the separator plate 134.

In particular, the latching receptacle 206 is a through opening in the separator plate 134 of the main body 124.

For the purposes of holding a main body 124 and two additional bodies 126 tightly together and/or for tightly holding a plurality of battery temperature regulation modules 102 together, the main body 124 and/or the two additional bodies 126 preferably comprise a plurality of feed-through openings 208 (c.f. FIGS. 6 and 11) for the purposes of feeding through a connecting element which is not illustrated in the Figures, wherein the feed-through openings 208 are preferably arranged such as to be coaxial with one another when the additional bodies 126 are arranged on the main body 124.

Consequently, the main body 124 can preferably then be screwed and/or clamped to the two additional bodies 126 in the connecting direction 108 by means of the mutually coaxially-arranged feed-through openings 208, in particular, by feeding one or more not graphically illustrated connecting elements through the feed-through openings 208, for example, by feeding a respective tie rod through the mutually coaxially-arranged feed-through openings 208.

Furthermore, it may be expedient for each of the additional bodies 126 of a battery temperature regulation module 102 to be connected to the main body 124 by means of a respective substance-to-substance bond.

For example, the additional bodies 126 are welded, for example, laser-welded to the main body 124 of the respective battery temperature regulation module 102.

It may be expedient for the additional bodies 126 to each be connected to the main body 124 by means of a substance-to-substance bond in a welding region which is not illustrated graphically in the Figures and is closed, in particular, in ring-like manner.

As an alternative or in addition thereto, a plurality of battery temperature regulation modules 102 can be screwed to each other and/or clamped to one another by means of mutually coaxially-arranged feed-through openings 208, in particular, by means of a common tie rod by means of which a plurality of battery temperature regulation modules 102 are adapted to be screwed to one another and/or clamped against each other in the connecting direction 108.

In the case of the exemplary embodiment of the battery temperature regulation device 100 that is illustrated FIGS. 1 to 20, the main body 124 and the two additional bodies 126 each comprise four feed-through openings for the purposes of feeding-through four tie rods for example.

Furthermore, the main body 124 and/or the two additional bodies 126 preferably each comprise contact surfaces 210 which are arranged on the main body 124 and/or on a respective additional body 126 in the region of a respective feed-through opening 208.

Preferably, the contact surfaces 210 are arranged such as to be at least approximately perpendicular to the connecting direction 108 of the battery temperature regulation device 100 and/or of a battery temperature regulation module 102.

It may be expedient for the contact surfaces 210 to completely surround a respective feed-through opening 208.

Furthermore, it may be expedient for the main body 124 and/or the two additional bodies 126 to each comprise contact surfaces 210 which surround the respective feed-through opening 208 on the two mutually remote sides thereof.

For the purposes of connecting a plurality of battery temperature regulation modules 102 to one another, provision may be made for the two additional bodies 126 of a battery temperature regulation module 102 to each comprise a plurality of supporting projections 212 (c.f. FIGS. 6, 7, 12 and 19).

The supporting projections 212 preferably extend parallel to the connecting direction 108 of the battery temperature regulation device 100 and/or of a battery temperature regulation module 102.

Preferably, a free end of the supporting projections 212 is arranged in a plane with the contact surfaces 210 of the two additional bodies 126 that are arranged on the side of the additional bodies 126 remote from the main body 124.

The supporting projections 212 preferably have a cross-shaped cross section perpendicular to the connecting direction 108.

The main body 124 and/or the two additional bodies 126 of a battery temperature regulation module 102 are preferably components of plastics material 214, in particular, injection moulded components 216.

It may be expedient for the main body 124 and/or the two additional bodies 126 to be components of plastics material 214 that are constructed in one piece, in particular injection moulded components 216 that are constructed in one piece.

The main body 124 and/or the two additional bodies 126 are preferably made of an injection mouldable plastics material 218, for example from a thermosetting or thermoplastic plastics material.

Furthermore, provision is preferably made for the sealing elements 132 of the sealing element arrangement to be components of plastics material 214, in particular injection moulded components 216.

The sealing elements 132 are preferably injection moulded components that are moulded onto the main body 124 and/or the two additional bodies 126.

The sealing elements 132 are preferably made of a sealing material 220.

In particular, the sealing material 220 is a flexible plastics material, in particular, an injection mouldable plastics material 218, for example an injection mouldable elastomer material.

The sealing elements 132 of the sealing element arrangement are preferably connected by a substance-to-substance bond to the main body 124 and/or the additional bodies 126 of a battery temperature regulation module 102.

Preferably, the sealing elements 132 of the sealing element arrangement 130 are moulded onto the main body 124 and/or onto the two additional bodies 126 in an injection moulding process, in particular in a two-component injection moulding process.

Preferably, the positioning projections 148 of the additional bodies 126 are overmoulded with the sealing material 220 of the sealing elements.

The main body 124 is preferably overmoulded with the sealing material 220 of a sealing element 132 at least in regions thereof.

In particular, provision is made for the connector sealing element 168 to be arranged on an outer surface 222 of the main body 124 and to be connected in one piece manner to a sealing element 132 which is located on an inner surface 224 of the main body 124 that is remote from the outer surface 222.

Figure 17:
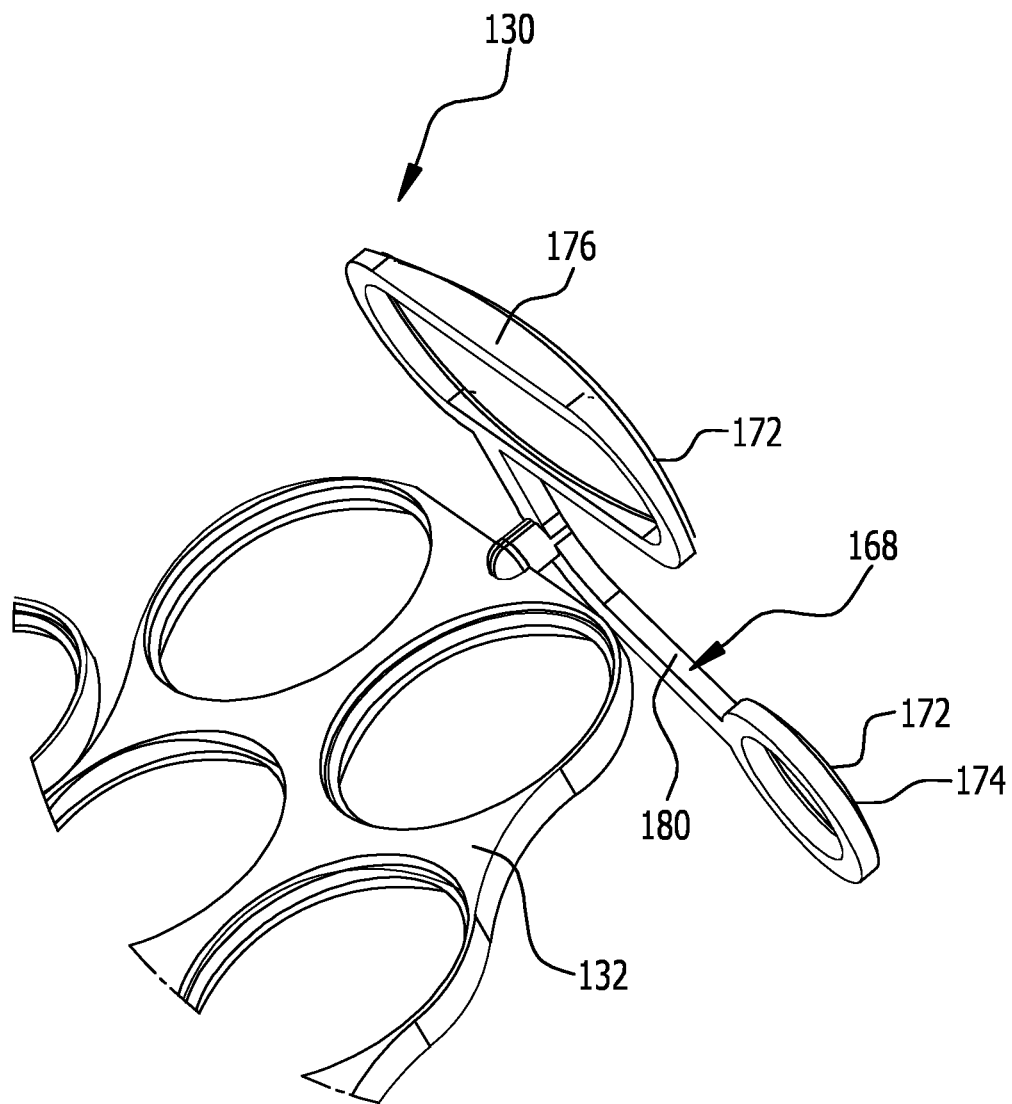
FIG. 17 an enlarged illustration of the region XVII depicted in FIG. 9.

The connector sealing element 168 that is located on the outer surface 222 of the main body 124 is preferably connected to the sealing element 132 that is located on the inner surface 224 of the main body 124 in the web region 180 (c.f. FIG. 17).

To this end, the main body 124 preferably comprises an injection opening 226 in the region of the receiving groove 182 through which sealing material 220 can be fed in when injecting the sealing elements 132.

The exemplary embodiment of the battery temperature regulation device 100 illustrated in FIGS. 1 to 20 preferably functions as follows:

A temperature regulation medium, for example water, can be supplied via the feed-in connector 120 of the temperature regulation medium supply line 112 through the temperature regulation medium supply line 112 to the temperature regulation circulation systems 110 of the respective battery temperature regulation modules 102 and there, from the temperature regulation medium inlet region 156, it reaches the temperature regulation medium outlet region 158 via the meandering temperature regulation channel 142.

Thereafter, the temperature regulation medium can be fed via the temperature regulation medium outlet 164 of each battery temperature regulation module 102 to the temperature regulation medium discharge line 114 and then removed therefrom via the discharge connector 122 of the temperature regulation medium discharge line 114.

An exemplary embodiment of a battery temperature regulation device 100 that is illustrated in FIGS. 21 to 38 differs from the exemplary embodiment of the battery temperature regulation device 100 illustrated in FIGS. 1 to 20 essentially in that the battery temperature regulation modules 102 each comprise a main body 124 and, in particular, only one additional body 126.

Figure 33:
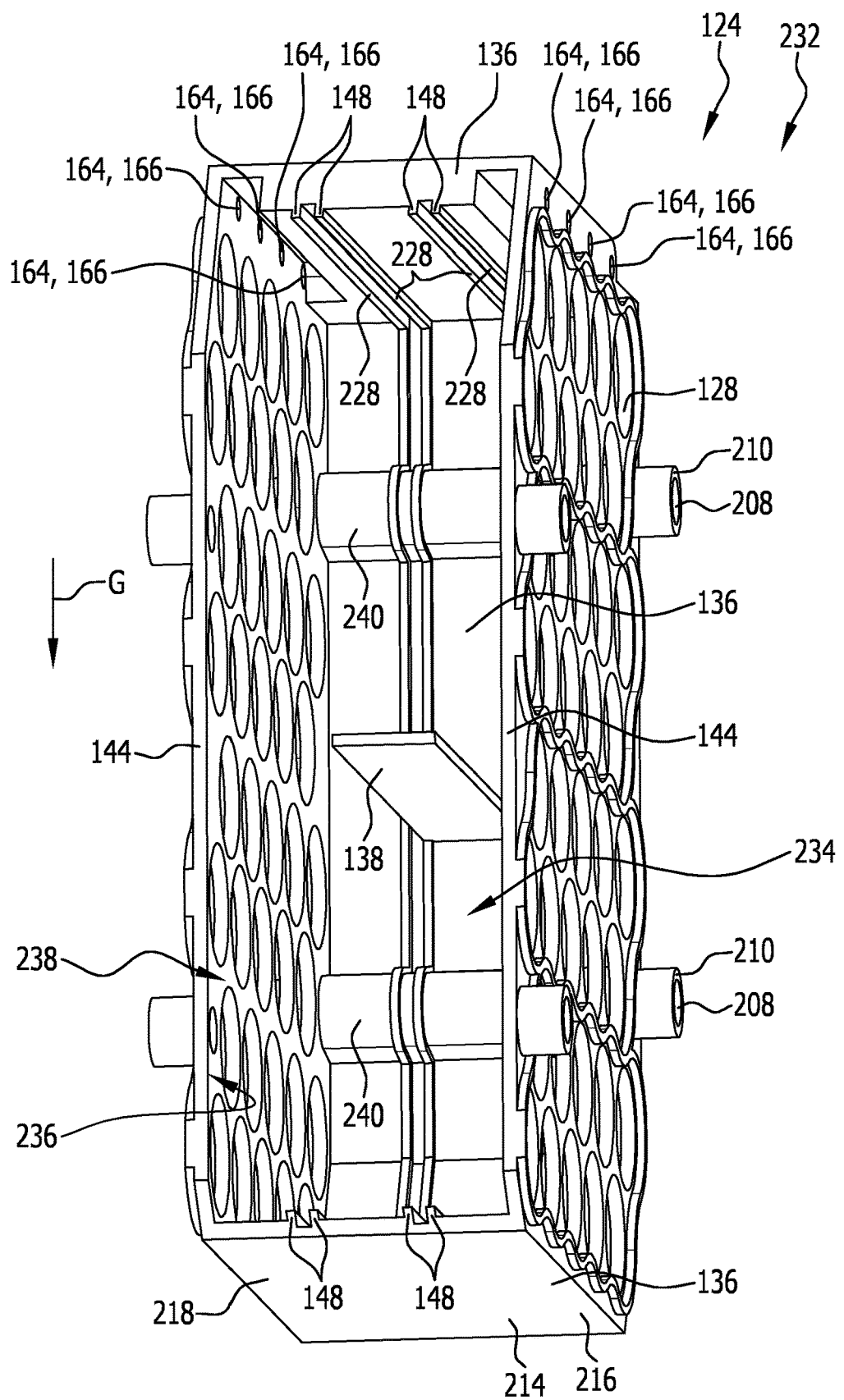
FIG. 33 a schematic perspective illustration of a main body of the battery temperature regulation module depicted in FIG. 26.
Figure 34:
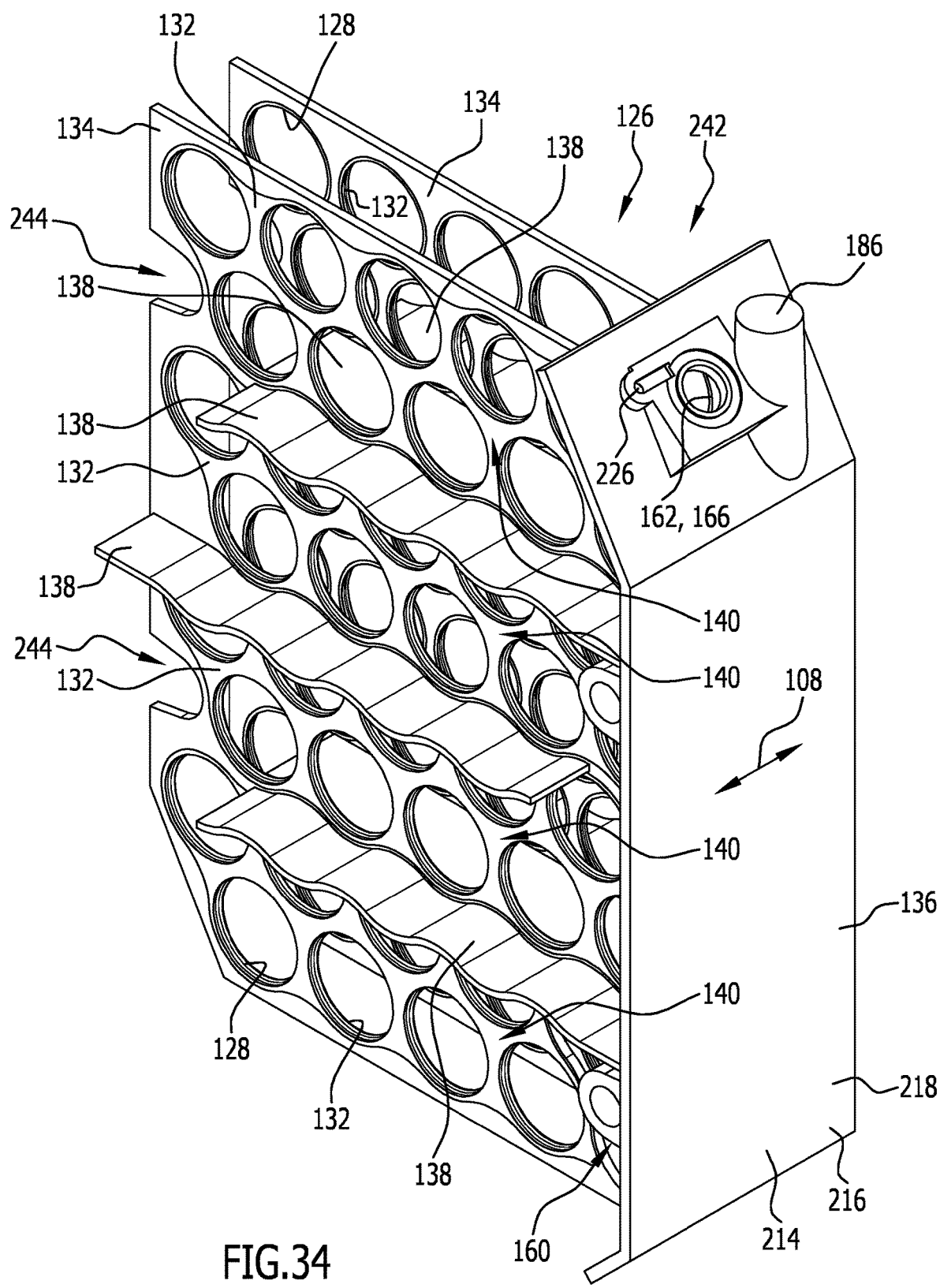
FIG. 34 a schematic perspective illustration of an additional body of the battery temperature regulation module depicted in FIG. 26 from the front.
Figure 35:
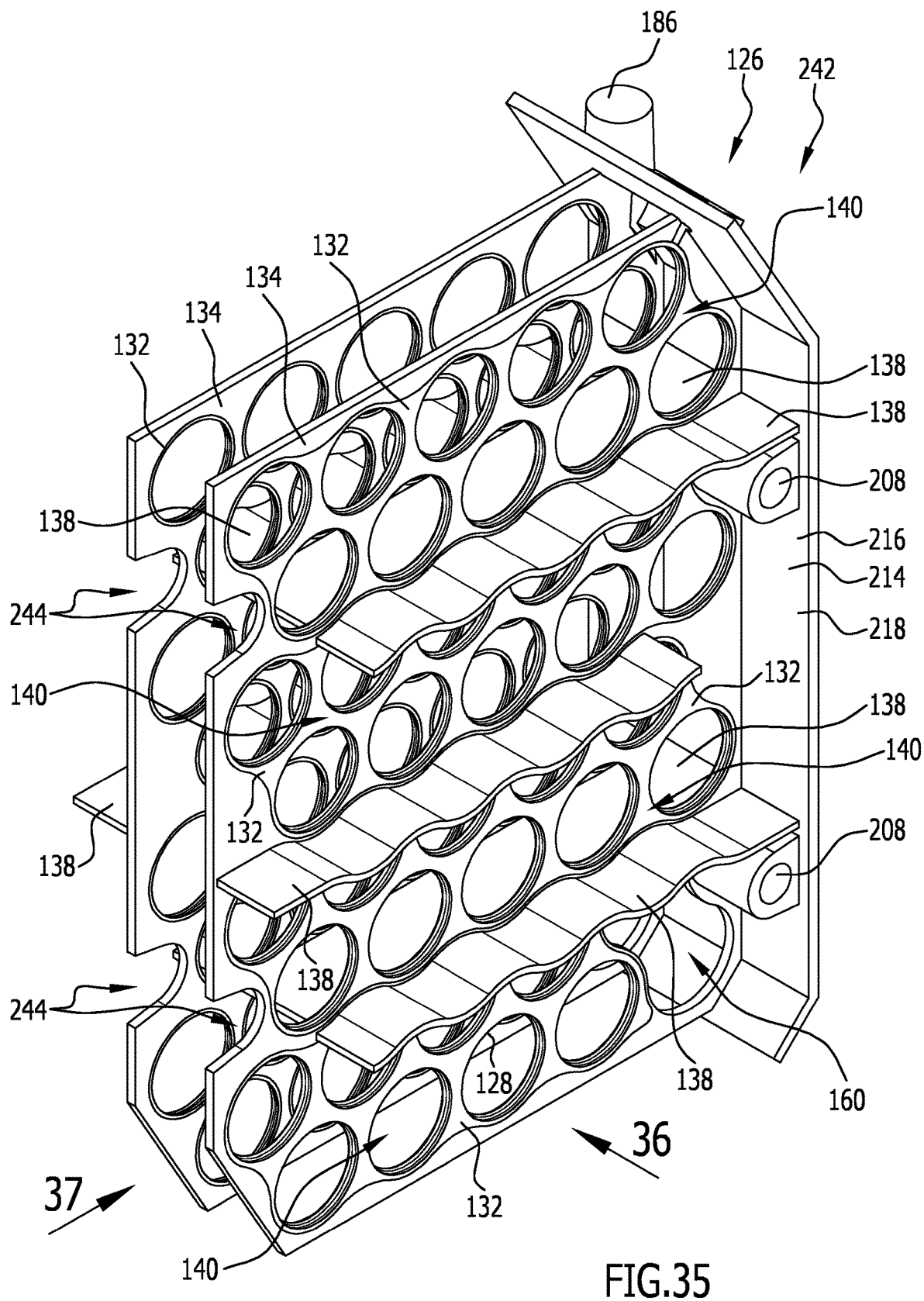
FIG. 35 a schematic perspective illustration of an additional body of the battery temperature regulation module depicted in FIG. 26 from the rear.
Figure 36:
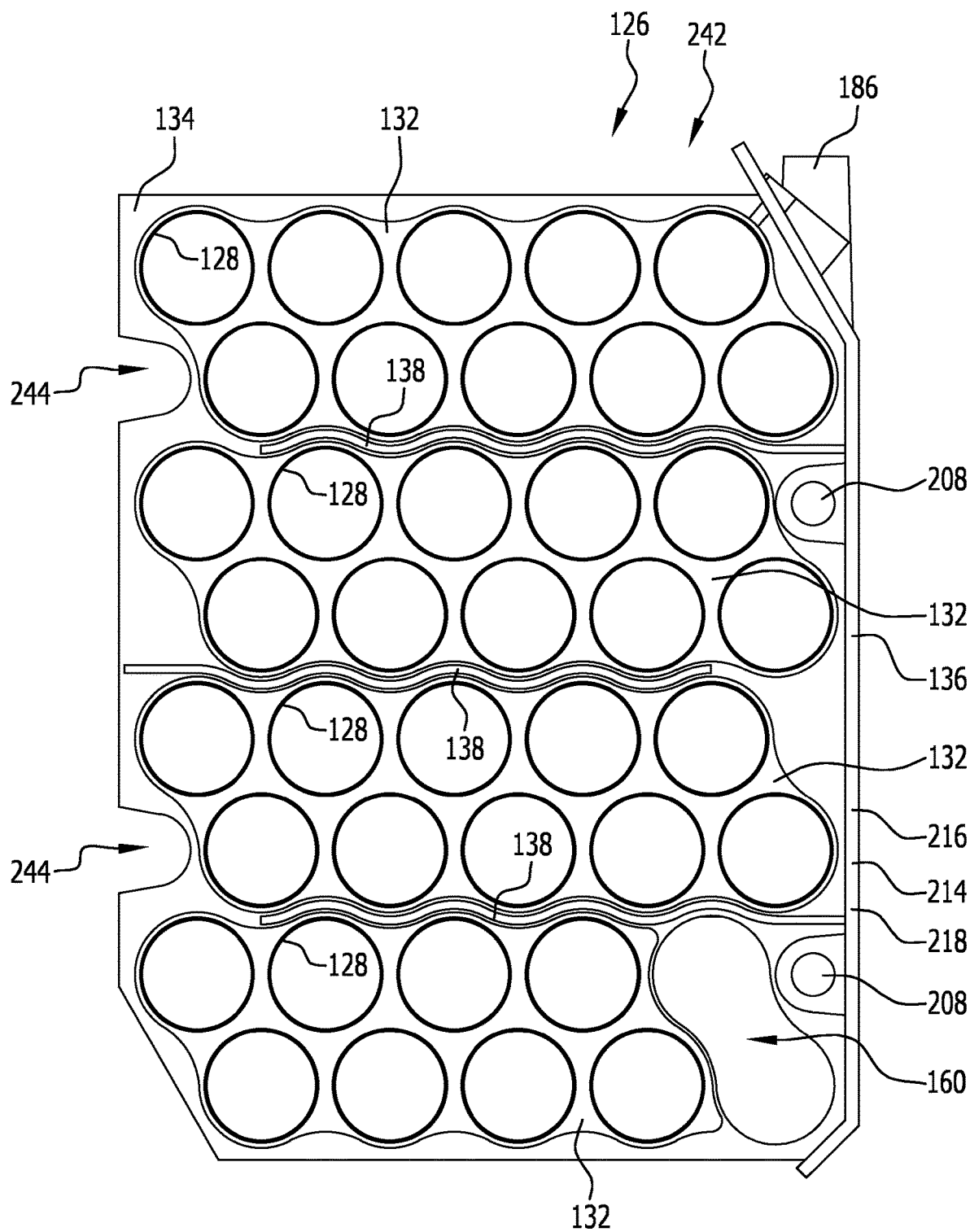
FIG. 36 a schematic plan view of the additional body depicted in FIG. 35 as viewed in the direction of the arrow 36 in FIG. 35.
Figure 37:
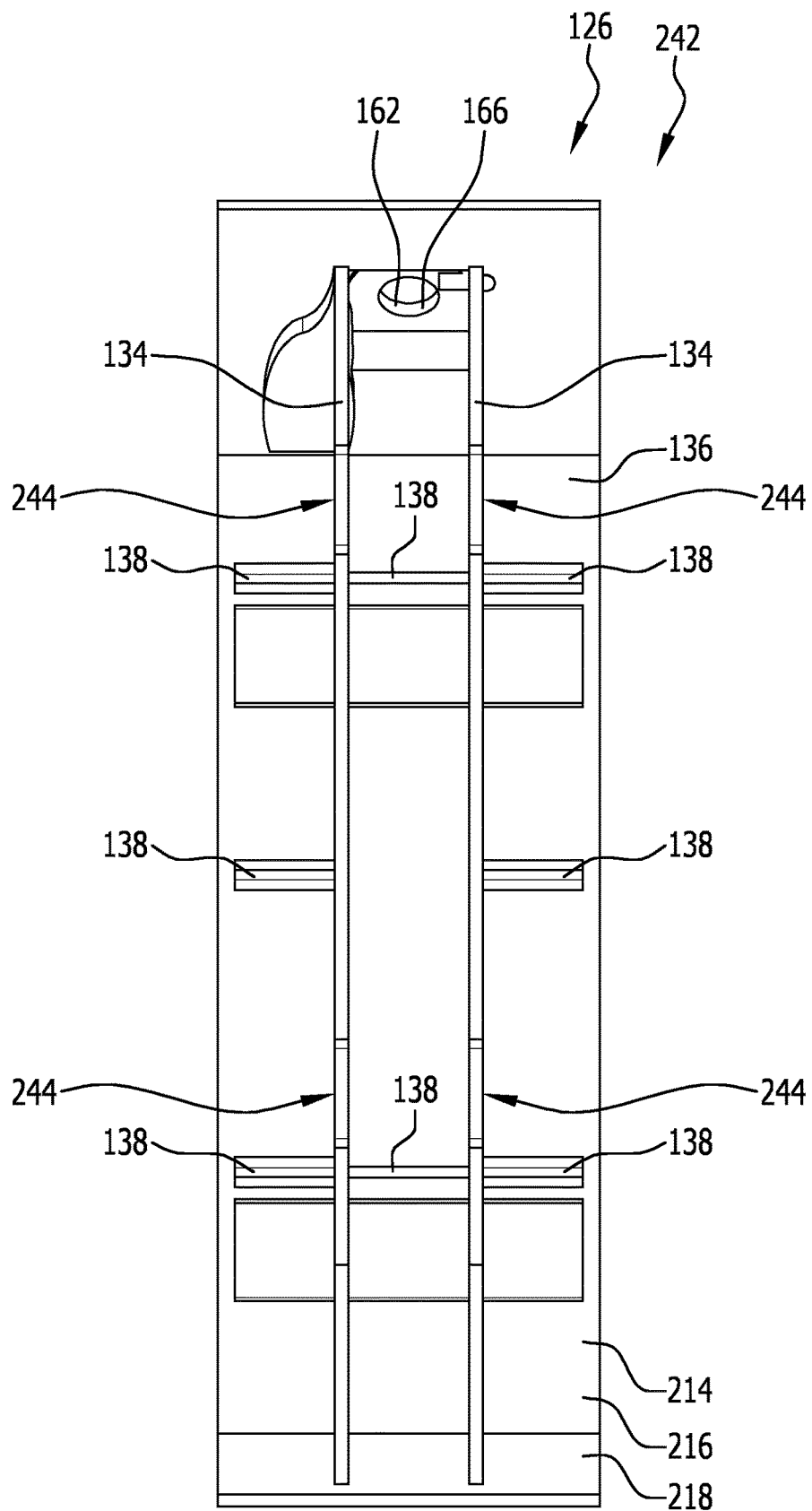
FIG. 37 a schematic plan view of the additional body depicted in FIG. 35 as viewed in the direction of the arrow 37 in FIG. 35.
Figure 38:
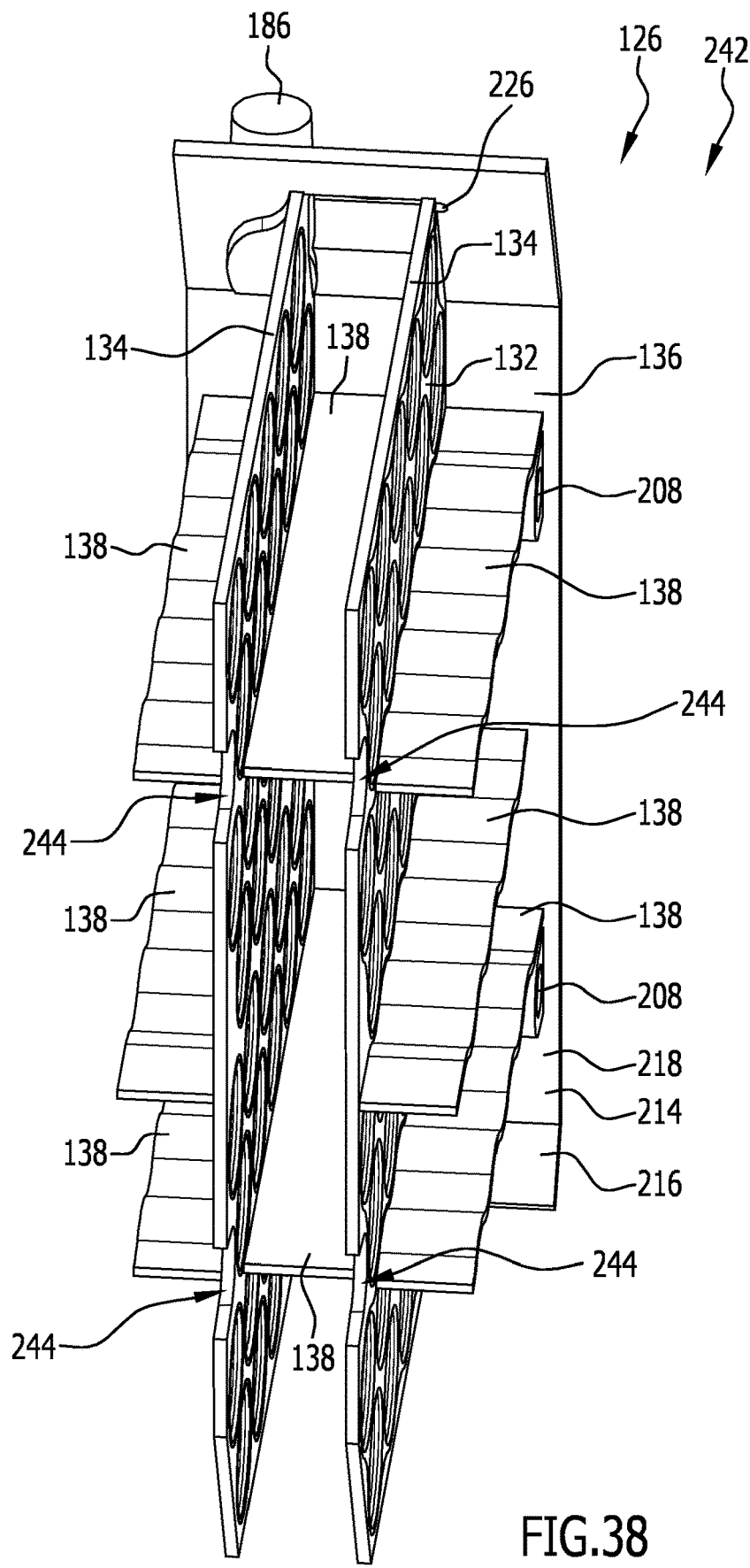
FIG. 38 a further schematic perspective illustration of the additional body depicted in FIG. 35 from the rear.

The additional body 126 illustrated in sole illustration in FIGS. 34 to 38 is preferably accommodated or receivable at least partially, in particular at least approximately entirely, in the main body 124 that is illustrated in the sole illustration in FIG. 33.

It may be particularly expedient if the main body 124 comprises positioning projections 148 which are arranged on the main body 124 and are constructed, in particular, in the form of guidance ribs 228.

Figure 28:
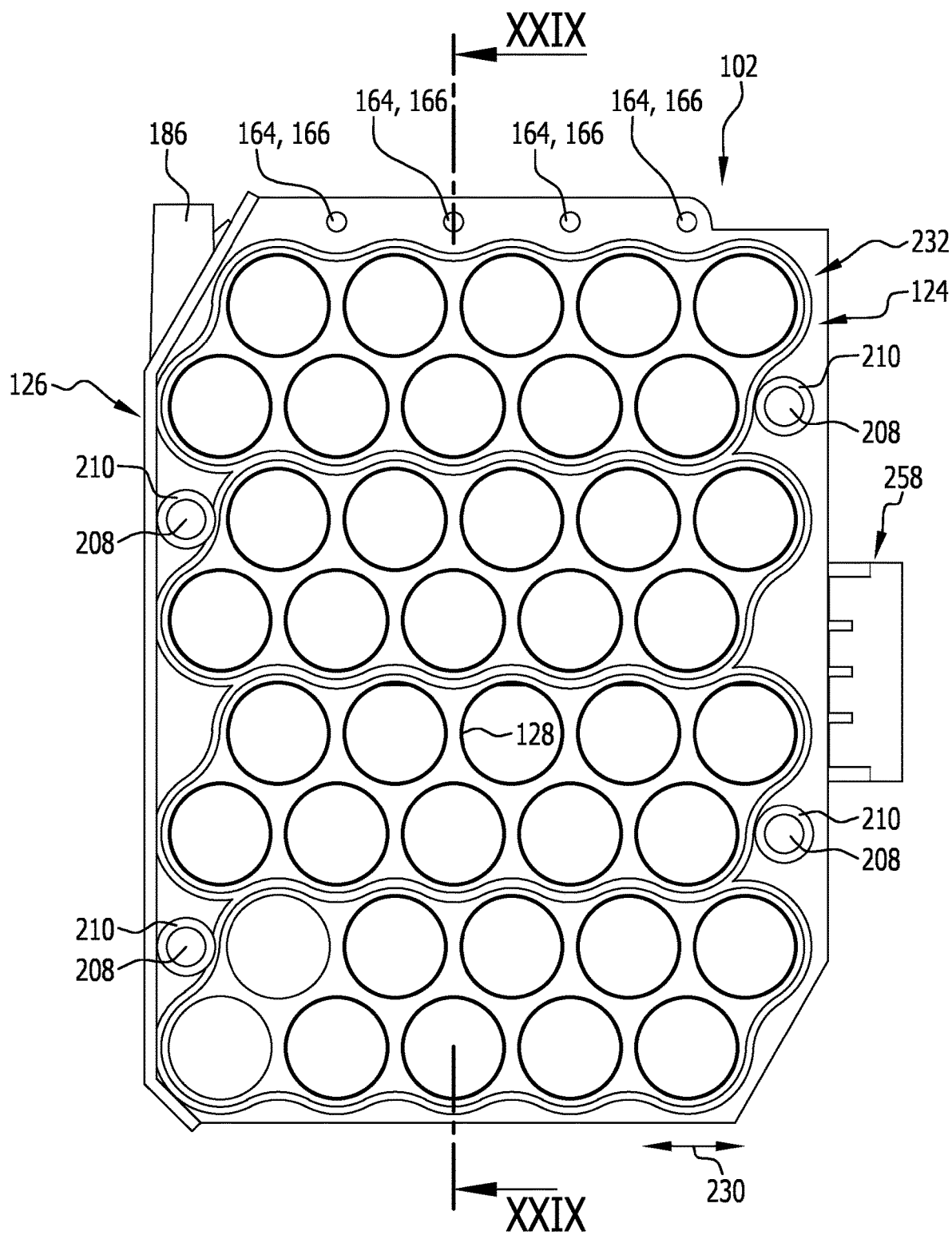
FIG. 28 a schematic plan view of the battery temperature regulation module depicted in FIG. 27 as viewed in the direction of the arrow 28 in FIG. 27.

Preferably, the additional body 126 of a respective battery temperature regulation module 102 is inserted into or is insertable into the main body 124 of the respective battery temperature regulation module 102 in an insertion direction 230 (c.f. FIG. 28).

In particular, the insertion direction 230 is a direction running transversely of and preferably perpendicular to the connecting direction 108 of the battery temperature regulation modules.

Figure 30:
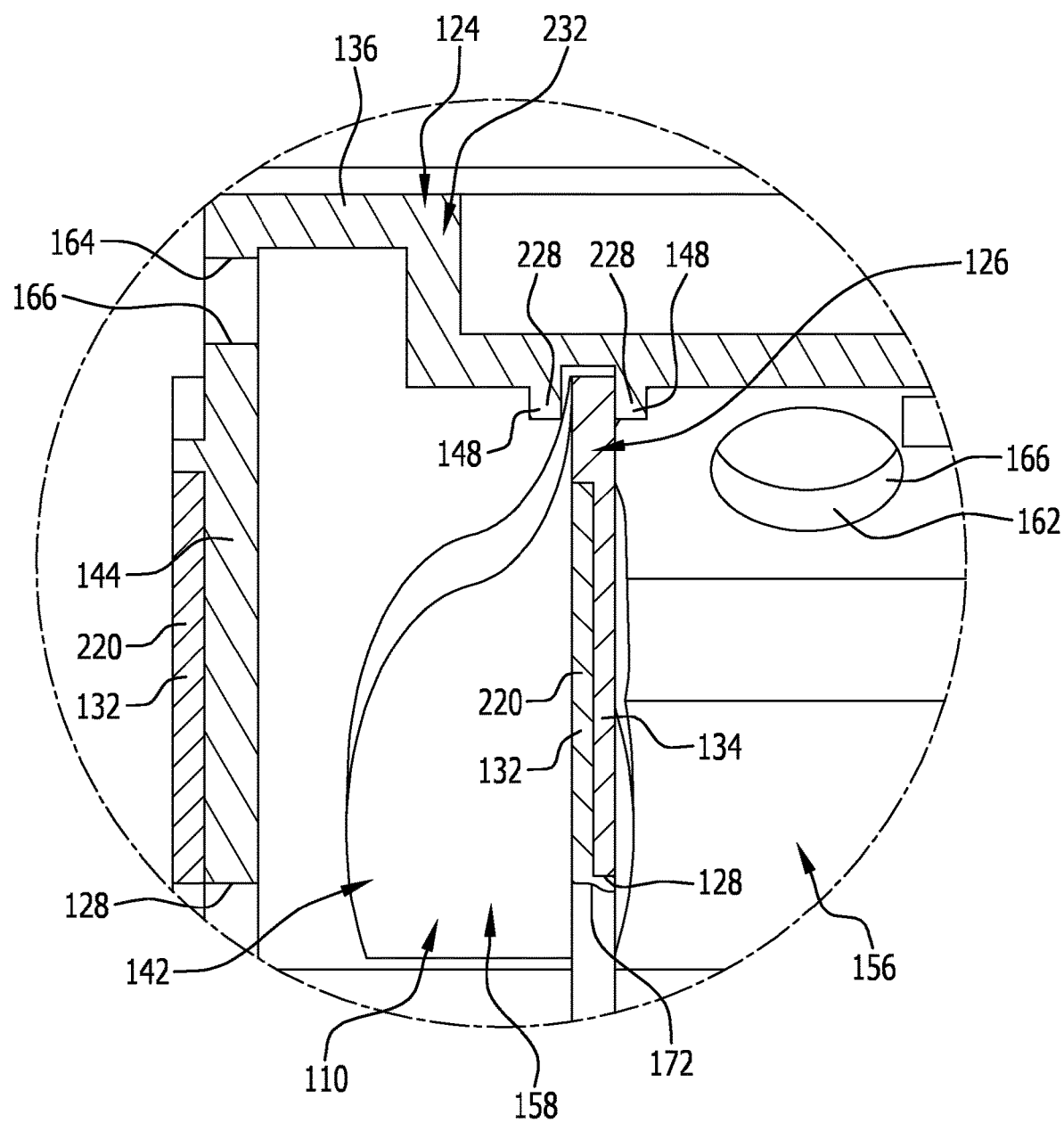
FIG. 30 an enlarged illustration of the region XXX depicted in FIG. 29.

The positioning projections 148, in particular the guidance ribs 228, are clearly perceptible in FIGS. 30 and 33.

The positioning projections 148, in particular the guidance ribs 228, preferably run at least approximately parallel to the insertion direction 230, i.e. in particular at least approximately perpendicularly to the connecting direction 108 of the battery temperature regulation modules 102.

Preferably, a plurality of pairs of positioning projections 148, in particular a plurality of pairs of guidance ribs 228, are arranged on the main body 124 of a respective battery temperature regulation module 102.

Preferably, two pairs of positioning projections 148, in particular two pairs of guidance ribs 228, are arranged on the main body 124.

The main body 124 of a respective battery temperature regulation module 102 that is illustrated in sole illustration in FIG. 33 is preferably box shaped.

In particular thereby, the main body 124 forms a receiving box 232.

The additional body 126 is preferably received or is receivable at least partially, in particular at least approximately entirely, in the receiving box 232.

The main body 124, in particular the receiving box 232 is preferably constructed such as to be open on at least one side.

Preferably, the main body 124, in particular the receiving box 232, is closed or closable upon reception of the additional body 126, in particular by the process of inserting the additional body 126 into the main body 124.

Hereby, the main body 124, in particular the receiving box 232, preferably comprises two cover plates 144 in which the receiving openings 128 of the main body 124 are arranged for receiving battery cells.

The two cover plates 144 are preferably arranged such as to be at least approximately parallel to each other and/or at least approximately parallel to the insertion direction 230 and/or at least approximately perpendicular to the connecting direction 108.

The main body 124, in particular the receiving box 232, preferably comprises an outer wall element which connects the two cover plates 144 to one another (c.f. FIG. 33).

The outer wall element 136 preferably extends away from the two cover plates 144 in a transverse direction, in particular at least approximately perpendicularly. Hereby, the outer wall element 136 extends at least approximately parallel to the connecting direction 108.

It may be expedient for the outer wall element 136 of the main body 124 and the two cover plates 144 to form a receiving box 232 for the additional body 126.

The outer wall element 136 surrounds, in a peripheral direction preferably on at least three-sides, a receiving space 234 of the receiving box 232 in which the additional body 126 is received or is receivable.

It may be expedient for an additional body 126 that is accommodated in the main body 124, in particular in the receiving box 232, to close the main body 124, in particular the receiving box 232, for example, by means of an outer wall element 136 of the additional body 126.

For example, it is conceivable for an outer wall element 136 of the additional body 126 to be connected to the main body 124 by a substance-to-substance bond, in particular at a surrounding edge region 236 of an insertion opening 238 of the main body 124.

The insertion opening 238, in particular the edge region 236, is preferably bounded by the two cover elements 144 as well as by the outer wall element 136 of the main body 124.

The main body 124 of the battery temperature regulation modules 102 of the exemplary embodiment of the battery temperature regulation device 100 that is illustrated in FIGS. 21 to 38 preferably comprises a plurality of temperature regulation medium outlets 164.

It may be expedient for the temperature regulation medium outlets 164 to be incorporated into the two cover plates 144 in an upper region thereof taken with respect to the direction of the force of gravity G.

In particular, the temperature regulation medium outlets 164 are through openings 166 in the cover plates 144 of the main body 124.

In the receiving space 234, two feed-through openings 208 of the main body 124 are preferably bounded relative to the receiving space 234 by a respective bead-like projection 240.

In particular, two feed-through openings 208 of the main body 124 run through a respective bead-like projection 240.

Hereby, the positioning projections 148, in particular the guidance ribs 228, preferably extend along a surface of the bead-like projection 240.

In particular, the additional body 126 that is preferably inserted into or is insertable into the main body 124 and is illustrated in sole illustration in FIGS. 34 to 38 forms a plug-in body 242.

The additional body 126 of a respective battery temperature regulation module 102 preferably comprises two separator plates 134.

The receiving openings 128 of the additional body 126 are preferably incorporated into the separator plates 134.

The two separator plates 134 are preferably arranged such as to be at least approximately parallel to each other and/or at least approximately parallel to the insertion direction 230 and/or at least approximately perpendicularly to the connecting direction 108.

The separator plates 134 of the additional body 126 are preferably received or are receivable between a respective pair of positioning projections 148, in particular between a pair of guidance ribs 228.

Furthermore, the additional body 126 preferably comprises an outer wall element 136.

The outer wall element 136 is preferably arranged such as to be transverse, in particular at least approximately perpendicular, to the separator plates 134 of the additional body 126.

The separator plates 134 of the main body 124 preferably extend away from the outer wall element 136 of the additional body 126, in particular, at least approximately perpendicularly.

Furthermore, it may be expedient for the additional body 126 to comprise a plurality of partition wall elements 138 which extend away from the separator plates 134 of the additional body 126.

In particular, the partition wall elements 138 extend away from the separator plates 134 at least approximately parallel to the connecting direction 108 of the battery temperature regulation modules 102.

It may be expedient thereby for the partition wall elements 138 to bound channel sections 140 of a temperature regulation channel 142 running through a battery temperature regulation module 102.

As is readily apparent from FIGS. 34 to 38, the additional body 126 comprises a plurality of recesses 244 for the bead-like projections 240 of the main body 124.

In particular, two recesses 244 are incorporated into the two separator plates 134.

Due to the provision of the recesses 244 in the separator plates 134, the effect can preferably be achieved that the additional body 126 together with the separator plates 134 are insertable in their entirety in the insertion direction 230 into the receiving space 234 of the main body 124 until the separator plates 134 are each arranged entirely between the positioning projections 148, in particular between the guidance ribs 228, and the separator plates 134 abut at a peripheral region thereof on the outer wall element 136 of the main body 124.

With the additional body 126 inserted into the main body 124, it may be expedient for the two separator plates 134 of the additional body 126 together with an outer wall element 136 of the additional body 126 and/or together with the outer wall element 136 of the main body 124 to bound a temperature regulation medium inlet region 156 of the battery temperature regulation modules 102 of the exemplary embodiment of the battery temperature regulation device 100 that is illustrated in FIGS. 21 to 38 (see for example FIGS. 29 to 32).

In order to achieve the effect that the temperature regulation channel 142 follows a meandering path in the temperature regulation medium inlet region 126, provision is preferably made for the main body 124 to comprise a further partition wall element 138 which projects from the outer wall element 136 of the main body 124 into the receiving space 134, in particular at least approximately parallel to the insertion direction 230 and/or at least approximately perpendicularly to the direction of the force of gravity.

In particular, the partition wall element 138 of the main body 124 is provided in order to enable demoulding of the additional body 126 and, at the same time, to enable a meandering path of the temperature regulation channel in the temperature regulation medium inlet region to be obtained.

Figure 29:
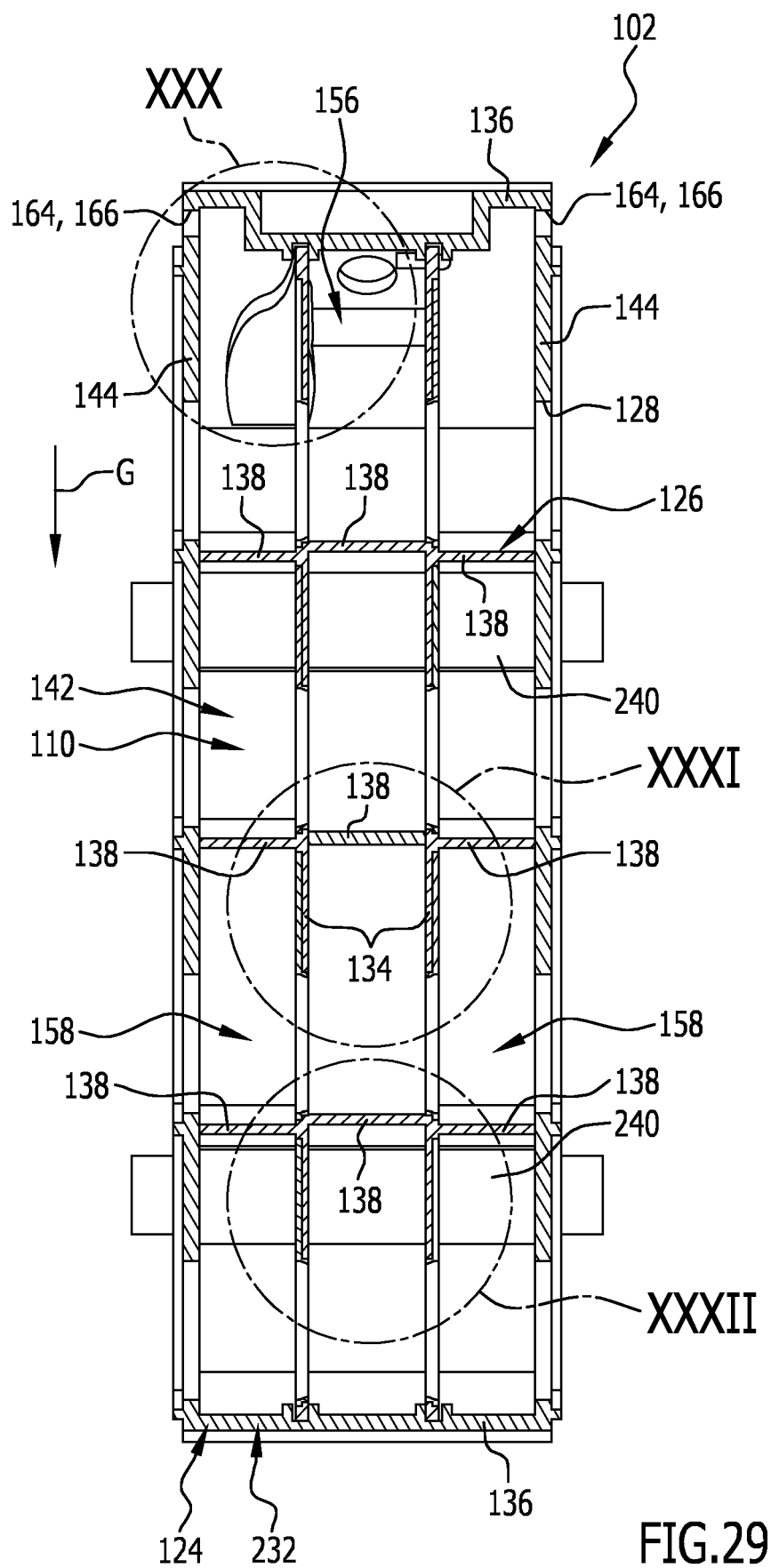
FIG. 29 a schematic section through the battery temperature regulation module depicted in FIG. 28 along the line XXIX-XXIX in FIG. 28.
Figure 31:
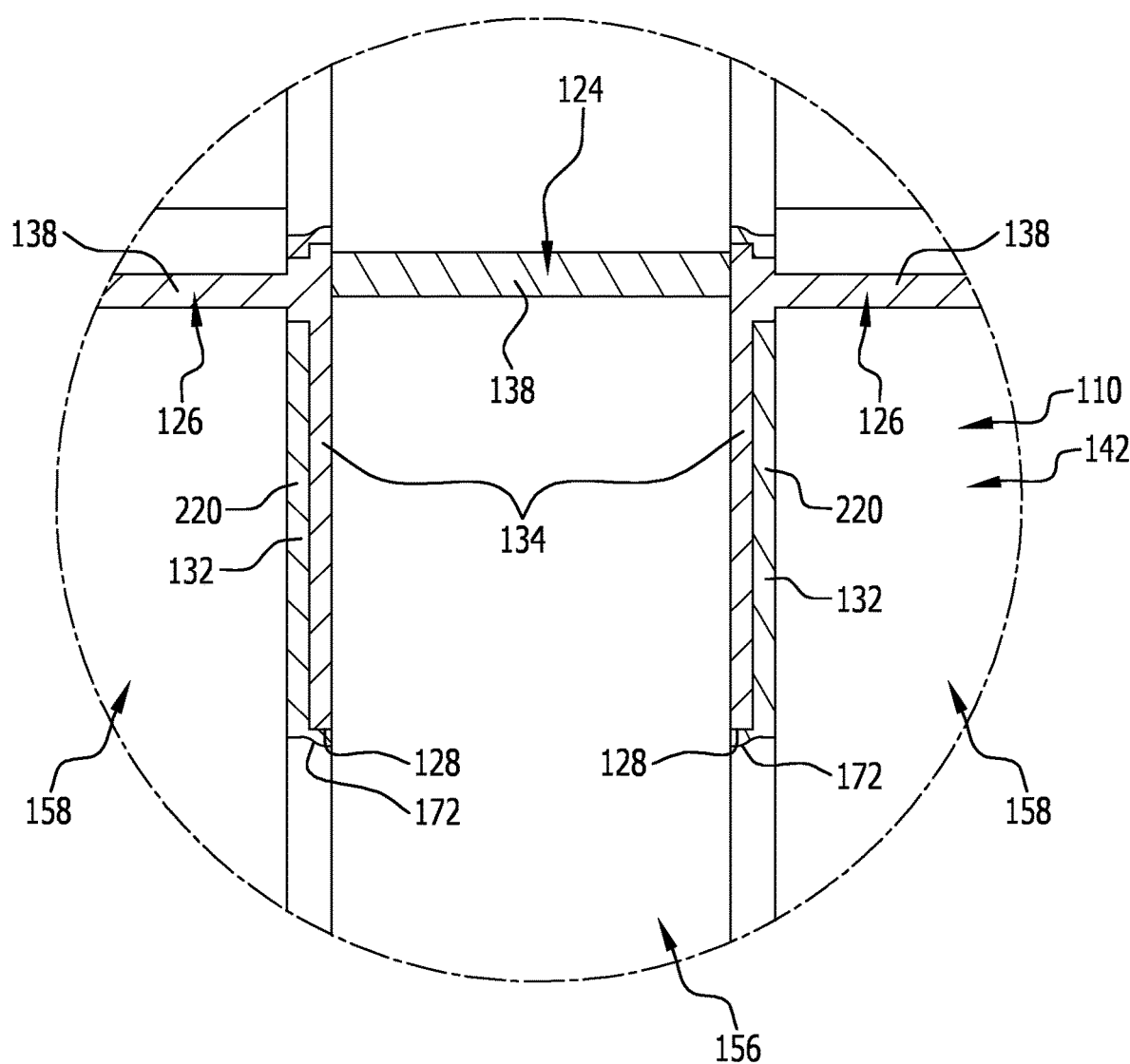
FIG. 31 an enlarged illustration of the region XXXI depicted in FIG. 29.
Figure 32:
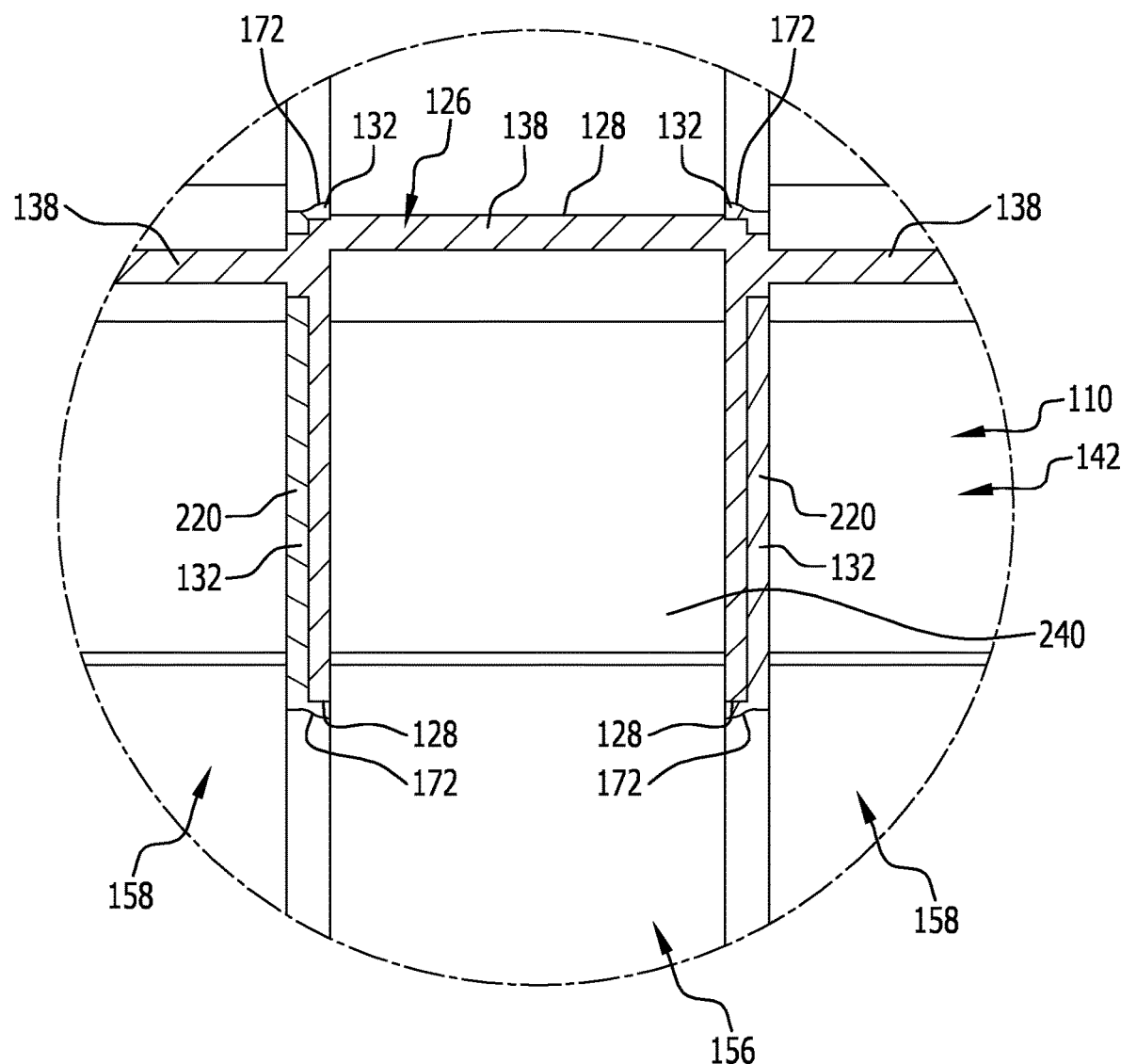
FIG. 32 an enlarged illustration of the region XXXII depicted in FIG. 29.

Coming back now to FIGS. 29 to 31, it is clearly perceptible that each separator plate 134 of the additional body 126, each cover plate 144 of the main body 124, the outer wall element 136 of the additional body 126 and/or the outer wall element 136 of the main body 124 bounds in particular a respective temperature regulation medium outlet region 158.

Consequently, the battery temperature regulation modules 102 of the exemplary embodiment of the battery temperature regulation device 100 that is illustrated in FIGS. 21 to 38 preferably each comprise a temperature regulation medium inlet region 156 and/or two temperature regulation medium outlet regions 158.

The temperature regulation medium outlet regions 158 are preferably each arranged substantially between a separator plate 134 of the additional body 126 and a cover plate 144 of the main body 124.

A temperature regulation medium is preferably feedable to a temperature regulation circulation system 110 of the battery temperature regulation modules 102 by way of the temperature regulation medium inlet 162 that is arranged on the additional body 126.

The temperature regulation medium is then conveyable from the temperature regulation medium inlet region 156 via a through opening 160 in the separator plates 134 of the additional body 126 (c.f. FIGS. 34 to 38) into the two temperature regulation medium outlet regions 158.

If the temperature regulation circulation system 110 of the battery temperature regulation modules 102 of the exemplary embodiment of the battery temperature regulation device 100 that is illustrated in FIGS. 21 to 38 is at least approximately completely filled with a temperature regulation medium, then the temperature regulation medium that has been supplied by way of the temperature regulation medium inlet 162 to the temperature regulation circulation system 110 can be fed out from the temperature regulation circulation system 110 by way of the temperature regulation medium outlets 164 of the main body 124.

Hereby, in contrast to the exemplary embodiment of the battery temperature regulation device 100 that is illustrated in FIGS. 1 to 20, the temperature regulation medium is preferably not removable directly from the temperature regulation circulation system 110 of the respective battery temperature regulation module 102 by means of a temperature regulation medium discharge line 114.

Figure 23:
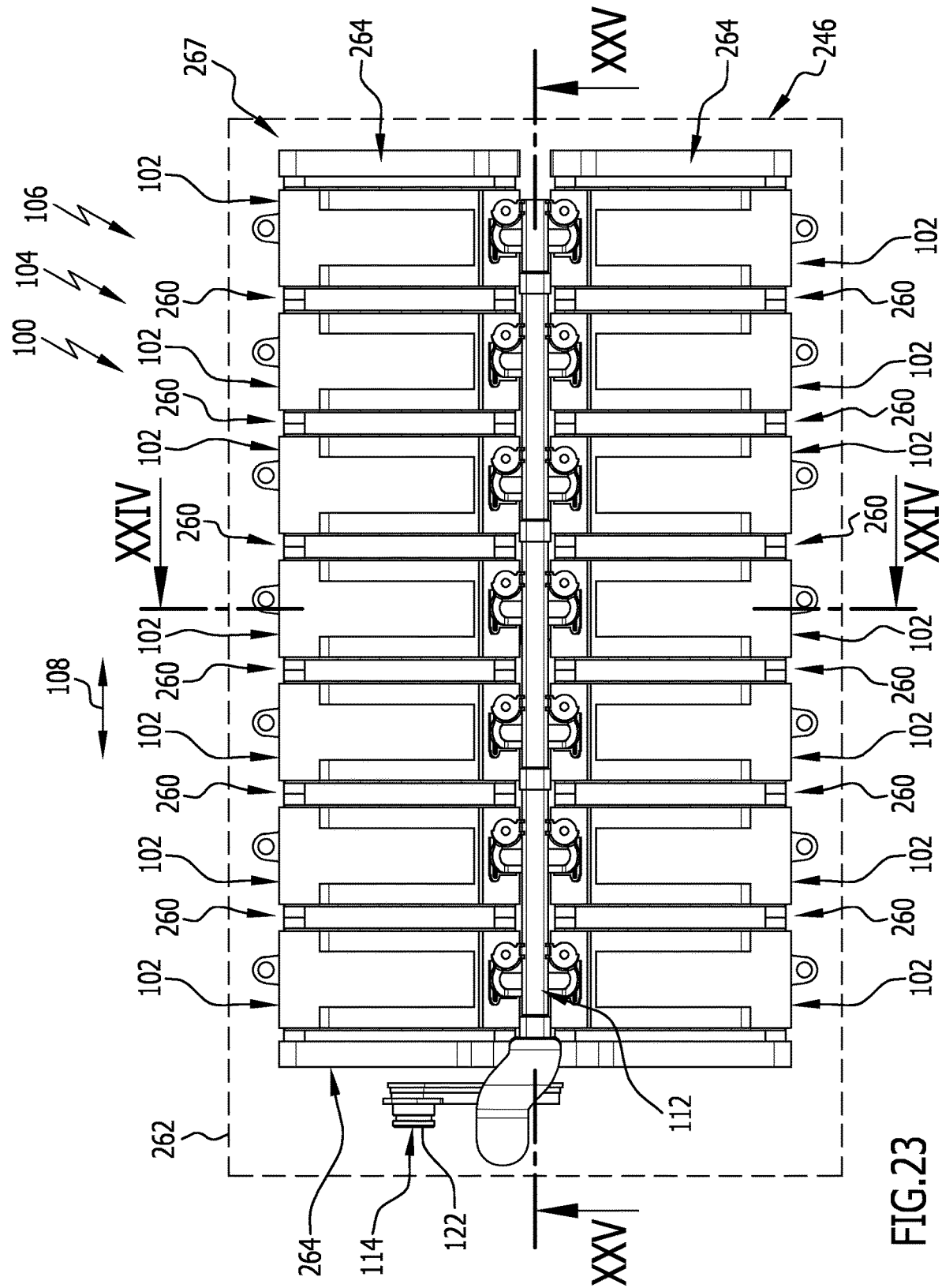
FIG. 23 a schematic plan view of the battery temperature regulation device depicted in FIG. 21 as viewed in the direction of the arrow 23 in FIG. 21.
Figure 24:
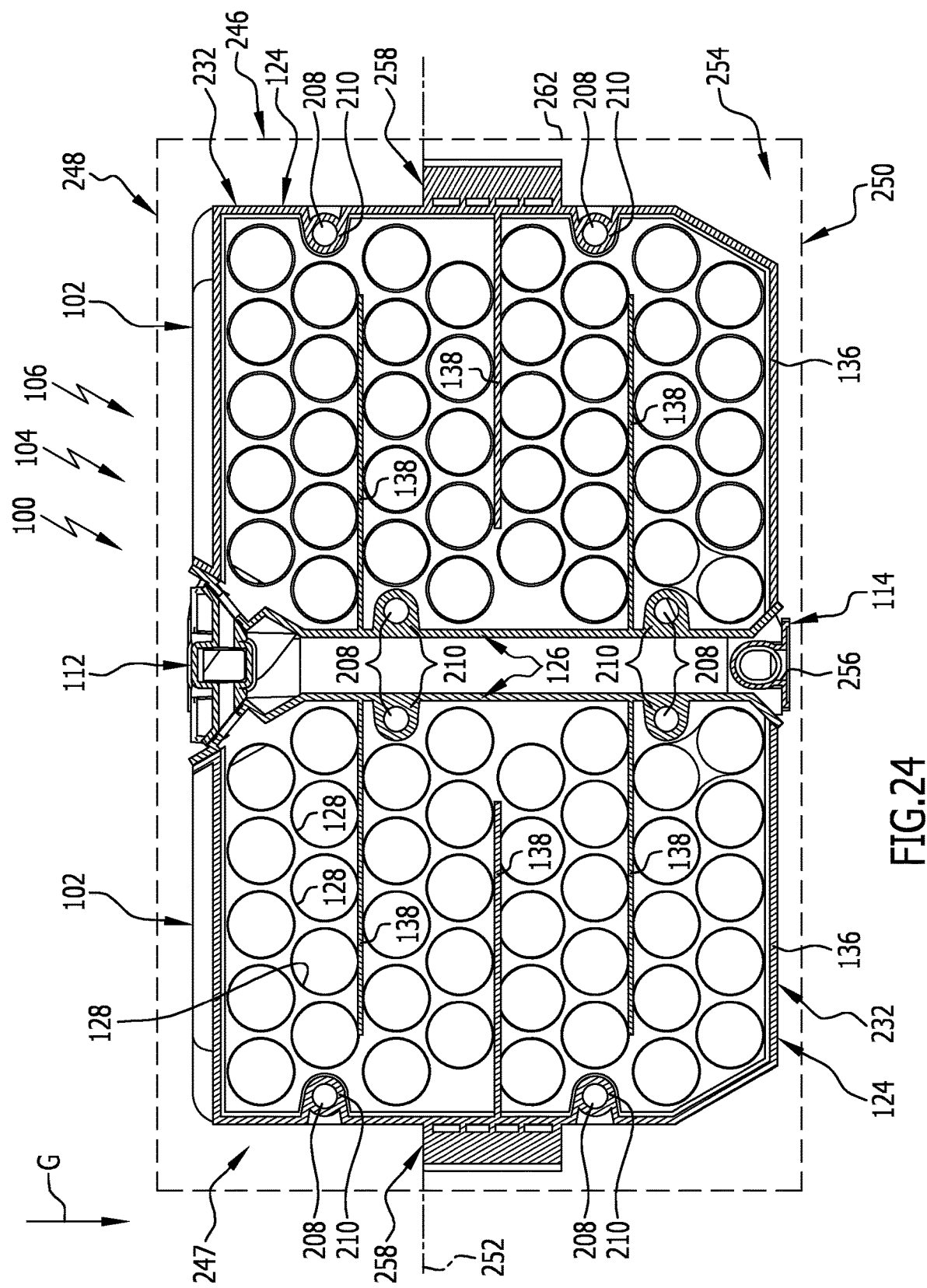
FIG. 24 a schematic section through the battery temperature regulation device depicted in FIG. 23 along the line XXIV-XXIV in FIG. 23.

Rather, the exemplary embodiment of the battery temperature regulation device 100 that is illustrated in FIGS. 21 to 38 comprises a receiving housing 246 for accommodating the battery temperature regulation modules 102 of the battery temperature regulation device 100 (see for example FIGS. 23 and 24).

In particular, the battery temperature regulation modules 102 are arranged in an interior space 247 of the receiving housing 246.

The receiving housing 246 is preferably constructed in multipart form, in particular in at least two-piece form.

The receiving housing 246 preferably comprises an upper receiving housing part 248 and a lower receiving housing part 250.

The upper receiving housing part 248 and the lower receiving housing part 250 are preferably connected or are connectible to one another in fluid-tight manner, in particular in the region of an interface plane 252.

The receiving housing 246 preferably comprises a temperature regulation medium collecting region 254 in which there is collectable a temperature regulation medium that emerges from the battery temperature regulation modules 102, in particular from the temperature regulation medium outlets 164 of the battery temperature regulation modules 102.

The temperature regulation medium collecting region 254 is preferably arranged in a region of the receiving housing 246 that is lower in the direction of the force of gravity G.

It may be expedient for at least the lower receiving housing part 250 to be constructed such as to be fluid-tight and thus to form in particular the temperature regulation medium collecting region 254.

Figure 25:
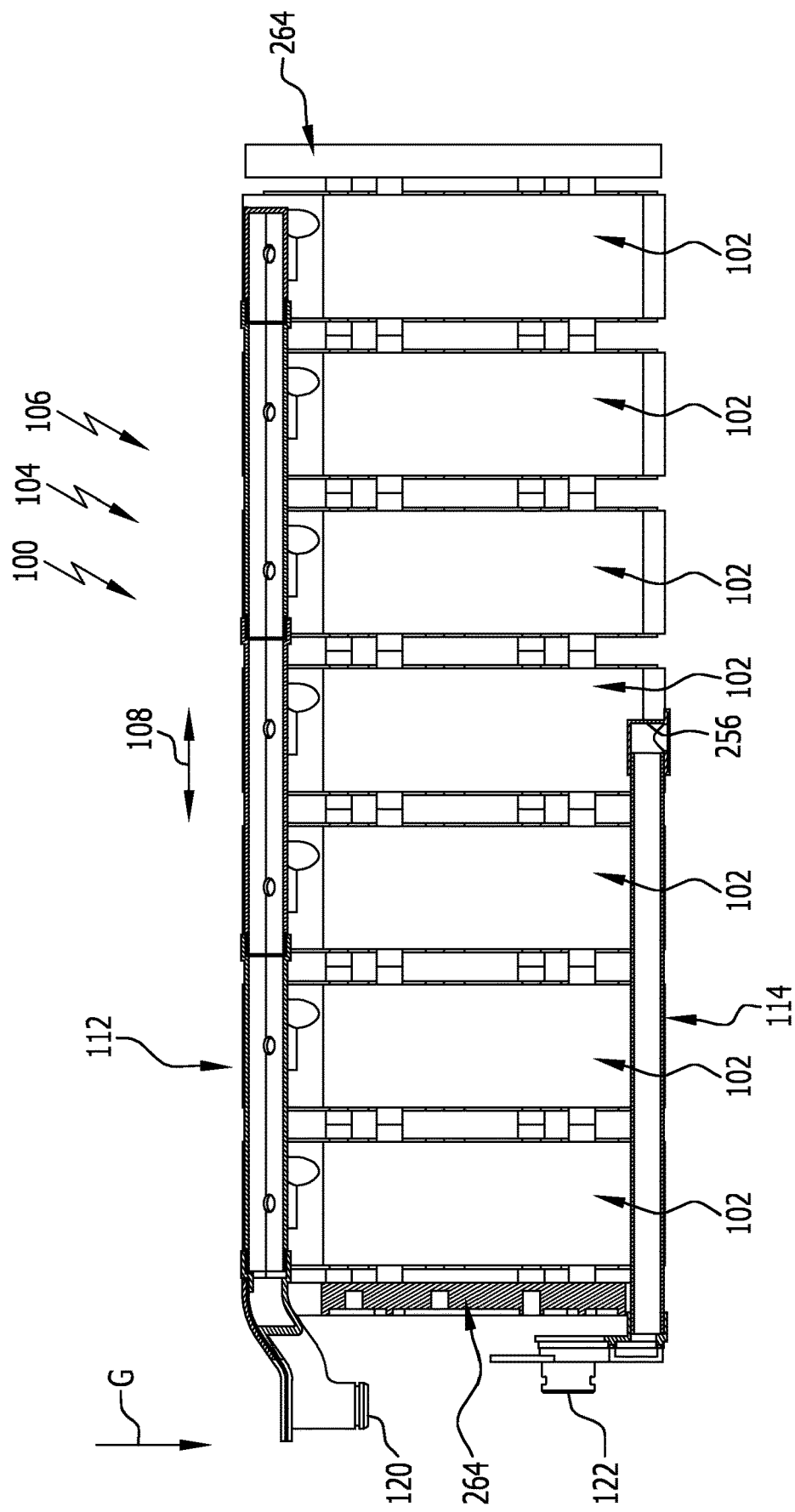
FIG. 25 a schematic section through the battery temperature regulation device depicted in FIG. 23 along the line XXV-XXV in FIG. 23.
Figure 26:
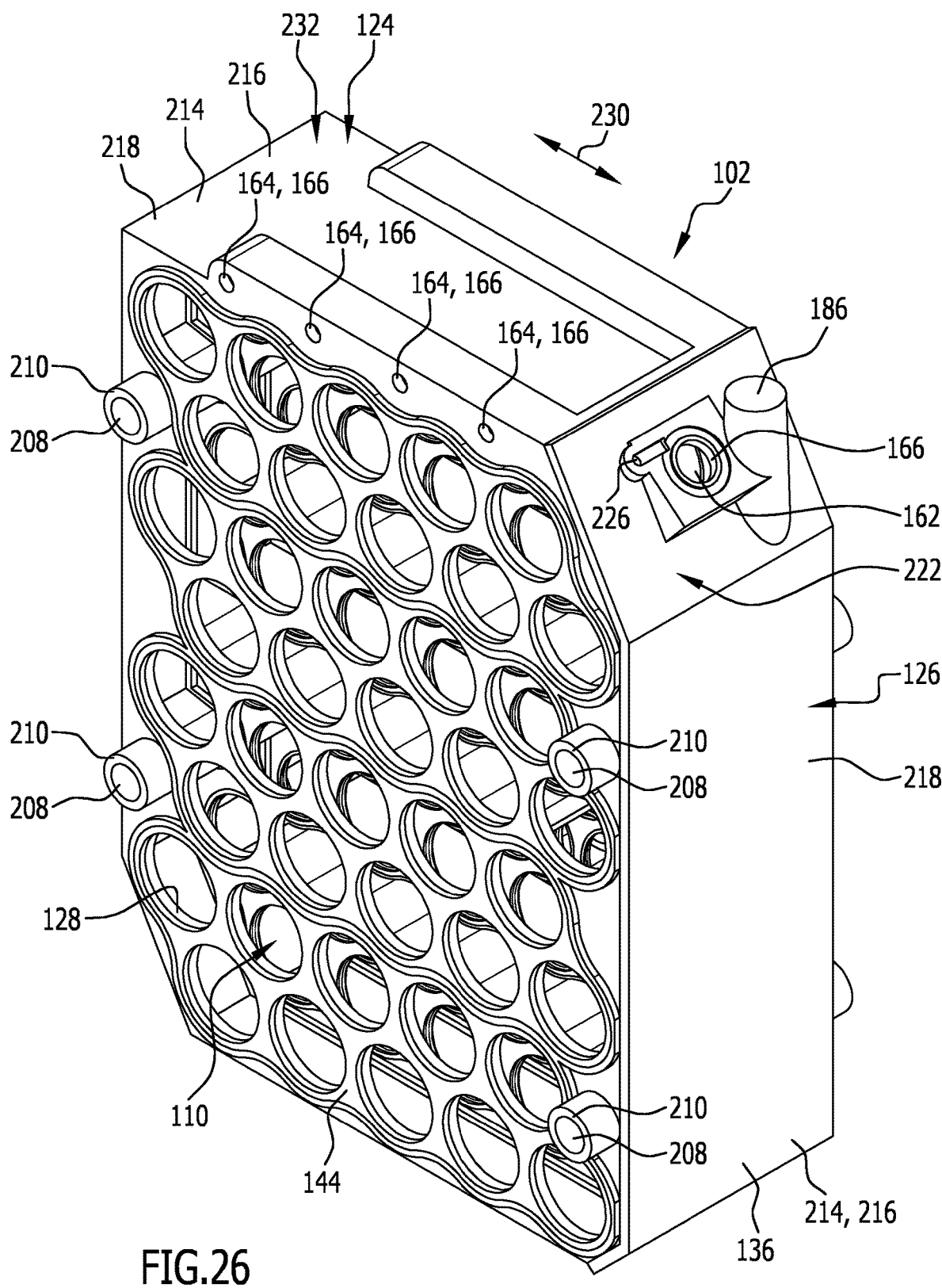
FIG. 26 a schematic perspective illustration of a battery temperature regulation module of the battery temperature regulation device depicted in FIG. 21 from the front.
Figure 27:
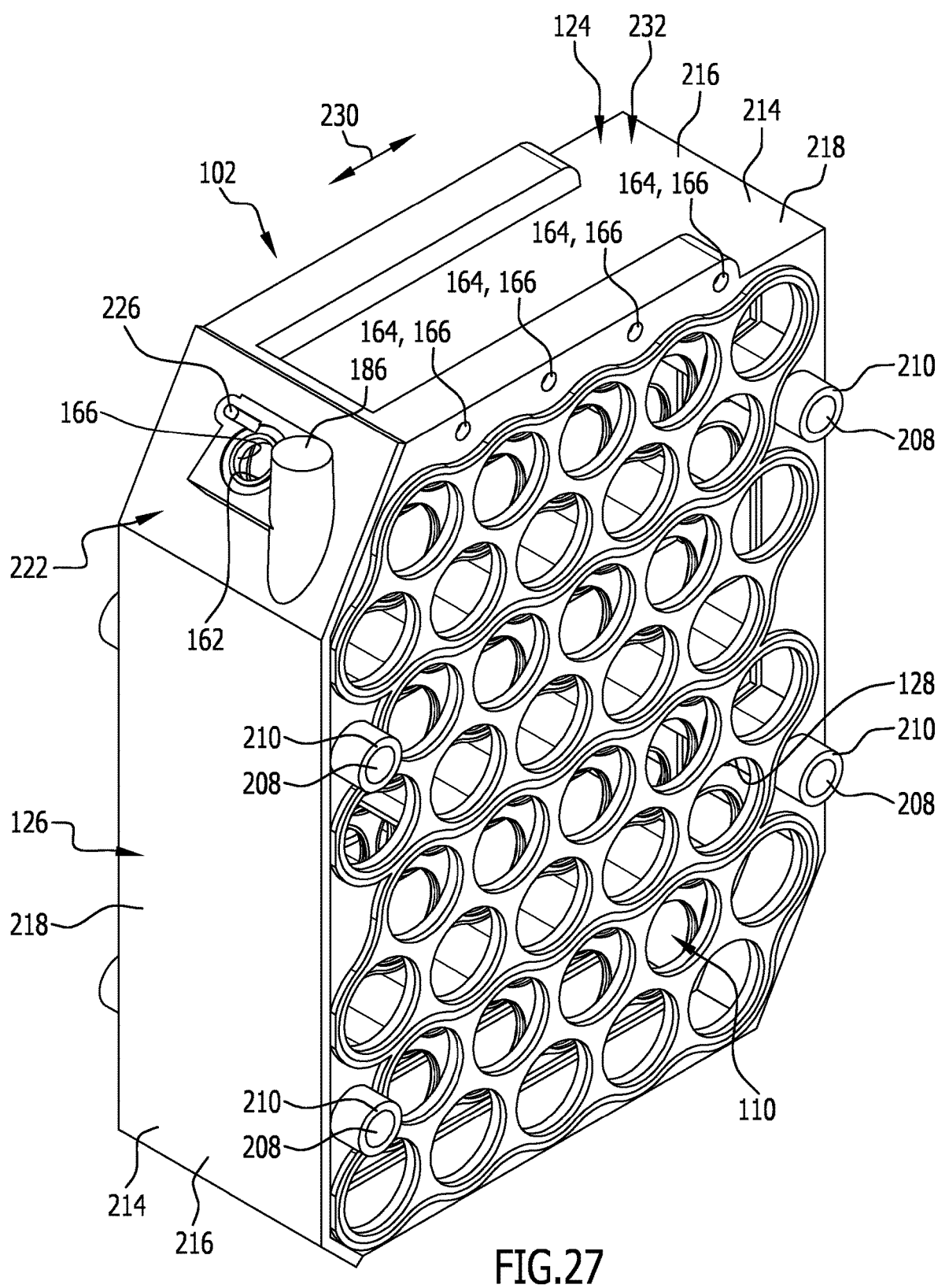
FIG. 27 a schematic perspective illustration of a battery temperature regulation module of the battery temperature regulation device depicted in FIG. 21 from the rear.

As is clearly perceptible from FIGS. 24 and 25 in particular, the exemplary embodiment of the battery temperature regulation device 100 that is illustrated in FIGS. 21 to 38 comprises a temperature regulation medium discharge line 114 by means of which the temperature regulation medium is removable from the temperature regulation medium collecting region 254 of the receiving housing 246.

Hereby, the temperature regulation medium discharge line 114 preferably comprises a suction opening 256 which is arranged in the temperature regulation medium collecting region 254.

Preferably, the temperature regulation medium is adapted to be sucked out of the temperature regulation medium collecting region 254 by means of the suction opening 256 of the temperature regulation medium discharge line 114.

The discharge connector 122 of the temperature regulation medium discharge line 114 is preferably arranged above the suction opening 256 in the direction of the force of gravity G so that, in particular, the temperature regulation medium discharge line 114 forms a suction siphon.

In operation of the exemplary embodiment of the battery temperature regulation device 100 that is illustrated in FIGS. 21 to 38, the interior space 247 of the receiving housing 246 is preferably filled with a temperature regulation medium up to at least approximately a quarter and in particular, up to at least approximately a third.

It may be expedient in operation of the battery temperature regulation device 100 for the interior space 247 of the receiving housing 246 to be filled with a temperature regulation medium to at most approximately two thirds, in particular to at most approximately a half.

Preferably, the battery temperature regulation modules 102 of the battery temperature regulation device are connected to one another and in particular clamped together in a direction parallel to the connecting direction 108 by means of connecting elements, in particular tie rods that are passed through the feed-through openings 208 of the battery temperature regulation modules 102.

Furthermore, it may be expedient for the battery temperature regulation modules 102 of the battery temperature regulation device 100 to be further connected or connectible to the receiving housing 246 in positive—and/or force-locking manner.

It may be expedient in particular for each battery temperature regulation module 102 to comprise a mounting section 258.

The battery temperature regulation modules 102 are connectible to the receiving housing 246 by means of the mounting section 258 preferably in positive—and/or force-locking manner, in particular are adapted to be screwed thereto.

Furthermore, it may be expedient for the receiving housing to comprise positioning ribs 260 for positioning the battery temperature regulation modules 102 in the receiving housing 246.

The positioning ribs 260 are schematically indicated by arrows only in FIG. 23.

For example, it is conceivable for a battery temperature regulation module 102 to be positionable between two positioning ribs 260 in a horizontal direction, i.e. in particular, in a direction running perpendicularly to the direction of the force of gravity G.

The positioning ribs 260 preferably extend away from a receiving housing wall 262 of the receiving housing 246, in particular in the direction of the interior space 247 of the receiving housing 246.

Furthermore, the exemplary embodiment of the battery temperature regulation device 100 that is illustrated in FIGS. 21 to 38 preferably comprises a plurality of reinforcement bodies 264.

The reinforcement bodies 264 are preferably arranged or adapted to be arranged in the connecting direction 108 on the mutually remote sides of the battery temperature regulation modules 102 that are connected to one another and in particular clamped to one another.

The reinforcement bodies 264 preferably comprise a reinforcing structure 266, in particular a reinforcing rib structure 268.

Figure 21:
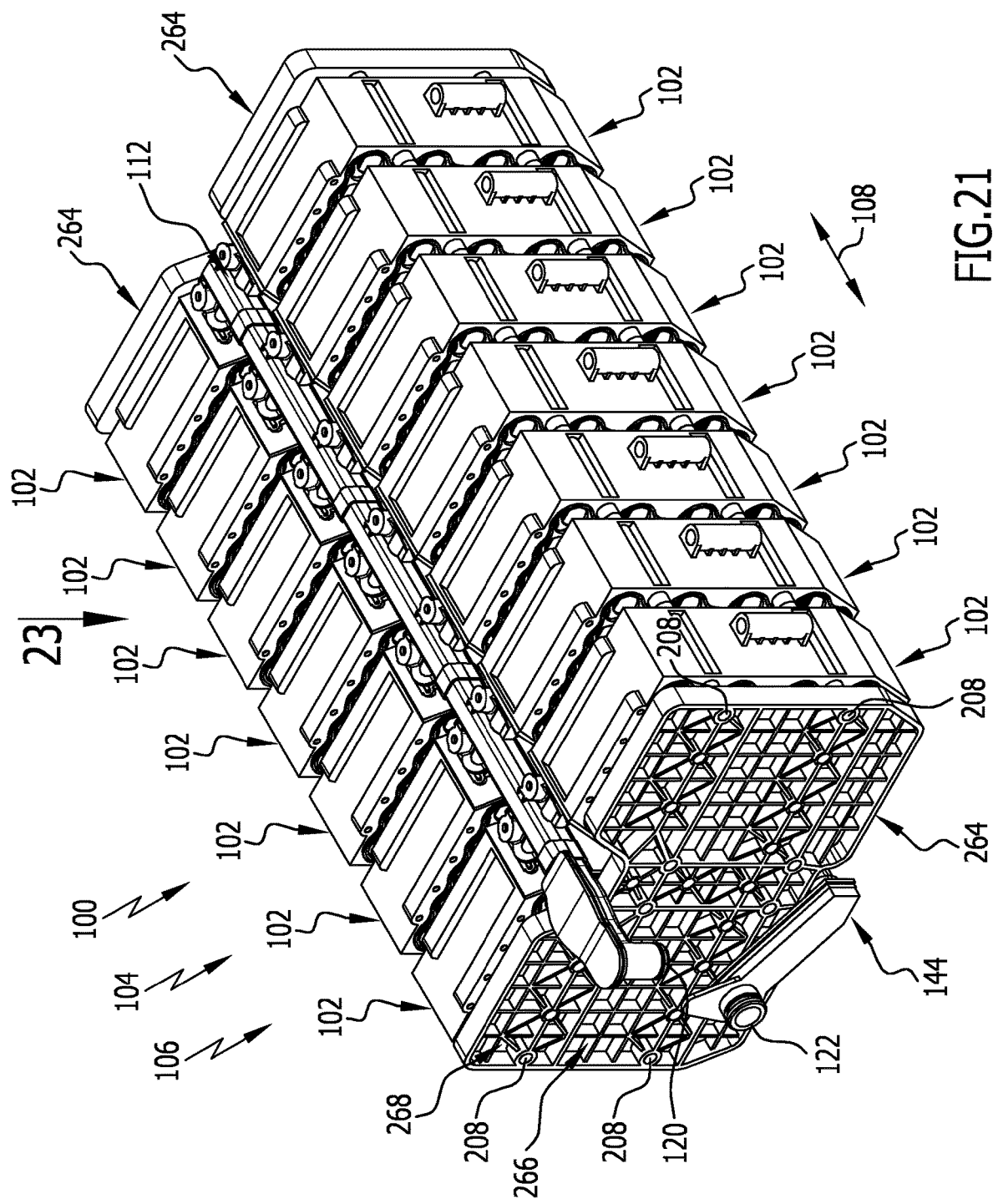
FIG. 21 a schematic perspective illustration of a further exemplary embodiment of a battery temperature regulation device.
Figure 22:
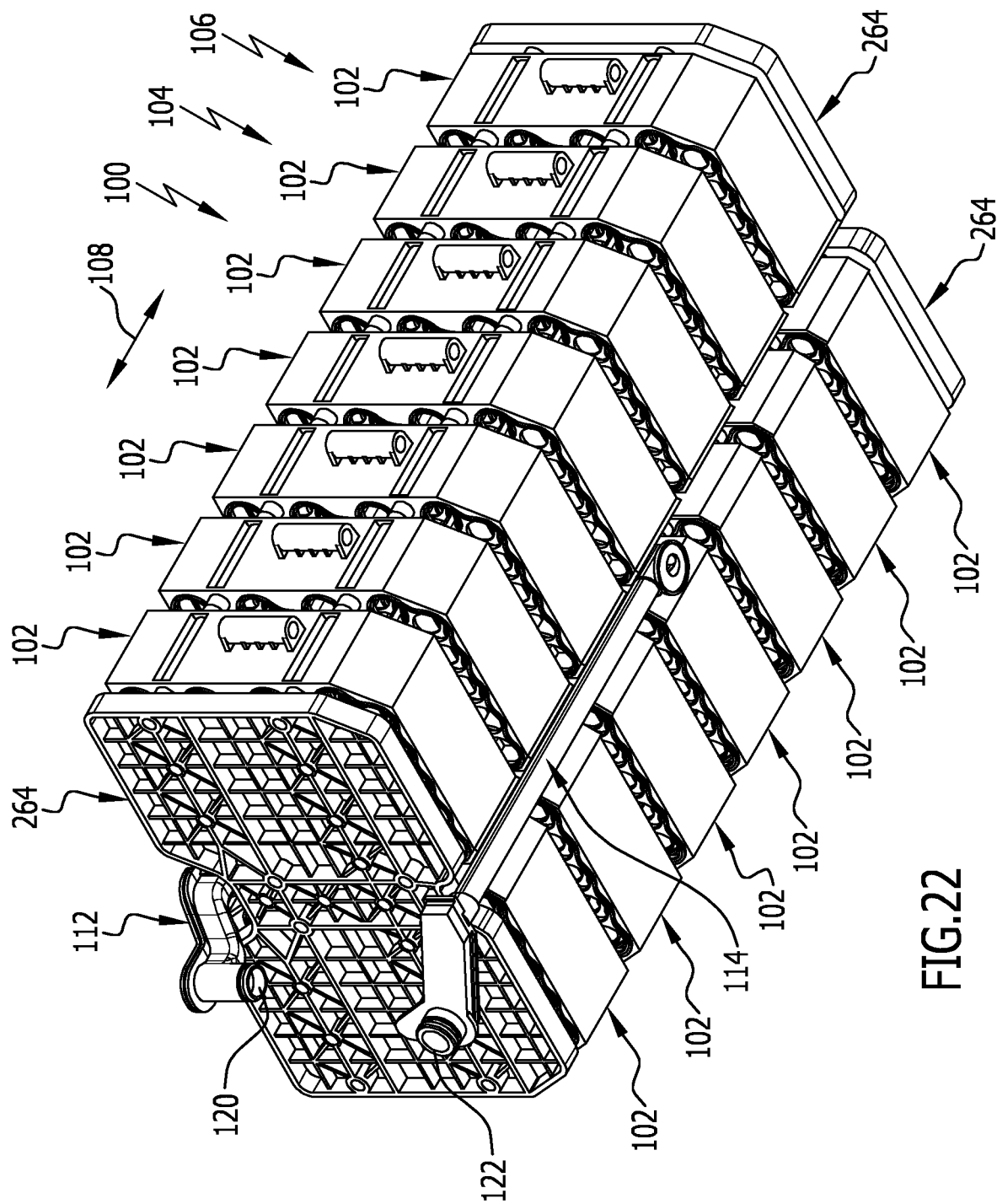
FIG. 22 a schematic perspective illustration of the battery temperature regulation device depicted in FIG. 21 from below.

As is readily apparent from FIG. 21 for example, provision may be made for the reinforcement bodies 264 to each comprise feed-through openings 208 for the purposes of feeding through connecting elements, in particular tie rods.

Consequently, provision may preferably be made for the reinforcement bodies 264 together with the battery temperature regulation modules 102 to be connected to one another, and in particular clamped together, by means of graphically not illustrated connecting elements, in particular by means of tie rods.

The exemplary embodiment of the battery temperature regulation device 100 that is illustrated in FIGS. 21 to 38 preferably functions as follows:

A temperature regulation medium, for example water, can be supplied via the feed-in connector 120 of the temperature regulation medium supply line 112 over the temperature regulation medium supply line 112 to the temperature regulation circulation systems 110 of the respective battery temperature regulation modules 102 and from there, it passes from the temperature regulation medium inlet region into the two temperature regulation medium outlet regions 158.

The temperature regulation medium can then be removed preferably from each of the two temperature regulation medium outlet regions 158 via the temperature regulation medium outlets 164 of the various battery temperature regulation modules 102.

The cell heads of battery cells that are arranged in the receiving openings 128 of the main body 124 and/or the additional body 126 of the respective battery temperature regulation modules 102 can be "wetted" and/or "moistened" with the temperature regulation medium and thereby cooled by means of the temperature regulation medium that emerges from the temperature regulation medium outlets 164 of each one of the battery temperature regulation modules 102.

The temperature regulation medium can then be collected in the temperature regulation medium collecting region 254 of the receiving housing 246 and be removed via the suction opening 256 from the temperature regulation medium collecting region 254 by means of the temperature regulation medium discharge line 114, for example by means of a temperature regulation medium pump.

In all other respects, the exemplary embodiment of the battery temperature regulation device 100 that is illustrated in FIGS. 21 to 38 corresponds in regard to the construction and functioning thereof with the exemplary embodiment of the battery temperature regulation device 100 illustrated in FIGS. 1 to 20 so that, to that extent, reference may be made to the preceding description thereof.

Overall, a battery temperature regulation device 100 can be made available which enables a reliable seal to be obtained and which is producible in a simple and economical manner.

The invention claimed is:

1. A battery temperature regulation device for regulating the temperature of battery cells, the battery temperature regulation device comprising:
   one or more battery temperature regulation modules, wherein
   each battery temperature regulation module of said one or more battery temperature regulation modules comprises:
   a main body; and
   one or more additional bodies that are arranged and/or are arrangeable on the main body, wherein the main body and/or the one or more additional bodies that are arranged on and/or are arrangeable on the main body each comprise one or more receiving openings for receiving battery cells, wherein the main body together with the one or more additional bodies define accommodation zones which enable battery cells to be accommodated substantially over the entire length of the battery cells, said each battery temperature regulation module comprises a sealing element arrangement for sealing in an area of the receiving openings and/or for sealing between the main body and one or more additional bodies, and the sealing element arrangement comprises one or more sealing elements which are arranged on the main body and/or onto a respective additional body, wherein the sealing element arrangement comprises one or more sealing elements for sealing in the area of the receiving openings and/or for sealing between the main body and a respective additional body, and a connector sealing element for sealing in an area of a temperature regulation medium inlet of a battery temperature regulation module and/or in an area of a temperature regulation medium outlet of a battery temperature regulation module.

2. The battery temperature regulation device in accordance with claim 1,
wherein the one or more additional bodies are arranged on the main body,
wherein the main body and the one or more additional bodies of a battery temperature regulation module and battery cells arranged in the receiving openings of the main body and/or of the one or more additional bodies bound and/or constitute a temperature regulation circulation system for a temperature regulation medium.

3. The battery temperature regulation device in accordance with claim 1, wherein
said each battery temperature regulation module comprises a temperature regulation circulation system for a temperature regulation medium, and
the temperature regulation circulation system comprises a temperature regulation channel running between a temperature regulation medium inlet and one or more temperature regulation medium outlets which runs in a meandering manner.

4. The battery temperature regulation device in accordance with claim 1, wherein
the battery temperature regulation device comprises a temperature regulation medium supply line for feeding a temperature regulation medium into a temperature regulation circulation system of one or more battery temperature regulation modules and/or a temperature regulation medium discharge line for removing a temperature regulation medium.

5. The battery temperature regulation device in accordance with claim 1, wherein
said each battery temperature regulation module comprises a temperature regulation medium inlet and/or one or more temperature regulation medium outlets, and
the temperature regulation medium inlet and/or the one or more temperature regulation medium outlets are arranged on the main body and/or on the one or more additional bodies.

6. The battery temperature regulation device in accordance with claim 1, wherein
the main body and/or or the one or more additional bodies are components of plastics material, or injection moulded components.

7. The battery temperature regulation device in accordance with claim 1, wherein
the sealing elements of the sealing element arrangement are components of plastics material, or are injection moulded components that are moulded onto the main body and/or onto the one or more additional bodies.

8. The battery temperature regulation device in accordance with claim 1, wherein
the main body and/or the one or more additional bodies are overmoulded at least in areas thereof with a sealing material of a sealing element.

9. The battery temperature regulation device in accordance with claim 1, wherein
said each battery temperature regulation module comprises one or more positioning projections that are arranged on the one or more additional bodies and/or on the main body and by means of which the one or more additional bodies are positioned or are positionable relative to the main body.

10. The battery temperature regulation device in accordance with claim 1, wherein
the main body is connected to the one or more additional bodies by means of a substance-to-substance bond.

11. The battery temperature regulation device in accordance with claim 1, wherein
a plurality of battery temperature regulation modules are connectible to one another, or are clampable against each other, in a connecting direction, and/or in that an additional body of a battery temperature regulation module is connected to or is connectible to the main body, and is inserted into or is insertable into the main body transversely, or perpendicularly, to a connecting direction of a plurality of battery temperature regulation modules.

12. The battery temperature regulation device in accordance with claim 1, wherein
the battery temperature regulation device comprises a receiving housing for receiving one or more, or all, battery temperature regulation modules of the battery temperature regulation device.

13. An electric vehicle, wherein the electric vehicle comprises a battery temperature regulation device in accordance with claim 1.

14. The battery temperature regulation device in accordance with claim 1, wherein
said one or more receiving openings of the main body are arranged to be coaxial with respective receiving openings of the one or more additional bodies that are arranged on the main body.

15. The battery temperature regulation device in accordance with claim 1, wherein
the sealing element arrangement comprises one or more sealing elements which are moulded onto the main body and/or onto a respective additional body.

16. A battery temperature regulation device for regulating the temperature of battery cells, the battery temperature regulation device comprising:
one or more battery temperature regulation modules, wherein
each battery temperature regulation module of said one or more battery temperature regulation modules comprises:
a main body; and one or more additional bodies that are arranged and/or are arrangeable on the main body, wherein the main body and/or the one or more additional bodies that are arranged on and/or are arrangeable on the main body each comprise one or more receiving openings for receiving battery cells, wherein the main body together with the one or more additional bodies define accommodation zones which enable battery cells to be accommodated substantially over the entire length of the battery cells, said each battery temperature regulation module comprises a sealing element arrangement for sealing in an area of the receiving openings and/or for sealing between the main body and one or more additional bodies, and the sealing element arrangement comprises one or more sealing elements which are arranged on the main body and/or onto a respective additional body, wherein the main body of each battery temperature regulation module comprises:

two cover plates into which the receiving openings of the main body for receiving battery cells are incorporated, wherein the two cover plates are arranged to be at least approximately parallel to each other; and/or an outer wall element which connects two cover plates of the main body to one another; and/or one or more temperature regulation medium outlets.

17. A battery temperature regulation device for regulating the temperature of battery cells, the battery temperature regulation device comprising:

one or more battery temperature regulation modules, wherein each battery temperature regulation module of said one or more battery temperature regulation modules comprises:

a main body; and one or more additional bodies that are arranged and/or are arrangeable on the main body, wherein the main body and/or the one or more additional bodies that are arranged on and/or are arrangeable on the main body each comprise one or more receiving openings for receiving battery cells, wherein the main body together with the one or more additional bodies define accommodation zones which enable battery cells to be accommodated substantially over the entire length of the battery cells, said each battery temperature regulation module comprises a sealing element arrangement for sealing in an area of the receiving openings and/or for sealing between the main body and one or more additional bodies, and the sealing element arrangement comprises one or more sealing elements which are arranged on the main body and/or onto a respective additional body, wherein an additional body of a respective battery temperature regulation module comprises:

two separator plates which are arranged to be at least approximately parallel to each other; and/or an outer wall element which is arranged to be transverse, at least approximately perpendicular to, the separator plates of the additional body; and/or one or more partition wall elements which extend away from the separator plates of the additional body and bound respective channel sections of a temperature regulation channel; and/or a temperature regulation medium inlet.

18. The battery temperature regulation device in accordance with claim 17, wherein at least one additional body which comprises the two separator plates and/or the outer wall element and/or the one or more partition wall elements is received or is receivable in the main body of the battery temperature regulation module, or is inserted into or is insertable into the main body of the battery temperature regulation module.

19. The battery temperature regulation device in accordance with claim 17, wherein said each battery temperature regulation module comprises a main body and an additional body that is received or is receivable in the main body to at least a partial extent.

20. A battery temperature regulation module, wherein the battery temperature regulation module comprises:

a main body; and one or more additional bodies that are arranged and/or are arrangeable on the main body, wherein the main body and/or the one or more additional bodies that are arranged on and/or are arrangeable on the main body each comprise one or more receiving openings for receiving battery cells, wherein the main body together with the one or more additional bodies define accommodation zones which enable battery cells to be accommodated substantially over the entire length of the battery cells, said battery temperature regulation module comprises a sealing element arrangement for sealing in an area of the receiving openings and/or for sealing between the main body and one or more additional bodies, and the sealing element arrangement comprises one or more sealing elements which are arranged on the main body and/or onto a respective additional body, wherein the sealing element arrangement comprises one or more sealing elements for sealing in the area of the receiving openings and/or for sealing between the main body and a respective additional body, and a connector sealing element for sealing in an area of a temperature regulation medium inlet of the battery temperature regulation module and/or in an area of a temperature regulation medium outlet of the battery temperature regulation module.

21. A battery temperature regulation module, wherein the battery temperature regulation module comprises:

a main body; and one or more additional bodies that are arranged and/or are arrangeable on the main body, wherein the main body and/or the one or more additional bodies that are arranged on and/or are arrangeable on the main body each comprise one or more receiving openings for receiving battery cells, wherein the main body together with the one or more additional bodies define accommodation zones which enable battery cells to be accommodated substantially over the entire length of the battery cells, said battery temperature regulation module comprises a sealing element arrangement for sealing in an area of the receiving openings and/or for sealing between the main body and one or more additional bodies, and the sealing element arrangement comprises one or more sealing elements which are arranged on the main body and/or onto a respective additional body, wherein the main body of the battery temperature regulation module comprises:

two cover plates into which the receiving openings of the main body for receiving battery cells are incorporated, wherein the two cover plates are arranged to be at least approximately parallel to each other; and/or an outer wall element which connects two cover plates of the main body to one another; and/or one or more temperature regulation medium outlets.

22. A battery temperature regulation module, wherein the battery temperature regulation modules comprises:

a main body; and one or more additional bodies that are arranged and/or are arrangeable on the main body, wherein the main body and/or the one or more additional bodies that are arranged on and/or are arrangeable on the main body each comprise one or more receiving openings for receiving battery cells, wherein the main body together with the one or more additional bodies define accommodation zones which enable battery cells to be accommodated substantially over the entire length of the battery cells, said battery temperature regulation module comprises a sealing element arrangement for sealing in an area of the receiving openings and/or for sealing between the main body and one or more additional bodies, and the sealing element arrangement comprises one or more sealing elements which are arranged on the main body and/or onto a respective additional body, wherein an additional body of the battery temperature regulation module comprises:

two separator plates which are arranged to be at least approximately parallel to each other; and/or an outer wall element which is arranged to be transverse, at least approximately perpendicular to, the separator plates of the additional body; and/or one or more partition wall elements which extend away from the separator plates of the additional body and bound respective channel sections of a temperature regulation channel; and/or a temperature regulation medium inlet.

* * * * *